United States Patent
Shim et al.

(10) Patent No.: US 12,538,299 B2
(45) Date of Patent: Jan. 27, 2026

(54) METHOD AND APPARATUS FOR MEASURING AND REPORTING INTERFERENCE SIGNAL IN WIRELESS COMMUNICATION SYSTEMS

(71) Applicant: Samsung Electronics Co., Ltd., Gyeonggi-do (KR)

(72) Inventors: Jaeyeon Shim, Gyeonggi-do (KR); Youngrok Jang, Gyeonggi-do (KR); Hyoungju Ji, Gyeonggi-do (KR); Ameha Tsegaye Abebe, Gyeonggi-do (KR); Seongmok Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 580 days.

(21) Appl. No.: 17/878,440

(22) Filed: Aug. 1, 2022

(65) Prior Publication Data

US 2023/0055304 A1 Feb. 23, 2023

(30) Foreign Application Priority Data

Aug. 3, 2021 (KR) .................. 10-2021-0102207
Jun. 14, 2022 (KR) .................. 10-2022-0072433

(51) Int. Cl.
*H04W 72/1268* (2023.01)
*H04B 17/336* (2015.01)
(Continued)

(52) U.S. Cl.
CPC ...... *H04W 72/1268* (2013.01); *H04B 17/336* (2015.01); *H04W 72/542* (2023.01); *H04W 80/02* (2013.01)

(58) Field of Classification Search
CPC ........... H04W 72/1268; H04W 72/542; H04W 80/02; H04W 24/08; H04W 72/21;
(Continued)

(56) References Cited

U.S. PATENT DOCUMENTS 10,911,166 B2 2/2021 Kwak et al.
2014/0313912 A1* 10/2014 Jongren ............. H04B 17/26
370/252
(Continued)

FOREIGN PATENT DOCUMENTS

| KR | 10-2018-0070260 | 6/2018 |
| WO | WO 2020/146891 | 7/2020 |
| WO | WO 2021/071337 | 4/2021 |

OTHER PUBLICATIONS

3GPP TS 38.331, 3GPP, 3rd Generation Partnership Project; Technical Specification Group Radio Access Network; NR; Radio Resource Control (RRC) Protocol Specification (Release 16), Jun. 2021, 959 pages.

(Continued)

*Primary Examiner* — Kwang B Yao
*Assistant Examiner* — Patrick Yipao Pei
(74) *Attorney, Agent, or Firm* — The Farrell Law Firm, P.C.

(57) ABSTRACT

The disclosure relates to a $5^{th}$-generation (5G) or $6^{th}$-generation (6G) communication system for supporting a higher data transmission rate. A method performed by a user equipment (UE) in a wireless communication system is provided, the method including receiving, from a base station (BS), a radio resource control (RRC) message including configuration information related to cross link interference (CLI), identifying a measured CLI quantity value based on the configuration information and at least one measurement resource received from the BS, and transmitting, to the BS, a medium access control (MAC) control element (CE) including the measured CLI quantity value via a physical uplink shared channel (PUSCH).

20 Claims, 41 Drawing Sheets

(51) Int. Cl.
*H04W 72/542* (2023.01)
*H04W 80/02* (2009.01)

(58) Field of Classification Search
CPC . H04W 72/541; H04B 17/336; H04B 17/318; H04B 17/345
See application file for complete search history.

(56) References Cited

U.S. PATENT DOCUMENTS

| | | | |
|---|---|---|---|
| 2015/0351115 A1 | 12/2015 | Jeon et al. | |
| 2016/0345352 A1* | 11/2016 | Langereis | H04B 1/40 |
| 2021/0144574 A1 | 5/2021 | Jin et al. | |
| 2021/0153053 A1 | 5/2021 | Taherzadeh Boroujeni et al. | |
| 2021/0385896 A1* | 12/2021 | Kim | H04W 36/0027 |
| 2022/0014954 A1* | 1/2022 | Ibrahim | H04W 24/08 |
| 2022/0116129 A1* | 4/2022 | Ying | H04B 17/345 |
| 2022/0240283 A1* | 7/2022 | Hong | H04L 1/1896 |
| 2022/0416977 A1* | 12/2022 | Farag | H04W 52/42 |
| 2023/0319605 A1 | 10/2023 | Park et al. | |

OTHER PUBLICATIONS

LGE, "Introduction of CLI Handling and RIM in TS38.331", R2-2001542, 3GPP TSG-RAN2 Meeting #109, Feb. 24-Mar. 5, 2020, 53 pages.
International Search Report dated Nov. 2, 2022 issued in counterpart application No. PCT/KR2022/011427, 9 pages.
Qualcomm Incorporated, "CLI-RSSI and SRS-RSRP Measurement", R2-1906109, 3GPP TSG-RAN WG2 Meeting #106, May 13-17, 2019, 11 pages.
Nokia et al., "Details of UE CLI Measurements", R1-1902672, 3GPP TSG-RAN1#96, Feb. 25-Mar. 1, 2019, 9 pages.
European Search Report dated Oct. 14, 2024 Issued in counterpart application No. 22853441.8-1215, 14 pages.

* cited by examiner

FIG. 17
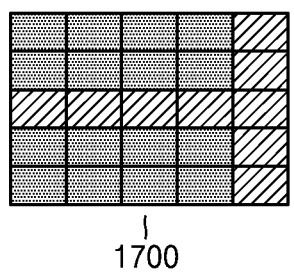
1700
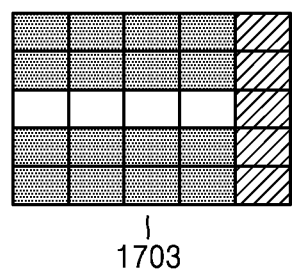
1703
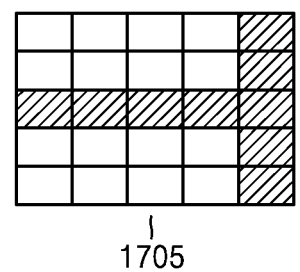
1705
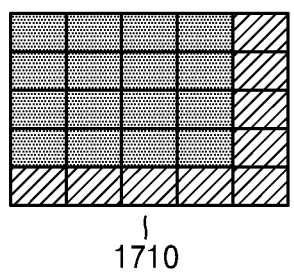
1710
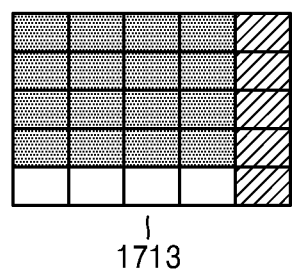
1713
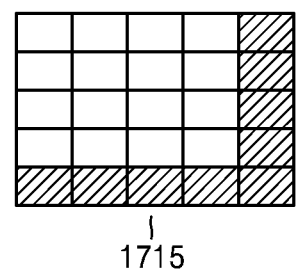
1715
▦ : DL resource
▨ : UL resource

FIG. 28

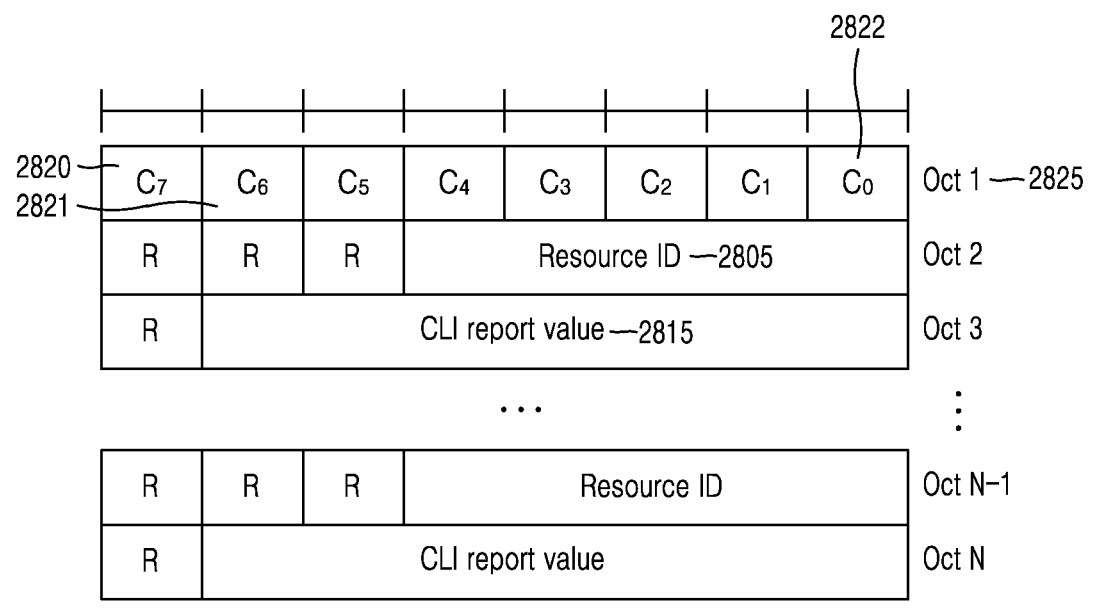

| | | | | | | | | |
|---|---|---|---|---|---|---|---|---|
| $C_7$ | $C_6$ | $C_5$ | $C_4$ | $C_3$ | $C_2$ | $C_1$ | $C_0$ | Oct 1 |
| R | R | R | \multicolumn{5}{c|}{Resource ID —2805} | Oct 2 |
| R | \multicolumn{7}{c|}{CLI report value —2815} | Oct 3 |
| R | R | R | \multicolumn{5}{c|}{Resource ID} | Oct N-1 |
| R | \multicolumn{7}{c|}{CLI report value} | Oct N |

FIG. 29

| | | | | | | | | |
|---|---|---|---|---|---|---|---|---|
| $C_7$ | $C_6$ | $C_5$ | $C_4$ | $C_3$ | $C_2$ | $C_1$ | $C_0$ | Oct 1 — 2920 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | |
| R | R | R | Resource ID — 2905 | | | | | |
| R | CLI report value — 2915 | | | | | | | |

...

| R | R | R | Resource ID | | | | | Oct N−1 |
|---|---|---|---|---|---|---|---|---|
| R | CLI report value | | | | | | | Oct N |

METHOD AND APPARATUS FOR MEASURING AND REPORTING INTERFERENCE SIGNAL IN WIRELESS COMMUNICATION SYSTEMS

CROSS-REFERENCE TO RELATED APPLICATIONS

This application is based on and claims priority under 35 U.S.C. § 119 to Korean Patent Application Nos. 10-2021-0102207, filed on Aug. 3, 2021, and 10-2022-0072433, filed on Jun. 14, 2022, in the Korean Intellectual Property Office, the entire content of each of which is incorporated herein by reference.

BACKGROUND

1. Field

The disclosure relates generally to operations of a user equipment (UE) and a base station (BS) in a wireless communication system, and more particularly, relates to a method of measuring and reporting interference in a wireless communication system, and an apparatus capable of performing the method.

2. Description of the Related Art 5G mobile communication technologies define broad frequency bands such that high transmission rates and new services are possible, and can be implemented not only in sub 6 GHz bands such as 3.5 GHz, but also in above 6 GHz bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates up to fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, L2 preprocessing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE Power Saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random-access-channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Accordingly, it is expected that enhanced functions and performances of 5G mobile communication systems and integrated operations of connected devices will be necessary. To this end, new research is scheduled in connection with eXtended reality (XR) for efficiently supporting augmented reality (AR), virtual reality (VR) mixed reality (MR) and the like, 5G performance improvement and complexity reduction by utilizing artificial intelligence (AI) and Machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below, and aspects of the disclosure provide an apparatus and method for effectively providing a service in a mobile communication system.

According to an embodiment, a method performed by a UE in a wireless communication system includes receiving, from a BS, a radio resource control (RRC) message including configuration information related to cross link interference (CLI), identifying a measured CLI quantity value based on the configuration information and at least one measurement resource received from the BS, and transmitting, to the BS, a medium access control (MAC) control element (CE) (MAC CE) including the measured CLI quantity value via a physical uplink shared channel (PUSCH).

According to another embodiment, a UE in a wireless communication system includes a transceiver, and at least one processor coupled to the transceiver and configured to receive, from a BS, an RRC message including configuration information related to CLI, identify a measured CLI quantity value based on the configuration information and at least one measurement resource received from the BS, and transmit, to the BS, a MAC CE including the measured CLI quantity value via a PUSCH.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates another example of UL-DL configurations in an XDD system according to an embodiment;

FIG. 28 illustrates a MAC CE format for generation of CLI reporting information according to another embodiment;

FIG. 29 illustrates a MAC CE format for generation of CLI reporting information according to another embodiment;

DETAILED DESCRIPTION

Figure 1:
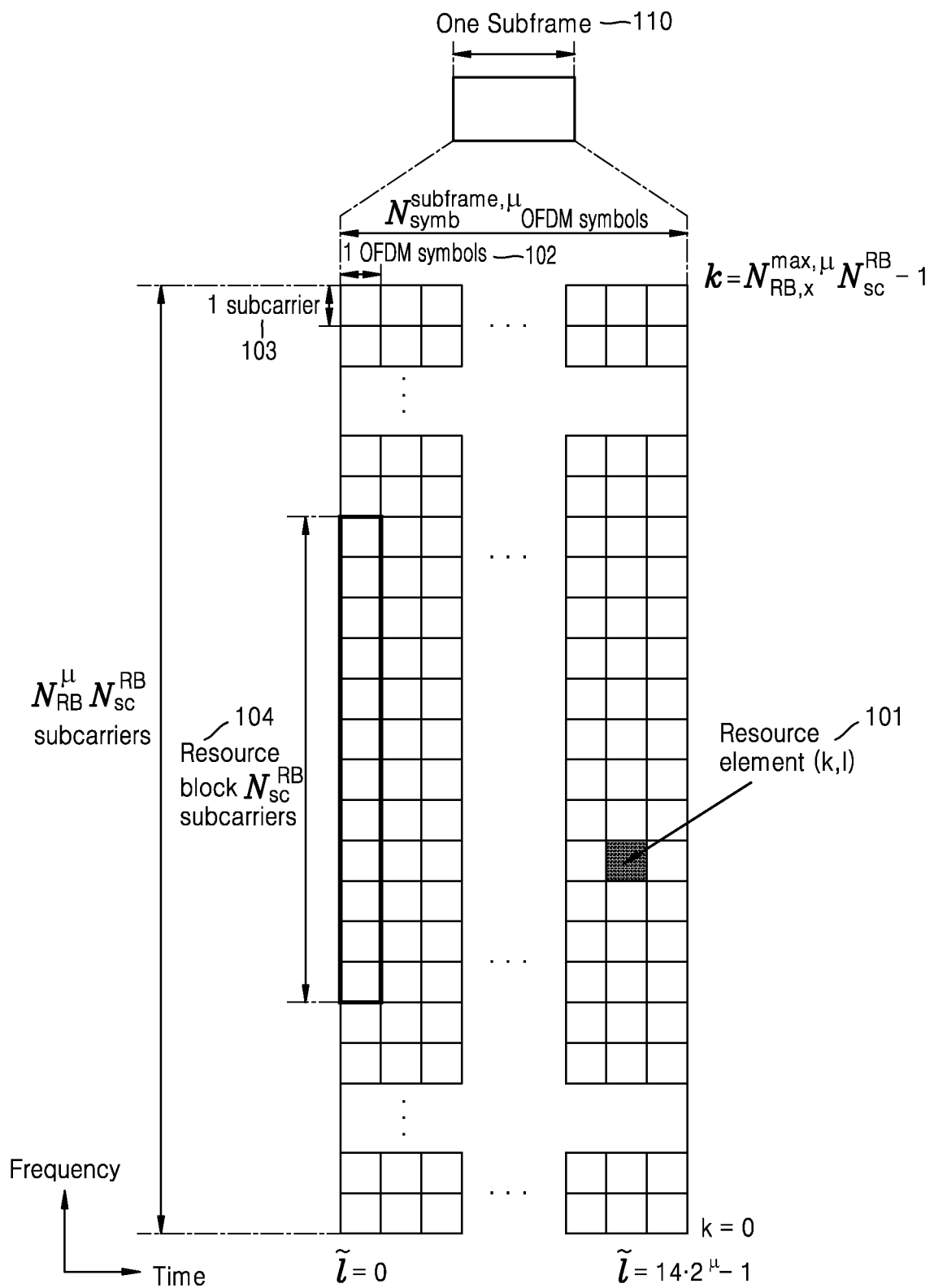
FIG. 1 illustrates a basic structure of a time-frequency domain in a wireless communication system according to an embodiment.

Hereinafter, embodiments of the disclosure will now be described more fully with reference to the accompanying drawings.

When embodiments of the disclosure are described herein, a description of techniques which are well known in the technical field to which the disclosure pertains and are not directly related to the disclosure will be omitted. This is to clearly convey the concept of the disclosure by omitting unnecessary details.

For the same reasons, in the drawings, some elements may be exaggerated, omitted, or roughly illustrated. Also, size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed description of embodiments and accompanying drawings of the disclosure. The disclosure may, however, be embodied in many different forms and should not be construed as being limited to the embodiments set forth herein; rather, these embodiments are provided for completeness, and will fully convey the concept to one of ordinary skill in the art. Therefore, the scope of the disclosure is defined by the appended claims. Like reference numerals refer to like elements, and well-known functions or configurations are not described in detail when it is deemed that they may unnecessarily obscure the essence of the disclosure. The terms used herein are defined in consideration of functions used in the disclosure, and can be changed according to the intent or commonly used methods of users or operators. Accordingly, definitions of the terms are understood based on the entire description.

Throughout the disclosure, the expression "at least one of a, b or c" indicates only a, only b, only c, both a and b, both a and c, both b and c, all of a, b, and c, or variations thereof.

A layer may also be referred to as an entity.

Hereinafter, for convenience of description, some terms and names defined in the 3$^{rd}$ Generation Partnership Project long term evolution (3GPP LTE) standard may be used. However, the disclosure is not limited to these terms and names, and may be equally applied to systems conforming to other standards. In the disclosure, an evolved node B (eNode B) may be interchangeably used with a next-generation node B (gNode B) for convenience of description. That is, a base station described by an eNB may represent a gNB. Also, the term terminal or user equipment may refer to not only mobile phones, narrowband Internet of things (NB-IoT) devices, and sensors but also refer to other wireless communication devices.

Hereinafter, a base station is an entity that allocates resources to a terminal, and may be at least one of gNode B, eNode B, Node B, a radio access unit, a BS controller, or a node on a network. The terminal may include a UE, a mobile station (MS), a cellular phone, a smartphone, a computer, or a multimedia system capable of performing a communication function. In the disclosure, a DL refers to a wireless transmission path of a signal to be transmitted from a BS to a UE, and a UL refers to a wireless transmission path of a signal to be transmitted from a UE to a BS. Although the following description may be directed to long term evolution (LTE) or LTE-advanced (LTE-A) systems as an example, embodiments are also applicable to other communication systems having similar technical backgrounds or channel structure. For example, embodiments may be applicable to a system including 5G mobile communication technology new radio (NR) developed after LTE-A system, and hereinafter, 5G may indicate a concept including LTE, LTE-A, and other similar services according to the related art. The disclosure is applicable to other communication systems through modification at the discretion of one of ordinary skill in the art without greatly departing from the scope of the disclosure.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that, in some alternative implementations, the functions noted in the blocks may occur out of the order. For example, two blocks shown in succession may in fact be executed substantially concurrently or the blocks may sometimes be executed in the reverse order, depending upon the functionality involved.

The term . . . unit, as used herein refers to a software or hardware component, such as field-programmable gate array (FPGA) or application-specific integrated circuit (ASIC), which performs certain tasks. However, the term . . . unit does not mean to be limited to software or hardware. A . . . unit may be configured to be in an addressable storage medium or configured to operate one or more processors. Thus, a . . . unit may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and ... units may be combined into fewer components and ... units or further separated into additional components and ... units. Further, the components and ... units may be implemented to operate one or more central processing units (CPUs) in a device or a secure multimedia card. Also, a ... unit may include one or more processors.

Wireless communication systems have been developed from wireless communication systems providing voice centered services in the early stage toward broadband wireless communication systems providing high-speed, high-quality packet data services, like communication standards of high speed packet access (HSPA), LTE or evolved universal terrestrial radio access (E-UTRA), and LTE-A of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link of data or a control signal transmitted from a UE (or an MS) to a BS (e.g., eNB), and the DL refers to a radio link of data or a control signal transmitted from a BS to a UE. The multiple access schemes identify data or control information of different users in a manner that time-frequency resources for carrying the data or control information of the users are allocated and managed not to overlap each other, that is, to achieve orthogonality therebetween.

As a post-LTE communication system, the 5G communication system is requested to freely reflect various requirements from users and service providers, and thus, has to support services that simultaneously satisfy the various requirements. The services being considered for the 5G communication system include eMBB, mMTC, URLLC services, or the like.

The eMBB aims to provide a further-improved data rate than a data rate supported by the legacy LTE, LTE-A, or LTE-Pro. For example, in the 5G communication system, the eMBB should be able to provide a peak data rate of 20 Gbps in a DL and a peak data rate of 10 Gbps in an UL at one BS. Also, the 5G communication system has to simultaneously provide the improved peak data rate and an increased user-perceived data rate of a UE. In order to satisfy such requirements, there is a need for an improvement in transmission/reception technology including an improved MIMO transmission technology. Also, a data rate requested in the 5G communication system may be satisfied by using a frequency bandwidth wider than 20 MHz in the 3 GHz to 6 GHz or 6 GHz or more frequency band, instead of the LTE transmitting a signal by using maximum 20 MHz in the 2 GHz band.

Concurrently, the mMTC is being considered to support application services such as IoT in the 5G communication system. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery lifetime of 10 to 15 years because it is difficult to frequently replace the battery of the terminal.

The URLLC refers to cellular-based wireless communication services used for mission-critical purposes. For example, services for remote control of robots or machinery, industrial automation, unmanned aerial vehicles, remote health care, emergency alerts, and the like may be considered. Therefore, the URLLC should provide communications providing very low latency and very high reliability. For example, a service supporting the URLLC should satisfy air interface latency of less than 0.5 milliseconds, and simultaneously has a requirement for a packet error rate of $10^{-5}$ or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services of the 5G, i.e., the eMBB, the URLLC, and the mMTC may be multiplexed and transmitted in one system. Here, in order to satisfy different requirements of the services, the services may use different transceiving schemes and different transceiving parameters. 5G is not limited to the afore-described three services.

Although LTE, LTE-A, LTE Pro, or 5G (or NR, next-generation mobile communication) systems are mentioned as examples in the following description, embodiments of the disclosure may also be applied to other communication systems having similar technical backgrounds or channel types. Furthermore, the embodiments may also be applied to other communication systems through partial modification without greatly departing from the scope of the disclosure based on determination by one of ordinary skill in the art.

Hereinafter, operational principles of the disclosure will be described in detail with reference to accompanying drawings. A detailed description of the related art is omitted when deemed to unnecessarily obscure the essence of the disclosure. Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

NR Time-Frequency Resource]

Hereinafter, a frame structure of a 5G system will now be described in detail with reference to drawings.

FIG. 1 illustrates a basic structure of a time-frequency domain in a wireless communication system according to an embodiment.

With reference to FIG. 1, the basic structure of the time-frequency domain that is a radio resource region in which data or control channel is transmitted in the 5G system is described based on one subframe 110. In FIG. 1, the horizontal axis represents a time domain and the vertical axis represents a frequency domain. A basic unit of a resource in the time-frequency domain is a resource element (RE) 101 and may be defined as 1 OFDM symbol 102 on the time axis and 1 subcarrier 103 on the frequency axis. In the frequency domain, $N_{SC}^{RB}$ (e.g., 12) consecutive REs may constitute one resource block (RB) 104.

Figure 2:
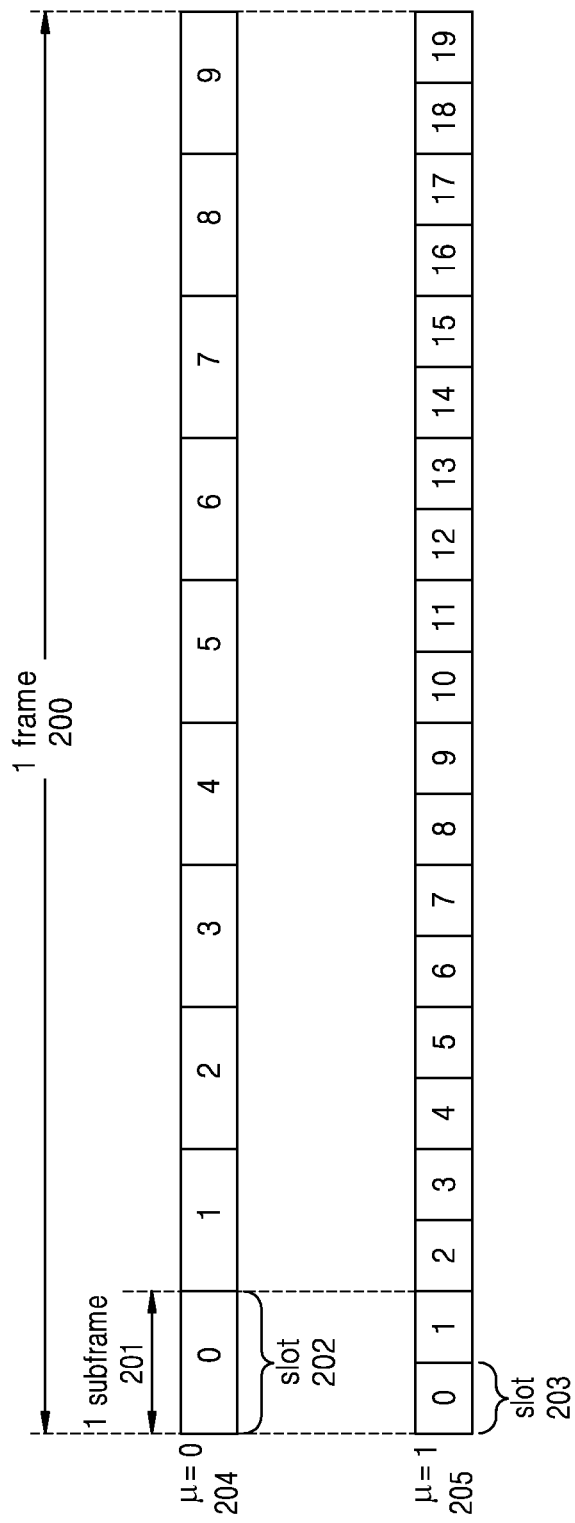
FIG. 2 illustrates structures of a frame, a subframe, and a slot in a wireless communication system according to an embodiment.

FIG. 2 illustrates structures of a frame, a subframe, and a slot in a wireless communication system according to an embodiment.

FIG. 2 illustrates an example of structures of a frame 200, a subframe 201 (corresponding to subframe 110 of FIG. 1), and a slot 202. One frame 200 may be defined as 10 ms. One subframe 201 may be defined as 1 ms, and thus, one frame 200 may consist of 10 subframes 201. One slot 202 or 203 may be defined as 14 OFDM symbols (that is, the number of symbols per 1 slot ($N_{symb}^{slot}$) may be 14). One subframe 201 may consist of one slot 202 or a plurality of slots 203, and the number of slots 202 or 203 per one subframe 201 may vary according to a configuration value µ 204 or 205 indicating a configuration of a subcarrier spacing. FIG. 2 shows a case 204 in which µ=0 and a case 205 in which µ=1, as a configuration value of a subcarrier spacing. When µ=0 (204), one subframe 201 may consist of one slot 202, and when µ=1 (205), one subframe 201 may consist of two slots 203. That is, the number of slots per one subframe ($N_{slot}^{subframe,\mu}$) may vary according to a configuration value µ with respect to a subcarrier spacing, and thus, the number of slots per one frame ($N_{slot}^{frame,\mu}$) may vary accordingly. $N_{slot}^{subframe,\mu}$ and $N_{slot}^{frame,\mu}$ according to each subcarrier spacing configuration value µ may be defined as in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part

Hereinafter, configuration of bandwidth parts (BWPs) in the 5G communication system will now be described with reference to the drawings.

Figure 3:
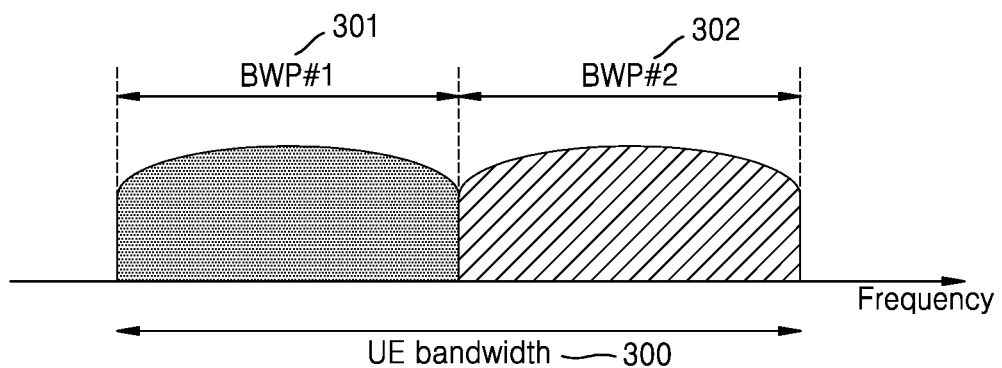
FIG. 3 illustrates an example of configuration of bandwidth parts (BWPs) in a wireless communication system according to an embodiment.

FIG. 3 illustrates an example of configuration of BWPs in a wireless communication system according to an embodiment.

In FIG. 3, UE bandwidth 300 is configured into two BWPs, i.e., BWP #1 301 and BWP #2 302. A BS may configure a UE with one or more BWPs, and may configure, for each BWP, a plurality of pieces of information as in Table 2, below.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

The disclosure is not limited to the example, and thus, various parameters associated with the BWP may be configured for the UE, in addition to the configuration information. The plurality of pieces of information may be transmitted from the BS to the UE by higher layer signaling, e.g., RRC signaling. At least one BWP among the configured one or more BWPs may be activated. Whether to activate a configured BWP may be notified from the BS to the UE semi-statically by RRC signaling or dynamically by downlink control information (DCI).

According to some embodiments, the UE may be configured by the BS with an initial BWP for initial access in a master information block (MIB) before the UE is RRC connected. In more detail, the UE may receive, via the MIB in an initial access process, configuration information for a control resource set (CORESET) and search space in which a physical downlink control channel (PDCCH) may be transmitted for reception of system information (e.g., remaining system information (RMSI) or system information block 1 (SIB1)) requested for initial access. Each of the control resource set and the search space which are configured in the MIB may be regarded with ID 0. The BS may notify, in the MIB, the UE of configuration information such as frequency allocation information, time allocation information, numerology, etc., for control resource set #0. Also, the BS may notify, in the MIB, the UE of configuration information such as a monitoring periodicity and occasion for the control resource set #0, i.e., configuration information for search space #0. The UE may regard a frequency region configured as the control resource set #0 obtained from the MIB, as the initial BWP for initial access. Here, the ID of the initial BWP may be regarded as 0.

Configuration of the BWP supported by the 5G communication system may be used for various purposes.

According to some embodiments, when a bandwidth supported by the UE is smaller than a system bandwidth, the BS may support additional bandwidth via configuration of the BWP. For example, the BS may configure the UE with a frequency location (configuration information 2) of the BWP, such that the UE may transmit or receive data in a particular frequency location in the system bandwidth.

Also, according to some embodiments, in order to support different numerologies, the BS may configure a plurality of BWPs for the UE. For example, in order to support data transmission and reception using both 15 KHz subcarrier spacing and 30 KHz subcarrier spacing for a certain UE, the BS may configure two BWPs with 15 KHz and 30 KHz subcarrier spacings, respectively. The different BWPs may be frequency division multiplexed, and, in a case where a UE attempts to transmit and receive data with particular subcarrier spacing, a BWP configured with the subcarrier spacing may be activated.

Also, according to some embodiments, in order to reduce power consumption of the UE, the BS may configure BWPs with different bandwidth sizes for the UE. For example, when the UE supports very large bandwidth, e.g., 100 MHz bandwidth, and always transmits or receives data in the bandwidth, very high power consumption may occur. Particularly, in a situation where there is no traffic, monitoring unnecessary DL control channel in the large 100 MHz bandwidth may be very inefficient in terms of power consumption. In order to reduce the power consumption of the UE, the BS may configure a BWP with a relatively small bandwidth, e.g., a 20 MHz BWP, for the UE. In the situation that there is no traffic, the UE may perform monitoring in the 20 MHz BWP, and, when data occurs, the UE may transmit or receive the data on the 100 MHz BWP based on an indication from the BS.

In a method of configuring a BWP, before being RRC connected UEs may receive, via the MIB, configuration information for the initial BWP in an initial access process. In more detail, the UE may be configured, based on the MIB of a physical broadcast channel (PBCH), with a control resource set for a DL control channel on which DCI for scheduling a system information block (SIB) may be transmitted. A bandwidth of the control resource set configured based on the MIB may be regarded as the initial BWP, and the UE may receive, on the initial BWP, a PDSCH on which the SIB is transmitted. The initial BWP may also be used for other system information (OSI), paging, or random access, in addition to reception of the SIB.

Switching of BWP

When one or more BWPs are configured for the UE, the BS may indicate, to the UE, change (or, switching or transition) of BWP by using a BWP indicator field in DCI. For example, in FIG. 3, when a currently activated BWP of the UE is BWP #1 301, the BS may indicate BWP #2 302 with a bandwidth indicator in DCI to the UE, and the UE may perform BWP switching to the BWP #2 302 indicated with the BWP indicator in the received DCI.

As described above, the DCI-based BWP switching may be indicated by DCI that schedules a PDSCH or a PUSCH. Thus, when the UE receives a BWP switching request, the UE may need to perform, in the switched BWP without difficulty, transmission or reception of the PDSCH or the PUSCH scheduled by the DCI. For this end, a requirement for a delay time $T_{BWP}$ required for BWP switching is defined in a standard, and, for example, as defined in Table 3, below.

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on JE capability.

Note 2:
If the BWP switch involves changing of SCS, the BWP switch delay is determined by the larger one between the SCS before BWP switch and the SCS after BV NVP switch.

The requirement for BWP switching delay time supports type 1 or type 2 depending on a capability of the UE. The UE may report a supportable BWP delay time type to the BS.

According to the requirement for the BWP switching delay time, when the UE receives DCI including the BWP switching indicator in slot n, the UE may complete switching to a new BWP indicated by the BWP switching indicator no later than slot $n+T_{BWP}$, and may transmit or receive, on the new BWP, a data channel scheduled by the DCI. When the BS attempts to schedule the data channel on the new BWP, the BS may allocate a time domain resource for the data channel by considering the BWP switching delay time ($T_{BWP}$) of the UE. That is, when the BS schedules a data channel on a new BWP, as for determining time domain resource allocation for the data channel, the BS may schedule the data channel after the BWP switching delay time. Accordingly, the UE may not expect the DCI, which indicates BWP switching, to indicate a slot offset value (K0 or K2) smaller than the BWP switching delay time $T_{BWP}$.

If the UE receives DCI indicating BWP switching (e.g., DCI format 1_1 or 0_1), the UE may not perform any transmission or reception during a time duration from a third symbol of the slot in which a PDCCH including the DCI is received to a starting point of a slot indicated by a slot offset value (K0 or K2) indicated in a time domain resource allocation indicator field in the DCI. For example, when the UE has received DCI indicating BWP switching in slot n and a slot offset value indicated by the DCI is K, the UE may not perform any transmission or reception from a third symbol of the slot n to a symbol before slot n+k (i.e., a last symbol of slot n+K−1).

SS/PBCH Block

A synchronization signal (SS)/PBCH block in the 5G system will now be described.

An SS/PBCH block may refer to a physical layer channel block including primary SS (PSS), secondary SS (SSS), and PBCH. Details are as below.

PSS: a reference signal for DL time/frequency synchronization, which provides partial information of a cell ID.

SSS: a reference signal for DL time/frequency synchronization, which provides the rest of the cell ID information not provided by the PSS. In addition, the SSS may serve as another reference signal for demodulation of the PBCH.

PBCH: The PBCH provides essential system information requested for transmission or reception of data channel and control channel for UE. The essential system information may include search-space-associated control information indicating radio resource mapping information of the control channel, scheduling control information for a separate data channel to transmit system information, and the like.

SS/PBCH block: The SS/PBCH block is a combination of PSS, SSS, and PBCH. One or more SS/PBCH blocks may be transmitted in 5 ms, and each of the SS/PBCH blocks being transmitted may be identified by an index.

The UE may detect the PSS and the SSS in an initial access process, and may decode the PBCH. The UE may obtain an MIB from the PBCH, and the UE may be configured, via the MIB, with CORESET #0 (e.g., corresponding to control resource set whose control resource set index is 0). The UE may assume that demodulation reference signals (DMRSs) transmitted in the selected SS/PBCH block and control resource set #0 are quasi-co-located (QCL), and may perform monitoring with respect to the CORESET #0. The UE may receive system information via the DCI transmitted in the control resource set #0. The UE may obtain RACH related configuration information required for initial access from the received system information. The UE may transmit, to the BS, a physical RACH (PRACH) by considering the selected SS/PBCH index, and upon reception of the PRACH, the BS may obtain information about the SS/PBCH block index selected by the UE. The BS may identify that the UE has selected a certain block among the SS/PBCH blocks and monitors the control resource set #0 associated with the selected SS/PBCH block.

PDCCH: Associated with DCI

Hereinafter, DCI in the 5G system are described in detail.

In the 5G system, scheduling information for UL data (or PUSCH) or DL data (or PDSCH) is transmitted in the DCI from the BS to the UE. The UE may monitor a fallback DCI format and a non-fallback DCI format for PUSCH or PDSCH. The fallback DCI format may include a fixed field predefined between the BS and the UE, and the non-fallback DCI format may include a configurable field.

DCI may be transmitted on a PDCCH after channel coding and modulation processes. Cyclic redundancy check (CRC) may be added to a DCI message payload, and the CRC may be scrambled by a radio network temporary identifier (RNTI) that corresponds to an ID of the UE. Depending on a purpose of the DCI message, e.g., UE-specific data transmission, power control command, random access response, or the like, different RNTIs may be used. That is, the RNTI is not explicitly transmitted but is transmitted in a CRC calculation process. Upon reception of a DCI message transmitted on the PDCCH, the UE may check CRC by using an allocated RNTI. When a result of the CRC checking is correct, the UE may identify that the DCI message is transmitted to the UE.

For example, DCI that schedules a PDSCH for system information (SI) may be scrambled by SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules a PUSCH, and here, the CRC may be scrambled by a C-RNTI. The DCI format 0_0 with the CRC scrambled by the C-RNTI may include a plurality of pieces of information, such as in Table 4, below.

TABLE 4

- Identifier for DCI formats - [1] bit
- Frequency domain resource assignment - $\lceil \log_2(N_{RB}^{UL,BWP}(N_{RB}^{UL,BWP}+1)/2) \rceil$ bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit DCI format 0_1 may be used for the non-fallback DCI that schedules a PUSCH. Here, the CRC may be scrambled by a C-RNTI. The DCI format 0_1 with the CRC scrambled by the C-RNTI may include a plurality of pieces of information, such as in Table 5, below.

TABLE 5

- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
  - For resource allocation type 0, $\lceil N_{RB}^{UL,BWP}/P \rceil$ bits
  - For resource allocation type 1, $\lceil \log_2 (N_{RB}^{UL,BWP} (N_{RB}^{UL,BWP}+1)/2) \rceil$ bits
- Time domain resource assignment -1, 2, 3, or 4 bits
- VRB-to-PRB mapping - 0 or 1 bit, only for resource allocation type 1.
  - 0 bit if only resource allocation type 0 is configured;
  - 1 bit otherwise.
- Frequency hopping flag - 0 or 1 bit, only for resource allocation type 1.
  - 0 bit if only resource allocation type 0 is configured;
  - 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  - 1 bit for semi-static HARQ-ACK codebook;
  - 2 bits for dynamic HARQ-ACK codebook with single HARQ-ACK codebook.
- 2nd downlink assignment index - 0 or 2 bits
  - 2 bits for dynamic HARQ-ACK codebook with two HARQ-ACK sub-codebooks;
  - 0 bit otherwise.
- TPC command for scheduled PUSCH - 2 bits
- SRS resource indicator $- \left\lceil \log_2 \left( \sum_{k=1}^{L_{max}} \binom{N_{SRS}}{K} \right) \right\rceil$ or $\lceil \log_2(N_{SRS}) \rceil$ bits
  - $\left\lceil \log_2 \left( \sum_{k=1}^{L_{max}} \binom{N_{SRS}}{k} \right) \right\rceil$ bits for non-codebook based PUSCH transmission;
  - $\lceil \log_2(N_{SRS}) \rceil$ bits for codebook based PUSCH transmission.
- Precoding information and number of layers -up to 6 bits
- Antenna ports - up to 5 bits
- SRS request - 2 bits
- CSI request - 0, 1,2, 3 , 4, 5, or 6 bits
- CBG transmission information - 0, 2, 4, 6, or 8 bits
  PTRS-DMRS association - 0 or 2 bits.
- beta_offset indicator - 0 or 2 bits
- DMRS sequence initialization - 0 or 1 bit DCI format 1_0 may be used for the fallback DCI that schedules a PDSCH. Here, the CRC may be scrambled by a C-RNTI. The DCI format 1_0 with the CRC scrambled by the C-RNTI may include a plurality of pieces of information, such as in Table 6, below.

TABLE 6

- Identifier for DCI formats - [1] bit
- Frequency domain resource assignment - [[$\log_2 (N_{RB}^{DL,BWP} (N_{RB}^{DL,BWP} + 1) / 2)$]] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits DCI format 1_1 may be used for the non-fallback DCI that schedules a PDSCH. Here, the CRC may be scrambled by a C-RNTI. The DCI format 1_1 with the CRC scrambled by the C-RNTI may include a plurality of pieces of information, such as in Table 7, below.

TABLE 7

- Carrier indicator - 0 or 3 bits
- Identifier for DCI formats - [1] bits
- Bandwidth part indicator - 0, 1 or 2 bits
- Frequency domain resource assignment
  • For resource allocation type 0, [$N_{RB}^{DL,BWP}/P$] bits
  • For resource allocation type 1, [$\log_2(N_{RB}^{DL,BWP}(N_{RB}^{DL,BWP} +1)/2)$] bits
- Time domain resource assignment -1, 2, 3, or 4 bits
- VRB-to-PRB mapping - 0 or 1 bit, only for resource allocation type 1.
  • 0 bit if only resource allocation type 0 is configured;
  • 1 bit otherwise.
- PRB bundling size indicator - 0 or 1 bit
- Rate matching indicator - 0, 1, or 2 bits
- ZP CSI-RS trigger - 0, 1, or 2 bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit PDCCH: CORESET, REG, CCE, Search Space A DL control channel in the 5G communication system will now be described.

Figure 4:
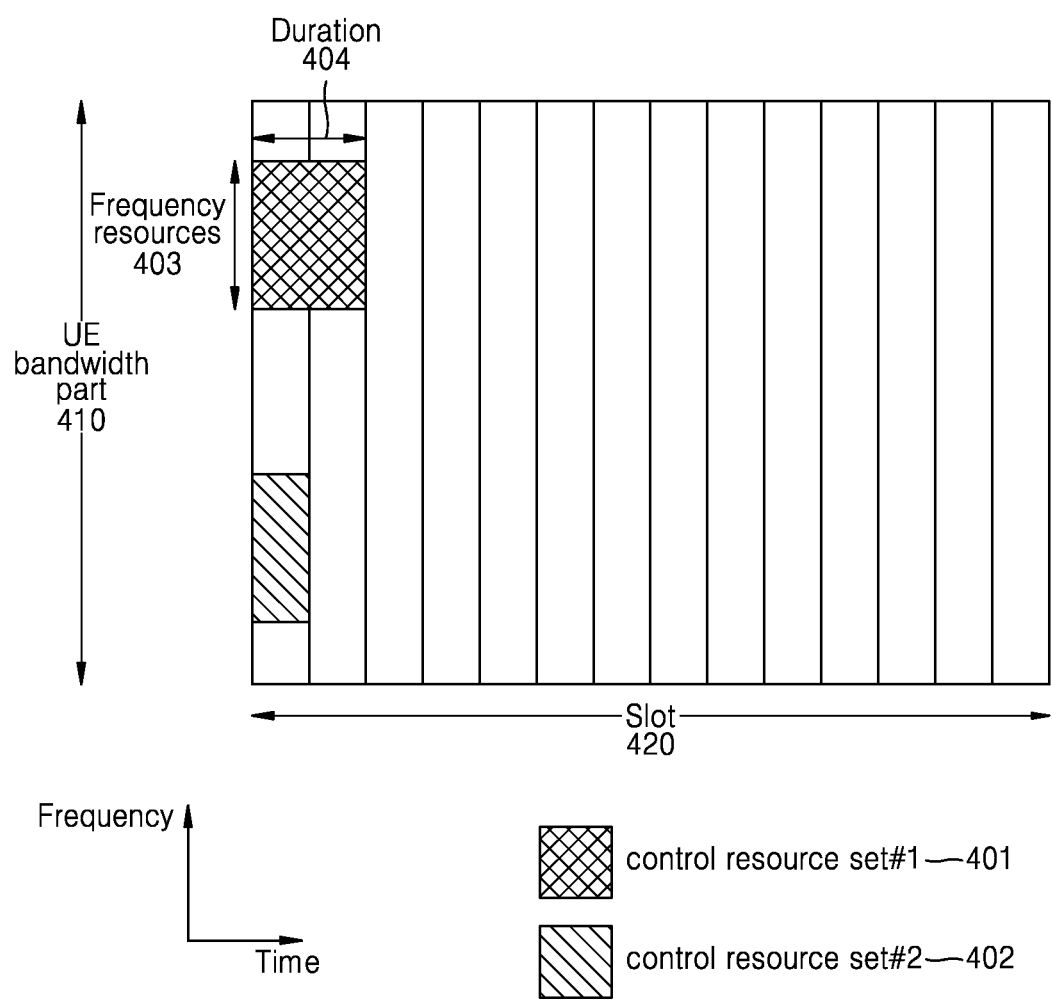
FIG. 4 illustrates an example of configuration of control resource sets for a downlink (DL) control channel in a wireless communication system according to an embodiment.

FIG. 4 illustrates an example of configuration of control resource sets for a DL control channel in a wireless communication system according to an embodiment.

Referring to FIG. 4, control resource sets on which a DL control channel is transmitted in a 5G wireless communication system will now be described. FIG. 4 illustrates the example in which UE BWP 410 is configured on the frequency axis, and two control resource sets (control resource set #1 401 and control resource set #2 402) are configured in a slot 420 on the time axis. The control resource sets 401 and 402 may be configured on particular frequency resources 403 in the full UE BWP 410 on the frequency axis. The control resource sets 401 and 402 may be configured as one or more OFDM symbols on the time axis, and may be defined as control resource set duration 404. Referring to FIG. 4, the control resource set #1 401 may be configured as a control resource set duration of two symbols, and the control resource set #2 402 may be configured as a control resource set duration of one symbol.

The control resource set in the 5G communication system, as described above, may be configured by the BS for the UE by higher layer signaling (e.g., SI, MIB, or RRC signaling). Configuring the UE with a control resource set may be understood as providing information such as a control resource set ID, a frequency location of the control resource set, length of symbols of the control resource set, or the like. For example, information for the BS to configure the UE with a control resource set may include a plurality of pieces of information, such as in Table 8, below.

TABLE 8

```
ControlResourceSet ::=              SEQUENCE {
  -- Corresponds to L1 parameter 'CORESET-ID'
  controlResourceSetId              ControlResourceSetId,
    frequencyDomainResources        BIT STRING (SIZE (45)),
  duration                          INTEGER
(1..maxCoReSetDuration),
    cce-REG-MappingType               CHOICE {
    interleaved                     SEQUENCE {
    reg-BundleSize                  ENUMERATED {n2, n3, n6},
    precoderGranularity             ENUMERATED     {sameAsREG-bundle,
allContiguousRBs},
    interleaverSize                 ENUMERATED {n2, n3, n6}
    shiftIndex                  INTEGER(0..maxNrofPhysicalResourceBlocks-1)
                                    OPTIONAL
},
  nonInterleaved                    NULL
  },
  tci-StatesPDCCH                 SEQUENCE(SIZE   (1..maxNrofTCI-StatesPDCCH))
OF TCI-StateId
                                    OPTIONAL,
  tci-PresentInDCI                  ENUMERATED {enabled}
                                    OPTIONAL,   -- Need S
}
```

In Table 8, tci-StatesPDCCH (simply, transmission configuration indication (TCI) state) configuration information may include information about channel state information reference signal (CSI-RS) indexes or one or more SS/PBCH block indexes having a QCL relation with a DMRS transmitted in the corresponding control resource set.

Figure 5:
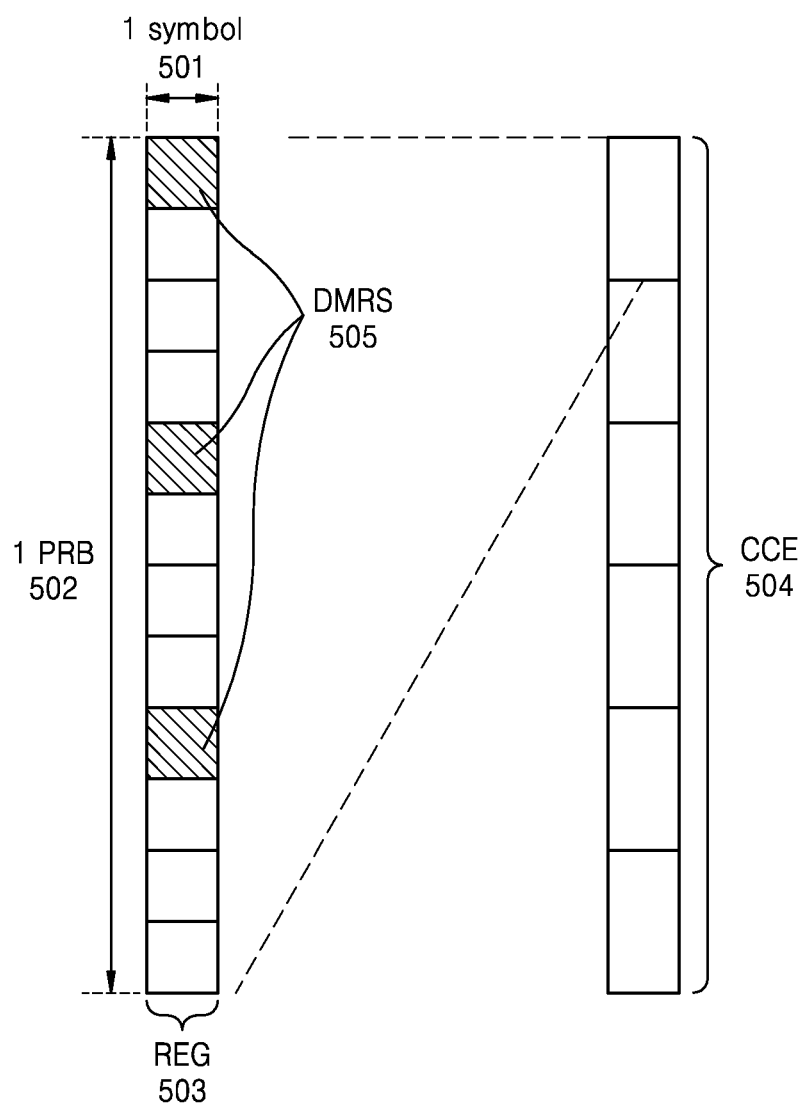
FIG. 5 illustrates a structure of a DL control channel in a wireless communication system according to an embodiment.

FIG. 5 illustrates a structure of a DL control channel in a wireless communication system according to an embodiment.

FIG. 5 provides an example of a basic unit of time and frequency resources that configure a DL control channel to be used in the 5G communication system. Referring to FIG. 5, a basic unit of time and frequency resources that configure a control channel may be referred to as a resource element group (REG) 503, and the REG 503 may be defined by one OFDM symbol 501 on the time axis and one physical resource block (PRB) 502, i.e., 12 subcarriers, on the frequency axis. The BS may configure a DL control channel allocation unit by connecting a plurality of REGs 503.

As illustrated in FIG. 5, a basic unit with which the DL control channel is allocated is referred to as a control channel element (CCE) 504 in the 5G communication system, and the one CCE 504 may include a plurality of REGs 503. The REG 503 may include 12 REs, and, when one CCE 504 includes 6 REGs 503, the one CCE 504 may include 72 REs. When the DL control resource set is configured, the DL control resource set may include a plurality of CCEs 504, and a particular DL control channel may be transmitted by being mapped to one or more CCEs 504 based on an aggregation level (AL) in the control resource set. The CCEs 504 in the control resource set may be identified by numbers, and the numbers may be allocated to the CCEs 504 in a logical mapping scheme.

The basic unit of the DL control channel shown in FIG. 5, i.e., the REG 503, may include both REs to which DCI is mapped and a region to which DMRS 505 that is a reference signal for decoding the DCI is mapped. As shown in FIG. 5, three DMRSs 505 may be transmitted in one REG 503. The number of CCEs required to transmit the PDCCH may be 1, 2, 4, 8, or 16 depending on the AL, and different numbers of CCEs may be used to implement link adaptation of the DL control channel. For example, when AL=L, one DL control channel may be transmitted in L CCEs. The UE detects a signal without knowing information about the DL control channel. Thus, search space representing a set of CCEs may be defined for the blind decoding of the UE. The search space may be defined as a set of DL control channel candidates that include CCEs on which the UE needs to attempt decoding at a given AL, and because there are various ALs each making a bundle with 1, 2, 4, 8, or 16 CCEs, the UE may have a plurality of search spaces. A search space set may be defined as a set of search spaces at all the configured ALs.

The search spaces may be classified into common search spaces and UE-specific search spaces. A certain group of UEs or all the UEs may monitor a common search space of the PDCCH so as to receive dynamic scheduling of the system information or receive cell-common control information such as a paging message. For example, the UE may monitor the common search space of the PDCCH so as to receive PDSCH scheduling allocation information for transmitting an SIB including cell operator information or the like. Because a certain group of UEs (or all the UEs) need to receive the PDCCH, the common search space may be defined as a set of pre-defined CCEs. The UE may receive UE-specific PDSCH or PUSCH scheduling allocation information by monitoring the UE-specific search space of the PDCCH. The UE-specific search space may be UE-specifically defined as a function of various system parameters and an ID of the UE.

In the 5G communication system, parameters of the search space of the PDCCH may be configured by the BS for the UE by using higher layer signaling (e.g., SIB, MIB, or RRC signaling). For example, the BS may configure the UE with the number of PDCCH candidates at each L, monitoring periodicity for the search space, monitoring occasion on symbols in the slot for the search space, monitoring a type of the search space (common search space or UE-specific search space), monitoring a combination of a DCI format in the search space and an RNTI, and monitoring a control resource set index to monitor the search space. For example, configuration information for the search space the BS configures for the UE may include a plurality of pieces of information, such as in Table 9, below.

TABLE 9

```
SearchSpace ::=                          SEQUENCE {
  -- Identity of the search space. SearchSpaceId = 0 identifies the SearchSpace
configured via PBCH (MIB) or ServingCellConfigCommon.
  searchSpaceId                          SearchSpaceId,
  controlResourceSetId                   ControlResourceSetId,
  monitoringSlotPeriodicityAndOffset     CHOICE {
    sl1                                    NULL,
    sl2                                    INTEGER (0..1),
    sl4                                    INTEGER (0..3),
    sl5                                    INTEGER (0..4),
    sl8                                    INTEGER (0..7),
    sl10                                   INTEGER (0..9),
    sl16                                   INTEGER (0..15),
    sl20                                   INTEGER (0..19)
  }
                                         OPTIONAL,
  duration                               INTEGER (2..2559)
  monitoringSymbolsWithinSlot              BIT STRING (SIZE
(14))                                    OPTIONAL,
  nrofCandidates                         SEQUENCE {
    aggregationLevel1                    ENUMERATED {n0, n1, n2, n3, n4, n5, n6, n8},
    aggregationLevel2                    ENUMERATED {n0, n1, n2, n3, n4, n5, n6, n8},
    aggregationLevel4                    ENUMERATED {n0, n1, n2, n3, n4, n5, n6, n8},
    aggregationLevel8                    ENUMERATED {n0, n1, n2, n3, n4, n5, n6, n8},
    aggregationLevel16                   ENUMERATED {n0, n1, n2, n3, n4, n5, n6, n8}
  },
  searchSpaceType                        CHOICE {
  -- Configures this search space as common search space (CSS) and DCI
formats to monitor.
    common                               SEQUENCE {
    }
    ue-Specific                          SEQUENCE {
    -- Indicates whether the UE monitors in this USS for DCI formats 0-0 and
1-0 or for formats 0-1 and 1-1.
      formats                            ENUMERATED {formats0-0-And-1-0, formats0-1-
And-1-1},
      ...
  }
```

Based on the configuration information, the BS may configure the UE with one or more search space sets. According to some embodiments, the BS may configure search space set 1 and search space set 2 for the UE, and the BS may configure the UE to monitor DCI format A scrambled by an X-RNTI in the search space set 1 in the common search space and to monitor DCI format B scrambled by a Y-RNTI in the search space set 2 in the UE-specific search space.

Based on configuration information, one or more search space sets may be present in the common search space or the UE-specific search space. For example, search space set #1 and search space set #2 may be configured as the common search space, and search space set #3 and search space set #4 may be configured as the UE-specific search space.

In the common search space, combinations of DCI formats and RNTIs, as illustrated below, may be monitored. The combinations are not limited to the example set forth below DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, combinations of DCI formats and RNTIs below may be monitored, and the combinations are not limited to the example set forth below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs may conform to the following definitions and purposes:

C-RNTI (Cell RNTI): for UE-specific PDSCH scheduling

TC-RNTI (Temporary Cell RNTI): for UE-specific PDSCH scheduling

CS-RNTI (Configured Scheduling RNTI): for semi-statically configured UE-specific PDSCH scheduling RA-RNTI (Random Access RNTI): for PDSCH scheduling in a random access process P-RNTI (Paging RNTI): for scheduling a PDSCH on which paging is transmitted SI-RNTI (System Information RNTI): for scheduling a PDSCH on which system information is transmitted INT-RNTI (interruption RNTI: for indicating whether to puncture the PDSCH TPC-PUSCH-RNTI (Transmit Power Control for PUSCH RNTI): for indicating power control command for a PUSCH TPC-PUCCH-RNTI (Transmit Power Control for PUCCH RNTI): for indicating power control command for a PUCCH TPC-SRS-RNTI (Transmit Power Control for SRS RNTI): for indicating power control command for an SRS The DCI formats described above may conform to the following definitions in Table 10, below.

TABLE 10

| DCI format | Usage |
|---|---|
| 0_0 | Scheduling of RUSCH In one cell |
| 0_1 | Scheduling of RUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system, a search space at aggregation level L with control resource set p and search space set s may be represented by Equation (1), below.

$$L \cdot \left\{ \left( Y_{p,n_{s,f}^\mu} + \left\lfloor \frac{m_{s,n_{Cl}} \cdot N_{CCE,p}}{L \cdot M_{s,max}^{(L)}} \right\rfloor + n_{Cl} \right) \bmod \left\lfloor \frac{N_{CCE,p}}{L} \right\rfloor \right\} + i \quad (1)$$

in Equation (1):

L: AL $n_{Cl}$: carrier index $N_{CCE,p}$: a total number of CCEs being present in control resource set p $n_{s,f}^\mu$: slot index $M_{s,max}^{(L)}$: the number of PDCCH candidate groups at aggregation level L $m_{s,n_{Cl}} = 0, \ldots, M_{s,max}^{(L)} - 1$: index of PDCCH candidate groups at aggregation level L $i = 0, \ldots, L-1$ $Y_{p,n_{s,f}^\mu} = (A_p \cdot Y_{p,n_{s,f}^\mu - 1}) \bmod D$, $Y_{p,-1} = n_{RNTI} \neq 0$, $A_p = 39827$ for p mod 3=0, $A_p = 39829$ for p mod 3=1, $A_p = 39839$ for p mod 3=2, D=65537 nRNTI: UE identifier

The $Y_{p,n_{s,f}^\mu}$ value may correspond to 0 for common search space.

The $Y_{p,n_{s,f}^\mu}$ value may be a value that changes by a UE Identity (C-RNTI or ID configured by the BS for the UE) and time index for the UE-specific search space.

In the 5G communication system, it is possible to configure a plurality of search space sets with different parameters (e.g., the parameters in Table 9). Thus, a group of search space sets the UE monitors may be different every time. For example, when search space set #1 is configured with X-slot periodicity and search space set #2 is configured with Y-slot periodicity, and where X and Y are different, the UE may monitor both the search space set #1 and the search space set #2 in a particular slot, and may monitor one of the search space set #1 and the search space set #2 in another particular slot.

PDSCH/PUSCH: Associated with Time Resource Allocation

A time domain resource allocation method for a data channel in the next generation mobile communication system (5G or NR system) is described.

The BS may configure the UE with a table of time domain resource allocation information for a DL data channel (PDSCH) and a UL data channel (PUSCH) by higher layer signaling (e.g., RRC signaling). For the PDSCH, a table including maximally up to 16 (maxNrofDL-Allocations=16) entries may be configured, and for the PUSCH, a table including maximally up to 16 (max NrofUL-Allocations=16) entries may be configured. In an embodiment, the time domain resource allocation information may include PDCCH-to-PDSCH slot timing (corresponding to a time interval in slots between a reception time of PDCCH and a transmission time of PDSCH scheduled by the received PDCCH, and indicated as slot offset value K0), PDCCH-to-PUSCH slot timing (corresponding to a time interval in slots between a reception time of PDCCH and a transmission time of PUSCH scheduled by the received PDCCH, and indicated as slot offset value K2), information about location and length of a start symbol scheduled on the PDSCH or the PUSCH in the slot, a mapping type of PDSCH or PUSCH, or the like. For example, information, such as in Table 11-1 or Table 11-2 below, may be transmitted from the BS to the UE.

TABLE 11-1

PDSCH-TimeDomainResourceAllocationList information element

```
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::=    SEQUENCE {
  k0                              INTEGER(0..32)
OPTIONAL,  -- Need S
  (PDCCH-to-PDSCH timing, slot unit)
  mappingType                     ENUMERATED {typeA, typeB},
  (PDSCH mapping type)
  startSymbolAndLength            INTEGER (0..127)
  (start symbol and length of PDSCH)
}
```

TABLE 11-2

PUSCH-TimeDomainResourceAllocation information element

```
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
  k2                              INTEGER(0..32)
OPTIONAL,  -- Need S
  (PDCCH-to-PUSCH timing, slot unit)
  mappingType                     ENUMERATED {typeA, typeB},
  (PUSCH mapping type)
  startSymbolAndLength            INTEGER (0..127)
  (start symbol and length of PUSCH)
}
```

The BS may notify the UE of at least one of the entries in Table 11-1 or Table 11-2 about the time domain resource allocation information by L1 signaling (e.g., DCI) (e.g., the one entry may be indicated in a time domain resource allocation field in the DCI). The UE may obtain the time domain resource allocation information for the PDSCH or the PUSCH, based on the DCI received from the BS.

Figure 6:
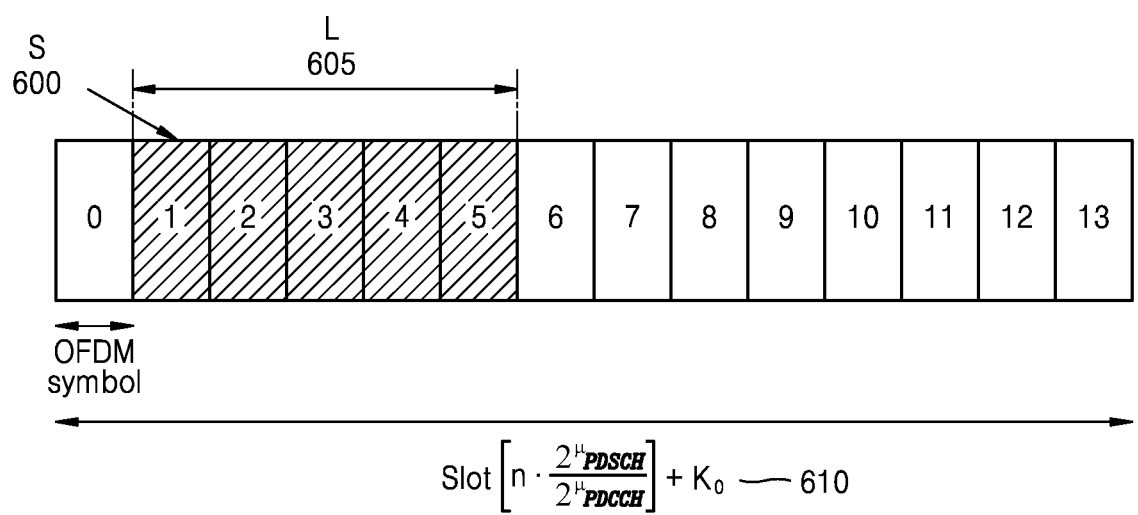
FIG. 6 illustrates an example of physical downlink shared channel (PDSCH) time-axis resource allocation in a wireless communication system according to an embodiment.

FIG. 6 illustrates an example of PDSCH time-axis resource allocation in a wireless communication system according to an embodiment.

Referring to FIG. 6, the BS may indicate a position of a PDSCH resource on the time axis based on SCSs ($\mu_{PDSCH}$, $\mu_{PDCCH}$) of a data channel and a control channel and a scheduling offset based on a slot offset $K_0$, which are configured by using a higher layer, and a start position 600 and length 605 of OFDM symbols within one slot 610 dynamically indicated by DCI.

Figure 7:
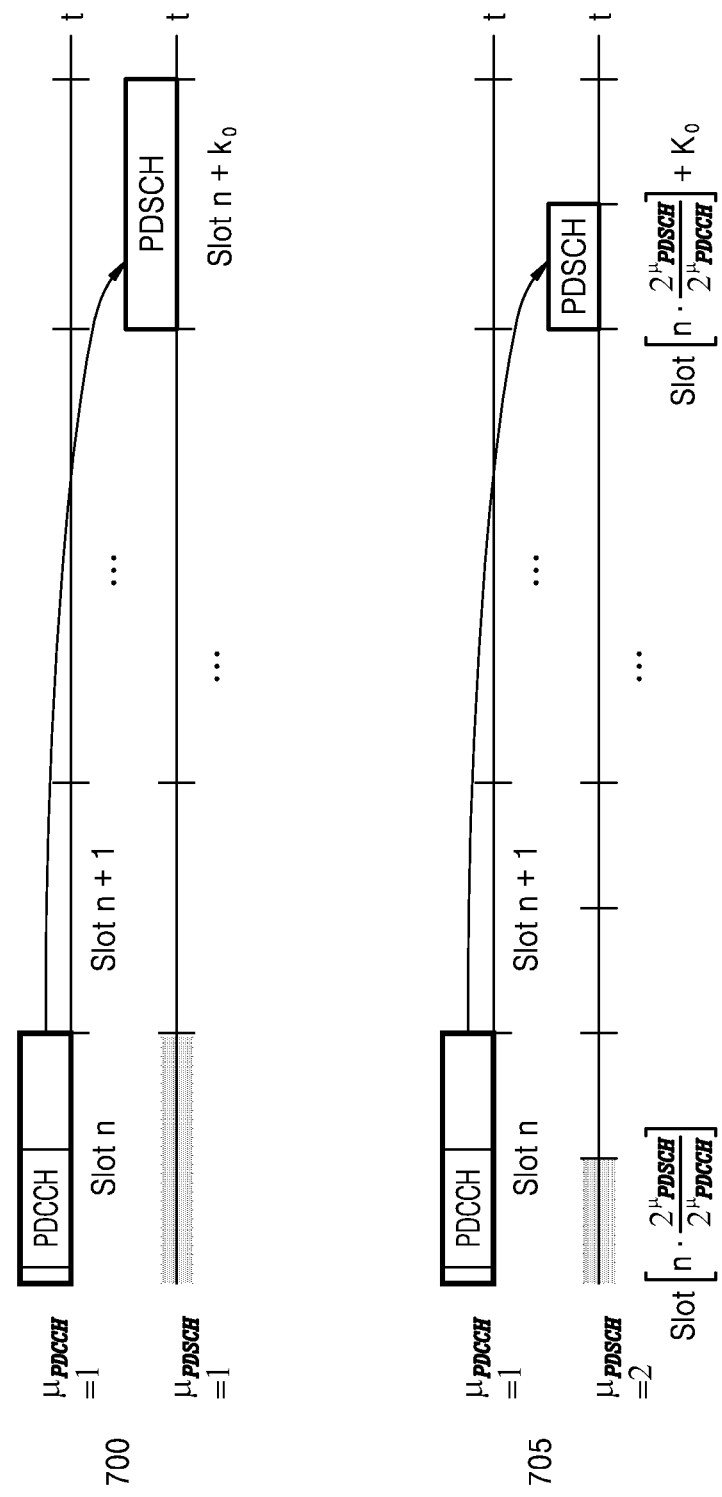
FIG. 7 illustrates an example of time-axis resource allocations according to subcarrier spacings (SCSs) of a data channel and a control channel in a wireless communication system, according to an embodiment.

FIG. 7 illustrates an example of time-axis resource allocations according to SCSs of a data channel and a control channel in a wireless communication system, according to an embodiment.

Referring to FIG. 7, when SCSs of the data channel and the control channel are equal ($\mu_{PDSCH}=\mu_{PDCCH}$) 700, slot numbers for data and control are equal, such that the BS and the UE may generate a scheduling offset according to the preset slot offset $K_0$. On the other hand, when SCSs of the data channel and the control channel are different ($\mu_{PDSCH}\neq\mu_{PDCCH}$) 705, slot numbers for data and control are different, such that the BS and the UE may generate a scheduling offset according to the preset slot offset $K_0$ based on the SCS of the PDCCH.

PUSCH: Associated with Transmission Scheme

A PUSCH transmission scheduling scheme is now described. PUSCH transmission may be dynamically scheduled by UL grant in DCI or may be operated by configured grant Type 1 or Type 2. Indication of dynamic scheduling indication for PUSCH transmission may be available by DCI format 0_0 or 0_1.

Configured grant Type 1 PUSCH transmission may be semi-statically configured not by receiving a UL grant in DCI but by receiving a configuredGrantConfig including rrc-ConfiguredUplinkGrant, as in Table 12-1 below, by higher layer signaling. Configured grant Type 2 PUSCH transmission may be semi-persistently scheduled by UL grant in DCI after receiving configuredGrantConfig that does not include rrc-ConfiguredUplinkGrant of Table 12-1 by higher layer signaling. When the PUSCH transmission is operated by the configured grant, parameters to be applied to the PUSCH transmission are applied by higher layer signaling configuredGrantConfig of Table 12-1, except for dataScramblingIdentityPUSCH, txConfig, codebookSubset, maxRank, scaling of UCI-OnPUSCH provided by higher layer signaling that is pusch-Config of Table 12-2. When the UE receives transformPrecoder in higher layer signaling that is configuredGrantConfig of Table 12-1, the UE applies tp-pi2BPSK in pusch-Config of Table 12-2 to the PUSCH transmission operated by the configured grant.

TABLE 12-1

```
ConfiguredGrantConfig ::=          SEQUENCE {
    frequencyHopping                   ENUMERATED {intraSlot, interSlot}
OPTIONAL,    -- Need S,
    cg-DMRS-Configuration              DMRS-UplinkConfig,
    mcs-Table                          ENUMERATED {qam256, qam64LowSE}
OPTIONAL,    -- Need S
    mcs-TableTransformPrecoder         ENUMERATED {qam256, qam64LowSE}
OPTIONAL,    -- Need S
    uci-OnPUSCH                        SetupRelease { CG-UCI-OnPUSCH }
OPTIONAL,    -- Need M
    resourceAllocation                 ENUMERATED { resourceAllocationType0,
resourceAllocationType1, dynamicSwitch },
    rbg-Size                           ENUMERATED {config2}
OPTIONAL,    -- Need S
    powerControlLoopToUse              ENUMERATED {n0, n1},
    p0-PUSCH-Alpha                     P0-PUSCH-AlphaSetId,
    transformPrecoder                  ENUMERATED {enabled, disabled}
OPTIONAL,    -- Need S
    nrofHARQ-Processes                 INTEGER(1..16),
    repK                               ENUMERATED {n1, n2, n4, n8},
    repK-RV                            ENUMERATED {s1-0231, s2-0303, s3-
0000}                                  OPTIONAL,    -- Need R
    periodicity                        ENUMERATED {
                                            sym2, sym7, sym1x14, sym2x14,
sym4x14, sym5x14, sym8x14, sym10x14, sym16x14, sym20x14,
                                            sym32x14, sym40x14, sym64x14,
sym80x14, sym128x14, sym160x14, sym256x14, sym320x14, sym512x14,
                                            sym640x14, sym1024x14,
sym1280x14, sym2560x14, sym5120x14,
                                            sym6, sym1x12, sym2x12,
sym4x12, sym5x12, sym8x12, sym10x12, sym16x12, sym20x12, sym32x12,
                                            sym40x12, sym64x12, sym80x12,
sym128x12, sym160x12, sym256x12, sym320x12, sym512x12, sym640x12,
                                            sym1280x12, sym2560x12
    },
    configuredGrantTimer               INTEGER (1..64)
OPTIONAL,    -- Need R
    rrc-ConfiguredUplinkGrant          SEQUENCE {
        timeDomainOffset                   INTEGER (0..5119),
        timeDomainAllocation               INTEGER  (0..15),
        frequencyDomainAllocation          BIT STRING (SIZE(18)),
        antennaPort                        INTEGER (0..31),
        dmrs-SeqInitialization             INTEGER (0..1)
OPTIONAL,    -- Need R
        precodingAndNumberOfLayers         INTEGER (0..63),
        srs-ResourceIndicator              INTEGER (0..15)
OPTIONAL,    -- Need R
        mcsAndTBS                          INTEGER (0..31),
        frequencyHoppingOffset             INTEGER (1..
maxNrofPhysicalResourceBlocks-1)       OPTIONAL,    -- Need R
        pathlossReferenceIndex             INTEGER (0..maxNrofPUSCH-
PathlossReferenceRSs-1),
```

TABLE 12-1-continued

```
    ...
  }                            OPTIONAL,    -- Need R
    ...
}
```

A PUSCH transmission method is now described. A DMRS antenna port for PUSCH transmission is equal to an antenna port for SRS transmission. PUSCH transmission may follow a codebook based transmission method or a non-codebook based transmission method depending on whether a value of txConfig in higher layer signaling that is pusch-Config of Table 12-2 below is codebook or non-Codebook.

As described above, PUSCH transmission may be dynamically scheduled by DCI format 0_0 or 0_1, or may be semi-statically configured by the configured grant. If the UE receives an indication of scheduling of PUSCH transmission by DCI format 0_0, the UE performs beam configuration for PUSCH transmission by using pucch-spatialRelationInfoID corresponding to a UE-specific PUCCH resource corresponding to a smallest ID in an activated UL BWP in the serving cell. In this regard, the PUSCH transmission is based on a single antenna port. The UE does not expect scheduling for the PUSCH transmission by DCI format 0_0 in a BWP on which a PUCCH resource including pucch-spatialRela-tionInfo is not configured. When the UE is not configured with txConfig in the pusch-Config of Table 12-2 below, the UE does not expect to be scheduled by DCI format 0_1.

TABLE 12-2

```
PUSCH-Config ::=                        SEQUENCE {
    dataScramblingIdentityPUSCH                  INTEGER (0..1023)
OPTIONAL,   -- Need S
    txConfig                             ENUMERATED {codebook,
nonCodebook}                         OPTIONAL,   -- Need S
    dmrs-UplinkForPUSCH-MappingTypeA             SetupRelease { DMRS-
UplinkConfig }                       OPTIONAL,   -- Need M
    dmrs-UplinkForPUSCH-MappingTypeB             SetupRelease { DMRS-
UplinkConfig }                       OPTIONAL,   -- Need M
    pusch-PowerControl                           PUSCH-PowerControl
OPTIONAL,   -- Need M
    frequencyHopping                     ENUMERATED {intraSlot, interSlot}
OPTIONAL,   -- Need S
    frequencyHoppingOffsetLists            SEQUENCE (SIZE (1..4)) OF
INTEGER (1.. maxNrofPhysicalResourceBlocks-1)
OPTIONAL,   -- Need M
    resourceAllocation                                   ENUMERATED
{ resourceAllocationType0, resourceAllocationType1, dynamicSwitch},
    pusch-TimeDomainAllocationList               SetupRelease { PUSCH-
TimeDomainResourceAllocationList }   OPTIONAL,   -- Need M
    pusch-AggregationFactor                ENUMERATED { n2, n4, n8 }
OPTIONAL,   -- Need S
    mcs-Table                            ENUMERATED {qam256,
qam64LowSE}                          OPTIONAL,   -- Need S
    mcs-TableTransformPrecoder                   ENUMERATED {qam256,
qam64LowSE}                          OPTIONAL,   -- Need S
    transformPrecoder                  ENUMERATED {enabled, disabled}
OPTIONAL,   -- Need S
    codebookSubset                                       ENUMERATED
{fullyAndPartialAndNonCoherent, partialAndNonCoherent,nonCoherent}
OPTIONAL, -- Cond codebookBased
    maxRank                                      INTEGER (1..4)
OPTIONAL, -- Cond codebookBased
    rbg-Size                              ENUMERATED { config2}
OPTIONAL, -- Need S
    uci-OnPUSCH                          SetupRelease { UCI-OnPUSCH}
OPTIONAL, -- Need M
    tp-pi2BPSK                            ENUMERATED {enabled}
OPTIONAL, -- Need S
    ...
}
```

Codebook based PUSCH transmission is now described. Codebook based PUSCH transmission may be dynamically scheduled by DCI format 0_0 or 0_1, or may be semi-statically operated by the configured grant. When the codebook based PUSCH transmission is dynamically scheduled by DCI format 0_1 or semi-statically configured by the configured grant, the UE determines a precoder for PUSCH transmission based on an SRS resource indicator (SRI), a transmission precoding matrix indicator (TPMI), and a transmission rank (the number of PUSCH transmission layers).

Here, the SRI may be given by an SRS resource indicator that is a field in DCI or may be configured by srs-ResourceIndicator that is higher layer signaling. The UE may be configured with at least one SRS resource for codebook based PUSCH transmission, and may be configured with up to two SRS resources. When the UE receives the SRI by DCI, an SRS resource indicated by the SRI refers to an SRS resource corresponding to the SRI among SRS resources transmitted before the PDCCH including the SRI. Also, the TPMI and the transmission rank may be given by precoding information and a number of layers that is a field in the DCI or may be configured by precodingAndNumberOfLayers that is higher layer signaling. The TPMI is used to indicate a precoder to be applied to PUSCH transmission. If the UE is configured with one SRS resource, the TPMI is used to indicate a precoder to be applied in the configured one SRS resource. If the UE is configured with a plurality of SRS resources, the TPMI is used to indicate a precoder to be applied in the SRS resource indicated by the SRI.

The precoder to be used in PUSCH transmission is selected from a UL codebook having the same number of antenna ports as a value of nrofSRS-Ports in SRS-Config that is higher layer signaling. In the codebook based PUSCH transmission, the UE determines a codebook subset based on the TPMI and codebookSubset in pusch-Config that is higher layer signaling. The codebookSubset in the pusch-Config that is higher layer signaling may be configured to one of fullyAndPartialAndNonCoherent, partialAndNonCoherent, and nonCoherent, based on the UE capability reported by the UE to the BS. If the UE reports partialAndNonCoherent in the UE capability, the UE does not expect that a value of codebookSubset that is higher layer signaling is configured to be fullyAndPartialAndNonCoherent. If the UE reports nonCoherent in the UE capability, the UE does not expect that a value of codebookSubset that is higher layer signaling is configured to be fullyAndPartialAndNonCoherent or partialAndNonCoherent. When nrofSRS-Ports in an SRS-ResourceSet that is higher layer signaling indicates two SRS antenna ports, the UE does not expect that a value of codebookSubset that is higher layer signaling is configured to be partialAndNonCoherent.

The UE may be configured with one SRS resource set with a value of the usage in the SRS-ResourceSet that is higher layer signaling being configured to 'codebook', and one SRS resource in the SRS resource set may be indicated by the SRI. If several SRS resources are configured in the SRS resource set in which a value of the usage in the SRS-ResourceSet that is higher layer signaling is configured to codebook, the UE expects that nrofSRS-Ports in SRS-Resource that is higher layer signaling is configured to have the same value for all SRS resources.

The UE transmits, to the BS, one or multiple SRS resources included in the SRS resource set with a value of the usage configured to codebook by higher layer signaling, and the BS selects one of the SRS resources transmitted from the UE and indicates the UE to perform PUSCH transmission by using transmission beam information of the SRS resource. Here, for the codebook based PUSCH transmission, the SRI is used as information for selecting an index of the one SRS resource and is included in DCI. In addition, the BS may add, to the DCI, information indicating a TPMI and a rank to be used by the UE for PUSCH transmission. The UE performs, by using the SRS resource indicated by the SRI, PUSCH transmission by applying the precoder indicated by the rank and the TPMI indicated based on the transmission beam of the SRS resource.

Non-codebook based PUSCH transmission is now described. Non-codebook based PUSCH transmission may be dynamically scheduled by DCI format 0_0 or 0_1, or semi-statically operated by the configured grant. When at least one SRS resource in an SRS resource set in which a value of the usage in SRS-ResourceSet that is higher layer signaling is configured to nonCodebook is configured, the UE may be scheduled for non-codebook based PUSCH transmission by DCI format 0_1.

For the SRS resource set with a value of the usage in SRS-ResourceSet that is higher layer signaling being configured to nonCodebook, the UE may be configured with one non-zero power CSI-RS (NZP CSI-RS) resource associated with the SRS resource set. The UE may perform calculation on a precoder for SRS transmission by measuring the NZP CSI-RS resource associated with the SRS resource set. If a difference between a last reception symbol of an aperiodic NZP CSI-RS resource associated with the SRS resource set and a first symbol of aperiodic SRS transmission from the UE is less than 42 symbols, the UE does not expect that information about the precoder for SRS transmission is to be updated.

When a value of resourceType in SRS-ResourceSet that is higher layer signaling is configured to aperiodic, the NZP CSI-RS associated with the SRS resource set is indicated by the field SRS request in DCI format 0_1 or 1_1. Here, when the associated NZP CSI-RS resource is an aperiodic NZP CSI-RS resource, it indicates existence of an NZP CSI-RS associated for a case where the value of the field SRS request in DCI format 0_1 or 1_1 is not 00. Here, the DCI shall not indicate cross carrier or cross BWP scheduling. Also, if the value of the SRS request indicates the existence of the NZP CSI-RS, the NZP CSI-RS is located in a slot in which a PDCCH including the SRS request field is transmitted. Here, TCI states configured for a scheduled subcarrier are not configured to QCL-TypeD.

If a periodic or semi-persistent SRS resource set is configured, an NZP CSI-RS associated with the SRS resource set may be indicated by associatedCSI-RS in SRS-ResourceSet that is higher layer signaling. For non-codebook based transmission, the UE does not expect both the spatialRelationInfo that is higher layer signaling for an SRS resource and associatedCSI-RS in the SRS-ResourceSet that is higher layer signaling to be configured.

When the UE is configured with a plurality of SRS resources, the UE may determine a precoder and a transmission rank to be applied to PUSCH transmission, based on the SRI indicated by the BS. Here, the SRI may be indicated by an SRS resource indicator that is a field in DCI or may be configured by srs-ResourceIndicator that is higher layer signaling. Likewise, in regard to the codebook based PUSCH transmission, when the UE is provided the SRI by DCI, an SRS resource indicated by the SRI refers to an SRS resource corresponding to the SRI among SRS resources transmitted before the PDCCH including the SRI. The UE may use one or more SRS resources in SRS transmission, and a maximum number of SRS resources available for simultaneous transmission on the same symbol in one SRS resource set and a maximum number of SRS resources are determined based on UE capability reported by the UE to the BS. In this case, the SRS resources that are simultaneously transmitted by the UE occupy a same RB. The UE configures one SRS port for each SRS resource. Only one SRS resource set with a value of the usage in SRS-ResourceSet that is higher layer signaling is configured to nonCodebook may be configured, and maximally up to four SRS resources for non-codebook based PUSCH transmission may be configured.

The BS transmits one NZP-CSI-RS associated with the SRS resource set to the UE, and the UE calculates a precoder to be used in transmission of one or more SRS resources in the SRS resource set, based on a result of measurement performed in reception of the NZP_CSI-RS. The UE applies the calculated precoder to transmit, to the BS, one or more SRS resources in the SRS resource set with the usage configured to nonCodebook, and the BS selects one or more SRS resources from among the received one or more SRS resources. Here, for the non-codebook based PUSCH transmission, the SRI may indicate an index that can represent a combination of one or more SRS resources, and may be included in DCI. Here, the number of SRS resources indicated by the SRI transmitted from the BS may be the number of transmission layers of the PUSCH, and the UE transmits the PUSCH by applying, to each layer, the precoder applied to SRS resource transmission.

PUSCH: Preparation Procedure Time

Hereinafter, a PUSCH preparation procedure time will now be described. When the BS schedules the UE to transmit a PUSCH by using DCI format 0_0, 0_1 or 0-2, the UE may need a PUSCH preparation procedure time to transmit the PUSCH by applying a transmission method (at least one of an SRS resource transmission precoding method, the number of transmission layers, or a spatial domain transmission filter) indicated by DCI. In consideration of information above, NR defines a PUSCH preparation procedure time. The PUSCH preparation procedure time of the UE may be calculated using Equation (2), below.

$$T_{proc,2} = \max((N_2 + d_{2,1} + d_2)(2048 + 144)\kappa 2^{-\mu} T_c + T_{ext} + T_{switch}, d_{2,2}) \quad (2),$$

in Equation (2):

$N_2$: is the number of symbols determined according to UE processing capability 1 or 2 and numerology $\mu$. When UE processing capability of 1 is reported in a UE capability report, it may have a value based on Table 13, below, and when UE processing capability of 2 is reported in the UE capability report and when it is configured, by higher layer signaling, that the UE capability 2 is available, it may have a value based on Table 14, below.

TABLE 13

| $\mu$ | PUSCH preparation time $N_2$ [symbols] |
|---|---|
| 0 | 10 |
| 1 | 12 |
| 2 | 23 |
| 3 | 36 |

TABLE 14

| $\mu$ | PUSCH preparation time $N_2$ [symbols] |
|---|---|
| 0 | 5 |
| 1 | 5.5 |
| 2 | 11 for frequency range 1 |

$d_{2,1}$: may indicate the number of symbols which is determined to be 0 when resource elements of the first OFDM symbol are all configured to consist of DMRSs, or 1 otherwise.

$\kappa$: 64

$\mu$: follows a value of $\mu_{DL}$ or $\mu_{UL}$ which makes $T_{proc,2}$ larger. $\mu_{DL}$ refers to numerology of a DL in which a PDCCH including DCI that schedules the PUSCH is transmitted, and $\mu_{UL}$ refers to numerology of a UL in which the PUSCH is transmitted.

$T_c$: may have a value of $1/(\Delta f_{max} \cdot N_f)$, where $\Delta f_{max} = 480 \times 10^3$ Hz, $N_f = 4096$.

$d_{2,2}$: may follow a BWP switching time when the DCI that schedules the PUSCH indicates BWP switching, or may otherwise have a 0 value.

$d_2$: When OFDM symbols of a PUCCH, a PUSCH having a high priority index and a PUCCH having a low priority index overlap on the time domain, a $d_2$ value of the PUSCH having the high priority index is used. Otherwise, $d_2$ is 0.

$T_{ext}$: When the UE uses a shared spectrum channel access scheme, the UE may calculate $T_{ext}$ and may apply $T_{ext}$ to the PUSCH preparation procedure time. Otherwise, $T_{ext}$ is assumed to be 0.

$T_{switch}$: When a UL switching interval is triggered, $T_{switch}$ is assumed as a switching interval time. Otherwise, $T_{switch}$ is assumed to be 0.

In consideration of time-axis resource mapping information of the PUSCH scheduled by the DCI and an impact of timing advance between the UL and the DL, the BS and the UE determines that the PUSCH preparation procedure time is not sufficient when a first symbol of the PUSCH starts before a first UL symbol on which CP starts after $T_{proc,2}$ from a last symbol of the PDCCH including the DCI that schedules the PUSCH. Otherwise, the BS and the UE determines that the PUSCH preparation procedure time is sufficient. Only when the PUSCH preparation procedure time is sufficient, the UE may transmit the PUSCH, and when the PUSCH preparation procedure time is not sufficient, the UE may ignore the DCI that schedules the PUSCH.

PUSCH: Multiplexing Rule in AP/SP CSI Reporting

A method of measuring and reporting a channel state in the 5G communication system is now described. CSI may include at least one channel quality information (CQI), precoding matric indicator (PMI), CSI-RS resource indicator (CRI), SS/PBCH block resource indicator (SSBRI), layer indicator (LI), rank indicator (RI), L1-reference signal received power (L1-RSRP), or the like. The BS may control time and frequency resource for the CSI measurement and reporting by the UE.

For the CSI measurement and reporting, the UE may be configured, by higher layer signaling, setting information for N(≥1) CSI report setting (CSI-ReportConfig), setting information for M(≥1) RS transmission resources (CSI-ResourceConfig), one or two trigger state (CSI-AperiodicTriggerStateList, CSI-SemiPersistentOnPUSCH-TriggerStateList) list information. The configuration information for the CSI measurement and reporting may be as shown in Tables 15 to 21, below.

TABLE 15

CSI-ReportConfig
The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.
    CSI-ReportConfig information element
-- ASN1START TABLE 15-continued

```
-- TAG-CSI-REPORTCONFIG-START
CSI-ReportConfig ::=                              SEQUENCE {
    reportConfigId                                    CSI-ReportConfigId,
    carrier                                           ServCellIndex
OPTIONAL,   -- Need S
    resourcesForChannelMeasurement                    CSI-ResourceConfigId,
    csi-IM-ResourcesForInterference                   CSI-ResourceConfigId
OPTIONAL,   -- Need R
    nzp-CSI-RS-ResourcesForInterference               CSI-ResourceConfigId
OPTIONAL,   -- Need R
    reportConfigType                                  CHOICE {
        periodic                                          SEQUENCE {
            reportSlotConfig                                  CSI-
ReportPeriodicityAndOffset,
            pucch-CSI-ResourceList                            SEQUENCE (SIZE
(1..maxNrofBWPs)) OF PUCCH-CSI-Resource
        },
        semiPersistentOnPUCCH                             SEQUENCE {
            reportSlotConfig                                  CSI-
ReportPeriodicityAndOffset,
            pucch-CSI-ResourceList                            SEQUENCE (SIZE
(1..maxNrofBWPs)) OF PUCCH-CSI-Resource
        },
        semiPersistentOnPUSCH                             SEQUENCE {
            reportSlotConfig                                  ENUMERATED {sl5, sl10, sl20,
sl40, sl80, sl160, sl320},
            reportSlotOffsetList                          SEQUENCE (SIZE (1.. maxNrofUL-
Allocations)) OF INTEGER(0..32),
            p0alpha                                           P0-PUSCH-AlphaSetId
        },
        aperiodic                                         SEQUENCE {
            reportSlotOffsetList                          SEQUENCE (SIZE (1..maxNrofUL-
Allocations)) OF INTEGER(0..32)
        }
    },
    reportQuantity                                    CHOICE {
        none                                              NULL,
        cri-RI-PMI-CQI                                    NULL,
        cri-RI-i1                                         NULL,
        cri-RI-i1-CQI                                     SEQUENCE {
            pdsch-BundleSizeForCSI                            ENUMERATED {n2, n4}
OPTIONAL   -- Need S
        },
        cri-RI-CQI                                        NULL,
        cri-RSRP                                          NULL,
        ssb-Index-RSRP                                    NULL,
        cri-RI-LI-PMI-CQI                                 NULL
    },
    reportFreqConfiguration                           SEQUENCE {
        cqi-FormatIndicator                               ENUMERATED { widebandCQI,
subbandCQI }                                      OPTIONAL,   -- Need R
        pmi-FormatIndicator                               ENUMERATED { widebandPMI,
subbandPMI }                                      OPTIONAL,   -- Need R
        csi-ReportingBand                                 CHOICE {
            subbands3                                         BIT STRING(SIZE(3)),
            subbands4                                         BIT STRING(SIZE(4)),
            subbands5                                         BIT STRING(SIZE(5)),
            subbands6                                         BIT STRING(SIZE(6)),
            subbands7                                         BIT STRING(SIZE(7)),
            subbands8                                         BIT STRING(SIZE(8)),
            subbands9                                         BIT STRING(SIZE(9)),
            subbands10                                        BIT STRING(SIZE(10)),
            subbands11                                        BIT STRING(SIZE(11)),
            subbands12                                        BIT STRING(SIZE(12)),
            subbands13                                        BIT STRING(SIZE(13)),
            subbands14                                        BIT STRING(SIZE(14)),
            subbands15                                        BIT STRING(SIZE(15)),
            subbands16                                        BIT STRING(SIZE(16)),
            subbands17                                        BIT STRING(SIZE(17)),
            subbands18                                        BIT STRING(SIZE(18)),
            ...,
            subbands19-v1530                                  BIT STRING(SIZE(19))
        }   OPTIONAL   -- Need S
    }
OPTIONAL,   -- Need R
    timeRestrictionForChannelMeasurements             ENUMERATED {configured,
notConfigured},
    timeRestrictionForInterferenceMeasurements        ENUMERATED {configured,
notConfigured},
    codebookConfig                                    CodebookConfig
```

TABLE 15-continued

```
OPTIONAL,   -- Need R
  dummy                                      ENUMERATED {n1, n2}
OPTIONAL,   -- Need R
  groupBasedBeamReporting                    CHOICE {
    enabled                                    NULL,
    disabled                                   SEQUENCE {
      nrofReportedRS                             ENUMERATED {n1, n2, n3,
n4}                                  OPTIONAL   -- Need S
    }
  },
  cqi-Table                                  ENUMERATED {table1, table2, table3, spare1}
OPTIONAL,   -- Need R
  subbandSize                                ENUMERATED {value1, value2},
  non-PMI-PortIndication                     SEQUENCE (SIZE (1..maxNrofNZP-CSI-RS-
ResourcesPerConfig)) OF PortIndexFor8Ranks OPTIONAL,   -- Need R
  ...,
  [[
  semiPersistentOnPUSCH-v1530                SEQUENCE {
    reportSlotConfig-v1530                     ENUMERATED {sl4, sl8, sl16}
  }
OPTIONAL   -- Need R
  ]],
  [[
  semiPersistentOnPUSCH-v1610                SEQUENCE {
    reportSlotOffsetListDCI-0-2-r16            SEQUENCE (SIZE (1.. maxNrofUL-
Allocations-r16)) OF INTEGER(0..32)    OPTIONAL,   -- Need R
    reportSlotOffsetListDCI-0-1-r16            SEQUENCE (SIZE (1.. maxNrofUL-
Allocations-r16)) OF INTEGER(0..32)    OPTIONAL   -- Need R
  }
OPTIONAL,   -- Need R
  aperiodic-v1610                            SEQUENCE {
    reportSlotOffsetListDCI-0-2-r16            SEQUENCE (SIZE (1.. maxNrofUL-
Allocations-r16)) OF INTEGER(0..32)    OPTIONAL,   -- Need R
    reportSlotOffsetListDCI-0-1-r16            SEQUENCE (SIZE (1.. maxNrofUL-
Allocations-r16)) OF INTEGER(0..32)    OPTIONAL   -- Need R
  }
OPTIONAL,   -- Need R
  reportQuantity-r16                         CHOICE {
    cri-SINR-r16                               NULL,
    ssb-Index-SINR-r16                         NULL
  }
OPTIONAL,   -- Need R
  codebookConfig-r16                         CodebookConfig-r16
OPTIONAL   -- Need R
  ]]
}
CSI-ReportPeriodicityAndOffset ::=           CHOICE {
  slots4                                       INTEGER(0..3),
  slots5                                       INTEGER(0..4),
  slots8                                       INTEGER(0..7),
  slots10                                      INTEGER(0..9),
  slots16                                      INTEGER(0..15),
  slots20                                      INTEGER(0..19),
  slots40                                      INTEGER(0..39),
  slots80                                      INTEGER(0..79),
  slots160                                     INTEGER(0..159),
  slots320                                     INTEGER(0..319)
}
PUCCH-CSI-Resource ::=                       SEQUENCE {
  uplinkBandwidthPartId                        BWP-Id,
  pucch-Resource                               PUCCH-ResourceId
}
PortIndexFor8Ranks ::=                       CHOICE {
  portIndex8                                   SEQUENCE{
    rank1-8                                      PortIndex8
OPTIONAL,   -- Need R
    rank2-8                                      SEQUENCE(SIZE(2)) OF PortIndex8
OPTIONAL,   -- Need R
    rank3-8                                      SEQUENCE(SIZE(3)) OF PortIndex8
OPTIONAL,   -- Need R
    rank4-8                                      SEQUENCE(SIZE(4)) OF PortIndex8
OPTIONAL,   -- Need R
    rank5-8                                      SEQUENCE(SIZE(5)) OF PortIndex8
OPTIONAL,   -- Need R
    rank6-8                                      SEQUENCE(SIZE(6)) OF PortIndex8
OPTIONAL,   -- Need R
    rank7-8                                      SEQUENCE(SIZE(7)) OF PortIndex8
OPTIONAL,   -- Need R
    rank8-8                                      SEQUENCE(SIZE(8)) OF PortIndex8
OPTIONAL   -- Need R
```

TABLE 15-continued

```
    },
    portIndex4                          SEQUENCE{
        rank1-4                             PortIndex4
OPTIONAL,    -- Need R
        rank2-4                             SEQUENCE(SIZE(2)) OF PortIndex4
OPTIONAL,    -- Need R
        rank3-4                             SEQUENCE(SIZE(3)) OF PortIndex4
OPTIONAL,    -- Need R
        rank4-4                             SEQUENCE(SIZE(4)) OF PortIndex4
OPTIONAL     -- Need R
    },
    portIndex2                          SEQUENCE{
        rank1-2                             PortIndex2
OPTIONAL,    -- Need R
        rank2-2                             SEQUENCE(SIZE(2)) OF PortIndex2
OPTIONAL     -- Need R
    },
    portIndex1                          NULL
}
PortIndex8::=                           INTEGER (0..7)
PortIndex4::=                           INTEGER (0..3)
PortIndex2::=                           INTEGER (0..1)
-- TAG-CSI-REPORTCONFIG-STOP
-- ASN1STOP
```

| CSI-ReportConfig field descriptions |
|---|
| carrier |
| Indicates in which serving cell the CSI-ResourceConfig indicated below are to be found. If the field is absent, the resources are on the same serving cell as this report configuration. |
| codebookConfig |
| Codebook configuration for Type-1 or Type-2 including codebook subset restriction. Network does not configure codebookConfig and codebookConfig-r16 simultaneously to a UE |
| cqi-FormatIndicator |
| Indicates whether the UE shall report a single (wideband) or multiple (subband) CQI. (see TS 38.214 [19], clause 5.2.1.4). |
| cqi-Table |
| Which CQI table to use for CQI calculation (see TS 38.214 [19], clause 5.2.2.1). |
| csi-IM-ResourcesForInterference |
| CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement. |
| csi-ReportingBand |
| Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4). |
| dummy |
| This field is not used in the specification. If received it shall be ignored by the UE. |
| groupBasedBeamReporting |
| Turning on/off group beam based reporting (see TS 38.214 [19], clause 5.2.1.4). |
| non-PMI-PortIndication |
| Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2). |
| The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI- |

| CSI-ReportConfig field descriptions |
|---|
| ResourceConfig and so on.<br>nrofReportedRS<br>The number (N) of measured RS resources to be reported per report setting in a non-group-based report. N <= N_max, where N_max is either 2 or 4 depending on UE capability.<br>(see TS 38.214 [19], clause 5.2.1.4) When the field is absent the UE applies the value 1.<br>nzp-CSI-RS-ResourcesForInterference<br>NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.<br>p0alpha<br>Index of the p0-alpha set determining the power control for this CSI report transmission (see TS 38.214 [19], clause 6.2.1.2).<br>pdsch-BundleSizeForCSI<br>PRB bundling size to assume for CQI calculation when reportQuantity is CRI/RI/i1/CQI. If the field is absent, the UE assumes that no PRB bundling is applied (see TS 38.214 [19], clause 5.2.1.4.2).<br>pmi-FormatIndicator<br>Indicates whether the UE shall report a single (wideband) or multiple (subband) PMI. (see TS 38.214 [19], clause 5.2.1.4).<br>pucch-CSI-ResourceList<br>Indicates which PUCCH resource to use for reporting on PUCCH.<br>reportConfigType<br>Time domain behavior of reporting configuration.<br>reportFreqConfiguration<br>Reporting configuration in the frequency domain. (see TS 38.214 [19], clause 5.2.1.4).<br>reportQuantity<br>The CSI related quantities to report. see TS 38.214 [19], clause 5.2.1. If the field reportQuantity-r16 is present, UE shall ignore reportQuantity (without suffix).<br>reportSlotConfig<br>Periodicity and slot offset (see TS 38.214 [19], clause 5.2.1.4). If the field reportSlotConfig-v1530 is present, the UE shall ignore the value provided in reportSlotConfig (without suffix).<br>reportSlotOffsetList, reportSlotOffsetListDCI-0-1, reportSlotOffsetListDCI-0-2<br>Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n + Y, second report in n + Y + P, where P is the configured periodicity.<br>Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 6.1.2.1). The field reportSlotOffsetList applies to DCI format 0_0, the field reportSlotOffsetListDCI-0-1 applies to DCI format 0_1 and the field reportSlotOffsetListDCI-0-2 applies to DCI format 0_2 (see TS 38.214 [19], clause 6.1.2.1).<br>resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.<br>subbandSize<br>Indicates one out of two possible BWP-dependent values for the subband size as indicated in TS 38.214 [19], table 5.2.1.4-2. If csi-ReportingBand is absent, the UE shall ignore this field.<br>timeRestrictionForChannelMeasurements<br>Time domain measurement restriction for the channel (signal) measurements (see TS 38.214 [19], clause 5.2.1.1).<br>timeRestrictionForInterferenceMeasurements<br>Time domain measurement restriction for interference measurements (see TS 38.214 [19], clause 5.2.1.1). |

TABLE 16

CSI-ResourceConfig
The IE CSI-ResourceConfig defines a group of one or more NZP-CSI-RS-ResourceSet,
CSI-IM-ResourceSet and/or CSI-SSB-ResourceSet.
                CSI-ResourceConfig information element
-- ASN1START
-- TAG-CSI-RESOURCECONFIG-START
CSI-ResourceConfig             SEQUENCE {
  csi-ResourceConfigId         CSI-ResourceConfigId,
  csi-RS-ResourceSetList       CHOICE {
    nzp-CSI-RS-SSB           SEQUENCE {
      nzp-CSI-RS-ResourceSetList   SEQUENCE (SIZE (1..maxNrofNZP-CSI-
RS-ResourceSetsPerConfig)) OF NZP-CSI-RS-ResourceSetId
OPTIONAL, -- Need R
      csi-SSB-ResourceSetList     SEQUENCE (SIZE (1..maxNrofCSI-SSB-
ResourceSetsPerConfig)) OF CSI-SSB-ResourceSetId OPTIONAL  -- Need R
    },
    csi-IM-ResourceSetList       SEQUENCE (SIZE (1..maxNrofCSI-IM-
ResourceSetsPerConfig)) OF CSI-IM-ResourceSetId
  },
  bwp-Id                     BWP-Id,
  resourceType              ENUMERATED { aperiodic, semiPersisient,
periodic },
  ...
}
-- TAG-CSI-RESOURCECONFIG-STOP
-- ASN1STOP CSI-ResourceConfig field descriptions bwp-Id
The DL BWP which the CSI-RS associated with this CSI-ResourceConfig are located
in (see TS 38.214 [19], clause 5.2.1.2.
csi-IM-ResourceSetList
List of references to CSI-IM resources used for beam measurement and reporting in a
CSI-RS resource set. Contains up to maxNrofCSI-IM-ResourceSetsPerConfig
resource sets if resourceType is 'aperiodic' and 1 otherwise (see TS 38.214 [19],
clause 5.2.1.2).
csi-ResourceConfigId
Used in CSI-ReportConfig to refer to an instance of CSI-ResourceConfig.
csi-SSB-ResourceSetList
List of references to SSB resources used for beam measurement and reporting in a
CSI-RS resource set (see TS 38.214 [19], clause 5.2.1.2).
nzp-CSI-RS-ResourceSetList
List of references to NZP CSI-RS resources used for beam measurement and
reporting in a CSI-RS resource set. Contains up to maxNrofNZP-CSI-RS-
ResourceSetsPerConfig resource sets if resourceType is 'aperiodic' and 1 otherwise
(see TS 38.214 [19], clause 5.2.1.2).
resourceType
Time domain behavior of resource configuration (see TS 38.214 [19], clause 5.2.1.2). It
does not apply to resources provided in the csi-SSB-ResourceSetList.

TABLE 17

NZP-CSI-RS-ResourceSet
The IE NZP-CSI-RS-ResourceSet is a set of Non-Zero-Power (NZP) CSI-RS resources
(their IDs) and set-specific parameters.
            NZP-CSI-RS-ResourceSet information element
-- ASN1START
-- TAG-NZP-CSI-RS-RESOURCESET-START
NZP-CSI-RS-ResourceSet ::=      SEQUENCE {
  nzp-CSI-ResourceSetId          NZP-CSI-RS-ResourceSetId,
  nzp-CSI-RS-Resources           SEQUENCE (SIZE (1..maxNrofNZP-CSI-
RS-ResourcesPerSet)) OF NZP-CSI-RS-ResourceId,
  repetition                    ENUMERATED { on, off }
OPTIONAL,  -- Need S
  aperiodicTriggeringOffset       INTEGER(0..6)
OPTIONAL,  -- Need S
  trs-Info                    ENUMERATED {true}
OPTIONAL,  -- Need R
  ..., TABLE 17-continued

```
[[
aperiodicTriggeringOffset-r16    INTEGER(0..31)
OPTIONAL    -- Need S
]]
}
-- TAG-NZP-CSI-RS-RESOURCESET-STOP
-- ASN1STOP
```

NZP-CSI-RS-ResourceSet field descriptions aperiodicTriggeringOffset, aperiodicTriggeringOffset-r16
Offset X between the slot containing the DCI that triggers a set of aperiodic NZP CSI-RS resources and the slot in which the CSI-RS resource set is transmitted. For aperiodicTriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set.
repetition
Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or "no report".
trs-Info
Indicates that the antenna port for all NZP-CSI-RS resources in the CSI-RS resource set is same. If the field is absent or released the UE applies the value false (see TS 38.214 [19], clause 5.2.2.3.1).

TABLE 18

CSI-SSB-ResourceSet
The IE CSI-SSB-ResourceSet is used to configure one SS/PBCH block resource set which refers to SS/PBCH as indicated in ServingCellConfigCommon.
CSI-SSB-ResourceSet information element

```
-- ASN1START
-- TAG-CSI-SSB-RESOURCESET-START
CSI-SSB-ResourceSet ::=    SEQUENCE {
    csi-SSB-ResourceSetId    ,
    csi-SSB-ResourceList        SEQUENCE (SIZE(1..maxNrofCSI-SSB-ResourcePerSet)) OF SSB-Index,
    ...
}
-- TAG-CSI-SSB-RESOURCESET-STOP
-- ASN1STOP
```

TABLE 19

CSI-IM-ResourceSet
The IE CSI-IM-ResourceSet is used to configure a set of one or more CSI Interference Management (IM) resources (their IDs) and set-specific parameters.
CSI-IM-ResourceSet information element

```
-- ASN1START
-- TAG-CSI-IM-RESOURCESET-START
CSI-IM-ResourceSet ::=    SEQUENCE {
    csi-IM-ResourceSetId    CSI-IM-ResourceSetId,
    csi-IM-Resources        SEQUENCE (SiZE(1..maxNrofCSI-IM-ResourcesPerSet)) OF CSI-IM-ResourceId,
    ...
}
-- TAG-CSI-IM-RESOURCESET-STOP
-- ASN1STOP
```

CSI-IM-ResourceSet field descriptions csi-IM-Resources
CSI-IM-Resources associated with this CSI-IM-ResourceSet (see TS 38.214 [19], clause 5.2)

TABLE 20

CSI-AperiodicTriggerStateList
The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
CSI-AperiodicTriggerStateList information element

```
-- ASN1START
-- TAG-CSI-APERIODICTRIGGERSTATELIST-START
CSI-AperiodicTriggerStateList ::=    SEQUENCE (SIZE (1..maxNrOfCSI-
AperiodicTriggers)) OF CSI-AperiodicTriggerState
CSI-AperiodicTriggerState ::=        SEQUENCE {
    associatedReportConfigInfoList   SEQUENCE
(SIZE(1..maxNrofReportConfigPerAperiodicTrigger)) OF CSI-
AssociatedReportConfigInfo,
    ...
}
CSI-AssociatedReportConfigInfo ::=   SEQUENCE {
    reportConfigId                   CSI-ReportCortfigId,
    resourcesForChannel              CHOICE {
        nzp-CSI-RS                       SEQUENCE {
            resourceSet                      INTEGER (1..maxNrofNZP-CSI-
RS-ResourceSetsPerConfig),
            qcl-info                         SEQUENCE (SIZE(1..maxNrofAP-
CSI-RS-ResourcesPerSet)) OF TCI-StateId OPTIONAL -- Cond Aperiodic
        },
        csi-SSB-ResourceSet              INTEGER (1..maxNrofCSI-SSB-
ResourceSetsPerConfig)
    },
    csi-IM-ResourcesForInterference      INTEGER(1..maxNrofCSI-IM-
ResourceSetsPerConfig)               OPTIONAL, -- Cond CSI-IM-ForInterference
    nzp-CSI-RS-ResourcesForInterference INTEGER (1..maxNrofNZP-CSI-RS-
ResourceSetsPerConfig)               OPTIONAL, -- Cond NZP-CSI-RS-ForInterference
    ...
}
-- TAG-CSI-APERIODICTRIGGERSTATELIST-STOP
-- ASN1STOP
```

35

CSI-AssociatedReportConfigInfo field descriptions csi-IM-ResourcesForInterference
CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
nzp-CSI-RS-ResourcesForInterference
NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).
qcl-info
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig -continued

| CSI-AssociatedReportConfigInfo field descriptions |
| --- |
| resourceSet<br>NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to the second entry, and so on). |

| Conditional Presence | Explanation |
| --- | --- |
| Aperiodic | The field is mandatory present if the MZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise, it is absent. |
| NZP-CSI-RS-ForInterference | This field is optional need M if the CSI-ReportConfig identified by reportConfigId is configured with nzp-CSI-RS-ResourcesForInterference; otherwise, it is absent. |

TABLE 21

CSI-SemiPersistentOnPUSCH-TriggerStateList
The CSI-SemiPersistentOnPUSCH-TriggerStateList IE is used to configure the UE with list of trigger states for semi-persistent reporting of channel state information on L1. See also TS 38.214 [19], clause 5.2.
CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList ::=         SEQUENCE(SIZE
(1..maxNrOfSemiPersistentPUSCH-Triggers)) OF CSI-SemiPersistentOnPUSCH-
TriggerState
CSI-SemiPersistentOnPUSCH-TriggerState ::=         SEQUENCE {
    associatedReportConfigInfo              CSI-ReportConfigId,
    ...
}
-- TAG-CSI-SEMIPERSISTENTONPUSCHTRIGGERSTATELIST-STOP
-- ASN1STOP
```

Regarding the aforementioned CSI report setting (CSI-ReportConfig), each report setting may be associated with at least one of CSI resource setting associated with corresponding report setting or one DL BWP identified by a higher layer parameter bwp-id given by CSI-ResourceConfig. As a time-domain reporting operation with respect to each report setting, an aperiodic, semi-persistent, or periodic scheme may be supported, and the time-domain reporting operation may be configured from the BS for the UE by a reportConfigType parameter configured by a higher layer. A semi-persistent CSI reporting method supports a PUCCH-based semi-persistent (semi-PersistentOnPUCCH) reporting method or a PUSCH-based semi-persistent (semi-PersistentOnPUSCH) reporting method. According to the periodic or semi-persistent CSI reporting method, the UE may be configured, from the BS by higher layer signaling, with a PUCCH or PUSCH resource to transmit CSI. Periodicity and slot offset of the PUCCH or PUSCH resource to transmit CSI may be given by numerology of a UL BWP configured for transmission of a CSI report. According to the aperiodic CSI reporting method, the UE may receive, from the BS by L1 signaling (DCI format 0_1 described above), scheduling of a PUSCH resource to transmit CSI.

Regarding the CSI resource setting (CSI-ResourceConfig), each CSI resource setting (CSI-ReportConfig) may include S(≥1) CSI resource sets, given by higher layer parameter csi-RS-ResourceSetList. The CSI resource set may be configured of an NZP CSI-RS resource set and an SS/PBCH block set or may be configured of a CSI-interference measurement (CSI-IM) resource set. Each CSI resource setting may be located on a DL BWP identified by higher layer parameter bwp-id, and CSI resource setting may be associated with CSI report setting of the same DL BWP. A time-domain operation of a CSI-RS resource in the CSI resource setting may be configured to one of aperiodic, periodic or semi-persistent by higher layer parameter resourceType. For the periodic or semi-persistent CSI resource setting, the number of CSI-RS resource sets may be limited to S=1, and configured periodicity and slot offset may be given by numerology of the DL BWP identified by bwp-id. The UE may be configured, from the BS by higher layer signaling, with one or more CSI resource settings for channel or interference measurement, and for example, the CSI resource settings may include the CSI resources below.

CSI-IM resource for interference measurement

NZP CSI-RS resource for interference measurement

NZP CSI-RS resource for channel measurement

For CSI-RS resource sets associated with resource setting configured to aperiodic, periodic or semi-persistent by higher layer parameter resourceType, a trigger state with respect to CSI report setting in which reportType is configured to aperiodic and resource setting for channel or interference measurement of one or more component cells (CCs) may be configured by higher layer parameter CSI-AperiodicTriggerStateList.

The aperiodic CSI reporting by the UE may be performed by using a PUSCH. The periodic CSI reporting by the UE may be performed by using a PUCCH. Also, when the semi-persistent CSI reporting is triggered or activated by DCI, the semi-persistent CSI reporting by the UE may be performed by using a PUSCH, and after the semi-persistent CSI reporting is activated by a MAC CE, the semi-persistent CSI reporting may be performed by using a PUCCH. As described above, CSI resource setting may also be configured to aperiodic, periodic or semi-persistent. Combinations of the CSI report setting and the CSI resource setting may be supported based on Table 22, below.

TABLE 22

Table 5.2.1.4-1: Triggering/Activation of CSI
Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI reporting may be triggered by a CSI request field of the aforementioned DCI format 0_1 corresponding to scheduling DCI with respect to a PUSCH. The UE may monitor a PDCCH, may obtain the DCI format 0_1, and may obtain scheduling information with respect to a PUSCH and a CSI request indicator. The CSI request indicator may be configured with NTS (=0, 1, 2, 3, 4, 5, or 6) bits, and may be determined by higher layer signaling (reportTriggerSize). One trigger state from among one or more aperiodic CSI report trigger states configurable by higher layer signaling (CSI-AperiodicTriggerStateList) may be triggered by the CSI request indicator.

When all bits of the CSI request field are 0, this may indicate that a CSI report is not requested.

If a number (M) of CSI trigger states in configured CSI-AperiodicTriggerStateList is greater than $2^{NTs}-1$, M CSI trigger states may be mapped to $2^{NTs}-1$ according to a predefined mapping relation, and one trigger state from among $2^{NTs}-1$ CSI trigger states may be indicated by the CSI request field.

If a number (M) of CSI trigger states in configured CSI-AperiodicTriggerStateList is equal to or smaller than $2^{NTs}-1$, one of M CSI trigger states may be indicated by the CSI request field.

Table 23, below, provides an example of a relation between a CSI request indicator and a CSI trigger state indicative by the CSI request indicator.

TABLE 23

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may perform measurement on a CSI resource in the CSI trigger state triggered by the CSI request field, and may generate CSI (including at least one of CQI, PMI, CRI, SSBRI, LI, RI, or L1-RSRP described above) from a result of the measurement. The UE may transmit the generated CSI by using the PUSCH scheduled by the corresponding DCI format 0_1. When one bit corresponding to a UL data indicator (UL-SCH indicator) in the DCI format 0_1 indicates 1, the UE may multiplex UL data (UL-SCH) and the obtained CSI with a PUSCH resource scheduled by the DCI format 0_1 and may transmit it. When one bit corresponding to a UL data indicator (UL-SCH indicator) in the DCI format 0_1 indicates 0, the UE may map only the CSI to a PUSCH resource scheduled by the DCI format 0_1, without UL data (UL-SCH), and may transmit it.

Figure 8:
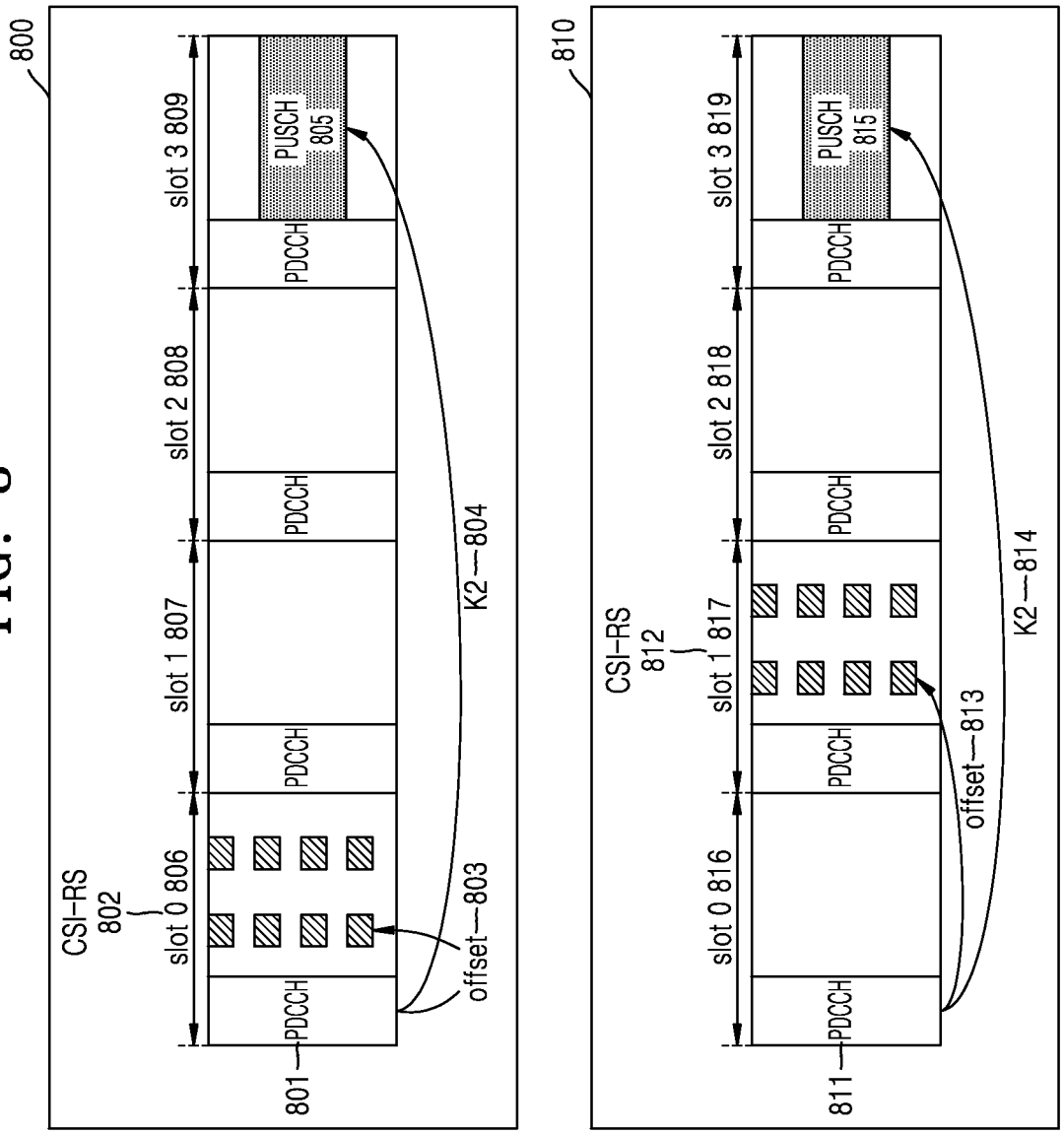
FIG. 8 illustrates examples of an aperiodic CSI reporting method according to an embodiment.

FIG. 8 illustrates examples 800 and 810 of an aperiodic CSI reporting method according to an embodiment.

In example 800 of FIG. 8, the UE may obtain DCI format 01 by monitoring a PDCCH 801, and may obtain, from the DCI format 0_1, scheduling information with respect to a PUSCH 805 and CSI request information. The UE may obtain, from the received CSI request indicator, resource information with respect to a CSI-RS 802 to be measured. The UE may determine at what time point to measure transmitted CSI-RS 802, based on a time point of reception of the DCI format 0_1 and a parameter (aforementioned aperiodicTriggeringOffset) with respect to offset in CSI resource set configuration (e.g., NZP CSI-RS resource set configuration (NZP-CSI-RS-ResourceSet)). The UE may be configured, from the BS by higher layer signaling, with an offset value X of parameter aperiodicTriggeringOffset in NZP-CSI-RS resource set configuration, and the configured offset value X may indicate offset between a slot in which DCI to trigger an aperiodic CSI report is received and a slot in which a CSI-RS resource is to be transmitted. For example, a value of the parameter aperiodicTriggeringOffset and the offset value X may have mapping relations described in Table 24, below.

TABLE 24

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In example 800 of FIG. 8, the offset value 803 is configured as X=0. In this case, the UE may receive a CSI-RS 802 in a slot (corresponding to a slot 0 806 of FIG. 8) in which the DCI format 0_1 triggering the aperiodic CSI report is received, and may report CSI information on a PUSCH 805 to the BS, the CSI information being measured by using the received CSI-RS 802. The UE may obtain, from the DCI format 0_1, scheduling information (a plurality of pieces of information respectively corresponding to fields of the DCI format 0_1) with respect to the PUSCH 805 for a CSI report. For example, the UE may obtain information about a slot in which the PUSCH 805 is to be transmitted, from time-domain resource allocation information of the DCI format 0_1 with respect to the PUSCH 805. In example 800 of FIG. 8, the UE may obtain a value of 3 as a K2 value 804 corresponding to a slot offset value for PDCCH-to-PUSCH, and thus, the PUSCH 805 may be transmitted in a slot 3 809 that is distant, by 3 slots, from the slot 0 806, but not slot 1 807 or slot 2 808, with the slot 0 806 being a slot in which the PDCCH 801 is received.

In example 810 of FIG. 8, the UE may obtain DCI format 0_1 by monitoring a PDCCH 811, and may obtain, from the DCI format 0_1, scheduling information with respect to a PUSCH 815 and CSI information. The UE may obtain, from a received CSI request indicator, resource information with respect to a CSI-RS 812 to be measured. In example 810 of FIG. 8, the aforementioned offset value 813 for CSI-RS is configured as X=1. In this case, the UE may receive the CSI-RS 812 in a slot (slot 1 817 of FIG. 8) subsequent to a slot (slot 0 816 of FIG. 8) in which the DCI format 0_1 triggering an aperiodic CSI report is received, and may report, to the BS via the PUSCH 815, CSI information measured by using a received CSI-RS. In example 810 of FIG. 8, the UE may obtain a value of 3 as a K2 value 814 corresponding to a slot offset value for PDCCH-to-PUSCH, and thus, the PUSCH 815 may be transmitted in a slot 3 819 that is distant, by 3 slots, from the slot 0 816, but not slot 1 817 or slot 2 818.

The aperiodic CSI report may include at least one of CSI part 1 or CSI part 2 or both CSI part 1 and CSI part 2, and when the aperiodic CSI report is to be transmitted on a PUSCH, the aperiodic CSI report and a transport block may be multiplexed. For the multiplexing, a CRC may be inserted into an input bit of an aperiodic CSI, and then encoding and rate matching may be performed on the input bit with the CRC inserted thereto. The input bit after the rate matching may be mapped with a particular pattern to a resource element in a PUSCH and transmitted. The CRC insertion may be omitted depending on a coding method or a length of input bit(s).

In PUSCH repetitive transmission types A and B, the UE may multiplex and transmit the aperiodic CSI report only in first repetitive transmission from among PUSCH repetitive transmissions. The aperiodic CSI report information to be multiplexed is encoded by using a polar code scheme. Here, in order to multiplex the aperiodic CSI report information for multiple PUSCH repetitions, each of the PUSCH repetitions has to have the same frequency and time resource allocation. In particular, in a case of the PUSCH repetitive transmission type B, each actual repetition may have a different OFDM symbol length. Thus, the aperiodic CSI report may be multiplexed and transmitted only in first PUSCH repetition.

Also, for the PUSCH repetitive transmission type B, in a case where the UE receives DCI to schedule the aperiodic CSI report or to activate a semi-persistent CSI report without scheduling of a transport block, even when the number of PUSCH repetitive transmissions configured by higher layer signaling is greater than 1, the UE may assume a value of nominal repetition as 1. Also, when the aperiodic or semi-persistent CSI report is scheduled or activated without scheduling of a transport block based on the PUSCH repetitive transmission type B, the UE may expect that first nominal repetition is the same as first actual repetition. For a PUSCH being transmitted while including semi-persistent CSI based on the PUSCH repetitive transmission type B without scheduling of DCI after the semi-persistent CSI report is activated by DCI, if first nominal repetition is different from first actual repetition, transmission with respect to the first nominal repetition may be ignored.

Associated with SRS

A UL channel estimation method using sounding reference signal (SRS) transmission of the UE is now described. The BS may configure the UE with at least one SRS configuration for each UL BWP so as to transmit configuration information for SRS transmission, and may configure the UE with at least one SRS resource set for each SRS configuration. For example, the BS and the UE may exchange higher layer signaling information to deliver information about the SRS resource set.

- srs-ResourceSetId: SRS resource set index
- srs-ResourceIdList: a set of SRS resource indexes referred to from the SRS resource set
- resourceType: time-axis transmission configuration of an SRS resource referred to from the SRS resource set, which may be configured to one of periodic, semi-persistent, and aperiodic. If resourceType is configured to periodic or semi-persistent, associated CSI-RS information may be provided according to the usage of the SRS resource set. If resourceType is configured to aperiodic, an aperiodic SRS resource trigger list and slot offset information may be provided, and associated CSI-RS information may be provided according to the usage of the SRS resource set.
- usage: configuration of the usage of an SRS resource referred to from the SRS resource set, which may be configured to one of beamManagement, codebook, nonCodebook, or antennaSwitching.
- alpha, p0, pathlossReferenceRS, srs-PowerControlAdjustmentStates: provides parameter configuration for transmit power control for an SRS resource referred to from the SRS resource set.

The UE may determine that an SRS resource included in a set of SRS resource indexes referred to from the SRS resource set follows information configured for the SRS resource set.

Also, the BS and the UE may transmit or receive higher layer signaling information for delivering individual configuration information for an SRS resource. For example, the individual configuration information for the SRS resource may include time-frequency axis mapping information in a slot of the SRS resource, and the time-frequency axis mapping information may include information about intraslot or inter-slot frequency hopping of the SRS resource. Furthermore, the individual configuration information for the SRS resource may include time-axis transmission configuration for the SRS resource, which may be configured to one of periodic, semi-persistent, or aperiodic. This may be limited to having the same time-axis transmission configuration as the SRS resource set including the SRS resource. When the time-axis transmission configuration for the SRS resource is configured to periodic or semi-persistent, additional SRS resource transmission periodicity and slot offset (e.g., periodicityAndOffset) may be included in the time-axis transmission configuration.

The BS may activate or deactivate, or trigger SRS transmission to the UE by higher layer signaling including RRC signaling or MAC CE signaling, or L1 signaling (e.g., DCI). For example, the BS may activate or deactivate periodic SRS transmission to the UE by higher layer signaling. The BS may indicate activation of an SRS resource set for which resourceType is configured to periodic by higher layer signaling, and the UE may transmit an SRS resource referred to from the activated SRS resource set. Time-frequency axis resource mapping of the SRS resource to be transmitted in a slot follows resource mapping information configured for the SRS resource, and slot mapping including transmission periodicity and slot offset follows periodicityAndOffset configured for the SRS resource. Further, a spatial domain transmission filter applied to the SRS resource to be transmitted may refer to spatial relation info configured for the SRS resource, or may refer to associated CSI-RS information configured for the SRS resource set including the SRS resource. The UE may transmit the SRS resource in a UL BWP activated for the periodic SRS resource activated by higher layer signaling.

For example, the BS may activate or deactivate semi-persistent SRS transmission to the UE by higher layer signaling. The BS may indicate activation of an SRS resource set by MAC CE signaling, and the UE may transmit an SRS resource referred to from the activated SRS resource set. The SRS resource set activated by MAC CE signaling may be limited to an SRS resource set for which the resourceType is configured to semi-persistent. Intra-slot time-frequency axis resource mapping of the SRS resource to be transmitted follows resource mapping information configured for the SRS resource, and slot mapping including transmission periodicity and slot offset follows periodicityAndOffset configured for the SRS resource. Also, a spatial domain transmission filter applied to the SRS resource to be transmitted may refer to spatial relation info configured for the SRS resource or may refer to associated CSI-RS information configured for the SRS resource set including the SRS resource. If spatial relation info is configured for the SRS resource, the spatial domain transmission filter may not follow the spatial relation info but may be determined by referring to configuration information about spatial relation info delivered by MAC CE signaling that activates semi-persistent SRS transmission. The UE may transmit the SRS resource in a UL BWP activated for the semi-persistent SRS resource activated by higher layer signaling.

For example, the BS may trigger aperiodic SRS transmission to the UE by DCI. The BS may indicate one of aperiodic SRS resource triggers (aperiodicSRS-Resource-Trigger) via an SRS request field of the DCI. The UE may identify that an SRS resource set including the aperiodic SRS resource trigger indicated by the DCI in an aperiodic SRS resource trigger list among configuration information of the SRS resource set has been triggered. The UE may transmit an SRS resource referred to from the triggered SRS resource set. Intra-slot time-frequency axis resource mapping of the SRS resource to be transmitted follows resource mapping information configured for the SRS resource. Also, slot mapping of the SRS resource to be transmitted may be determined by a slot offset between a PDCCH including the DCI and the SRS resource, and may be referred to value(s) included in a slot offset set configured for the SRS resource set. In more detail, for the slot offset between the PDCCH including the DCI and the SRS resource, a value indicated by a time domain resource assignment field of the DCI among offset value(s) included in the slot offset set configured for the SRS resource set may be applied. Further, a spatial domain transmission filter applied to the SRS resource to be transmitted may refer to spatial relation info configured for the SRS resource or may refer to associated CSI-RS information configured for the SRS resource set including the SRS resource. The UE may transmit the SRS resource in a UL BWP activated for the aperiodic SRS resource triggered by the DCI.

When the BS triggers aperiodic SRS transmission to the UE by DCI, a minimum time interval between a PDCCH including the DCI that triggers the aperiodic SRS transmission and an SRS to be transmitted may be required for the UE to transmit the SRS by applying configuration information for the SRS resource. The time interval for SRS transmission by the UE may be defined as a number of symbols between a last symbol of the PDCCH including the DCI that triggers the aperiodic SRS transmission and a first symbol to which an SRS resource to be initially transmitted among SRS resource(s) is mapped. The minimum time interval may be determined by referring to a PUSCH preparation procedure time required for the UE to prepare PUSCH transmission. Also, the minimum time interval may have a different value according to the usage of the SRS resource set including the SRS resource to be transmitted. For example, the minimum time interval may be determined to be N2 symbols defined by referring to a PUSCH preparation procedure time of the UE and considering a UE processing capability based on the UE capability. Also, when the usage of the SRS resource set is configured to codebook or antennaSwitching by considering the usage of the SRS resource set including the SRS resource to be transmitted, the minimum time interval may be determined to be N2 symbols, and when the usage of the SRS resource set is configured to nonCodebook or beamManagement, the minimum time interval may be determined to be N2+14 symbols. When the time interval for aperiodic SRS transmission is equal to or greater than the minimum time interval, the UE may transmit an aperiodic SRS, and when the time interval for aperiodic SRS transmission is smaller than the minimum time interval, the UE may ignore the DCI that triggers the a periodic SRS.

TABLE 25-1

| | |
|---|---|
| SRS-Resource ::= | SEQUENCE { |
| srs-ResourceId | SRS-ResourceId, |
| nrofSRS-Ports | ENUMERATED {port1, ports2, ports4}, |
| ptrs-PortIndex | ENUMERATED {n0, n1 } |

TABLE 25-1-continued

```
OPTIONAL,   -- Need R
   transmissionComb              CHOICE {
      n2                            SEQUENCE {
         combOffset-n2                  INTEGER (0..1),
         cyclicShift-n2                 INTEGER (0..7)
      },
      n4                            SEQUENCE {
         combOffset-n4                  INTEGER (0..3),
         cyclicShift-n4                 INTEGER (0..11)
      }
   },
   resourceMapping               SEQUENCE {
      startPosition                  INTEGER (0..5),
      nrofSymbols                    ENUMERATED {n1, n2, n4},
      repetitionFactor               ENUMERATED {n1, n2, n4}
   },
   freqDomainPosition            INTEGER (0..67),
   freqDomainShift               INTEGER (0..268),
   freqHopping                   SEQUENCE {
      c-SRS                          INTEGER (0..63),
      b-SRS                          INTEGER (0..3),
      b-hop                          INTEGER (0..3)
   },
   groupOrSequenceHopping        ENUMERATED { neither,
groupHopping, sequenceHopping },
   resourceType                  CHOICE {
      aperiodic                      SEQUENCE {
         ...
      },
      semi-persistent                SEQUENCE {
         periodicityAndOffset-sp         SRS-PeriodicityAndOffset,
         ...
      },
      periodic                       SEQUENCE {
         periodiciiyAndOffset-p          SRS-PeriodiciiyAndOffset,
         ...
      }
   },
   sequenceId                    INTEGER (0..1023),
   spatialRelationInfo           SRS-SpatialRelationInfo
OPTIONAL,   -- Need R
   ...
}
```

Configuration information of spatial RelationInfo in Table 25-1, above, may indicate that beam information of a reference signal is applied to a beam to be used for SRS transmission by referring to the reference signal. For example, the configuration of spatialRelationInfo may include information as in Table 25-2, below.

TABLE 25-2

```
SRS-SpatialRelationInfo ::=   SEQUENCE {
   servingCellId                 ServCellIndex   OPTIONAL,
-- Need S
   referenceSignal               CHOICE {
      ssb-Index                     SSB-Index,
      csi-RS-Index                  NZP-CSI-RS-ResourceId,
      srs                           SEQUENCE {
         resourceId                     SRS-ResourceId,
         uplinkBWP                      BWP-Id
      }
   }
}
```

Referring to the spatial RelationInfo configuration, in order to use beam information of a particular reference signal, an SS/PBCH block index, a CSI-RS index or an SRS index may be configured as an index of a reference signal to be referred to. Higher layer signaling referenceSignal is configuration information indicating which beam information of a reference signal is to be referred to for the SRS transmission, ssb-index refers to an index of an SS/PBCH, csi-RS-index refers to an index of a CSI-RS, and srs refers to an index of an SRS. When a value of the higher layer signaling referenceSignal is configured to ssb-Index, the UE may apply a reception beam, which has been used to receive an SS/PBCH block corresponding to the ssb-index, to a transmission beam for corresponding SRS transmission. When a value of the higher layer signaling referenceSignal is configured to csi-RS-Index, the UE may apply a reception beam, which has been used to receive a CSI-RS corresponding to the csi-RS-index, to a transmission beam for corresponding SRS transmission. When a value of the higher layer signaling referenceSignal is configured to srs, the UE may apply a transmission beam, which has been used to transmit an SRS corresponding to the srs, to a transmission beam for corresponding SRS transmission.

Associated with Radio Protocol

Figure 9:
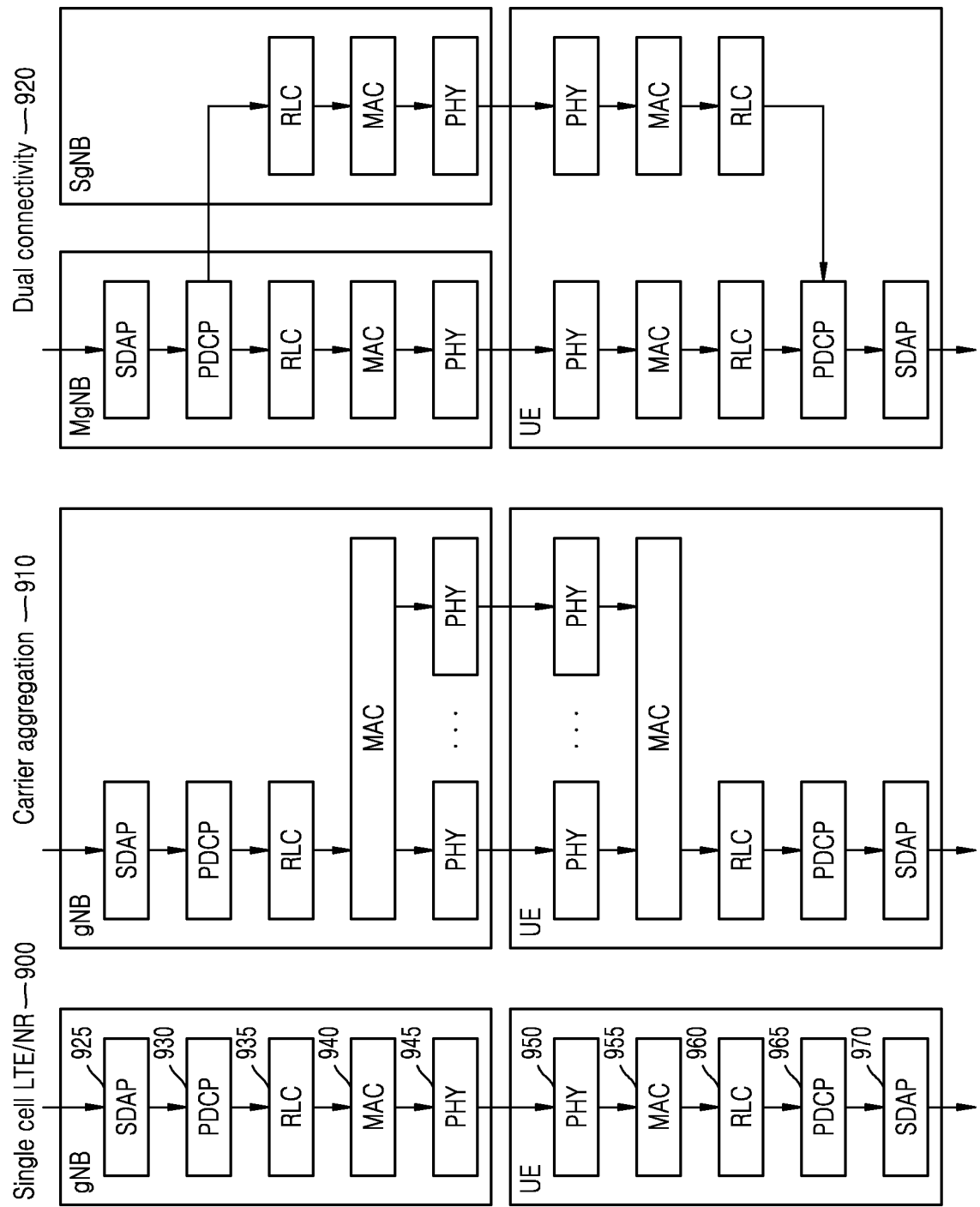
FIG. 9 illustrates radio protocol architectures of a BS and a UE in cases of a single cell, carrier aggregation and dual connectivity according to an embodiment.

FIG. 9 illustrates radio protocol architectures of a BS and a UE in cases of a single cell, carrier aggregation and dual connectivity according to an embodiment.

Referring to FIG. 9, a radio protocol of a next-generation mobile communication system may include, in each of a UE and an NR BS, an NR service data adaptation protocol (NR SDAP) layer 925 or 970, an NR packet data convergence protocol (NR PDCP) layer 930 or 965, an NR radio link control (NR RLC) layer 935 or 960, and an NR medium access control (NR MAC) layer 940 or 955.

Main functions of the NR SDAP layer 925 or 970 may include:

Transfer of user plane data

Mapping between a quality of service (QoS) flow and a data radio bearer (DRB) for both DL and UL Marking QoS flow ID in both DL and UL packets Reflective QoS flow to DRB mapping for the UL SDAP protocol data units (PDUs).

With respect to the SDAP layer entity, information about whether to use a header of the SDAP layer entity or to use functions of the SDAP layer entity may be configured for the UE by using a RRC message per PDCP layer entity, per bearer, or per logical channel. When the SDAP header is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for seamlessly supporting a service.

Main functions of the NR PDCP layer 930 or 965 may include:

Header compression and decompression: ROHC only

Transfer of user data

In-sequence delivery of upper layer PDUs

Out-of-sequence delivery of upper layer PDUs

PDCP PDU reordering for reception

Duplicate detection of lower layer service data units (SDUs)

Retransmission of PDCP SDUs

Ciphering and deciphering

Timer-based SDU discard in uplink.

The reordering function of the NR PDCP entity may indicate a function of reordering PDCP PDUs received from a lower layer, on a PDCP sequence number (SN) basis, may include a function of delivering the reordered data to an upper layer in order, a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer S935 or S960 may include some of:

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC entity (or layer) 935 or 960 may indicate a function of delivering RLC SDUs received from a lower layer to an upper layer in order. When a plurality of RLC SDUs segmented from one RLC SDU are received, the in-sequence delivery function of the NR RLC entity S935 or S960 may include a function of reassembling the RLC SDUs and delivering the reassembled RLC SDU, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs. The in-sequence delivery function of the NR RLC entity S935 or S960 may also include a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a certain timer expires, or may include a function of delivering all RLC SDUs received so far, to an upper layer in order although a missing RLC SDU exists when a certain timer expires. Also, the NR RLC entity 935 or 960 may process the RLC PDUs in order of reception and deliver the RLC PDUs to the NR PDCP entity (regardless of SNs (out-of-sequence delivery)). When a segment is received, the NR RLC entity 935 or 960 may reassemble the segment with other segments stored in a buffer or to be subsequently received, into a whole RLC PDU and may process and deliver the RLC PDU to the NR PDCP entity. The NR RLC layer 935 or 960 may not have a concatenation function, and the concatenation function may be performed by the NR MAC layer or be substituted with a multiplexing function of the NR MAC layer.

The out-of-sequence delivery function of the NR RLC entity 935 or 960 may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer 940 or 955 may be connected to a plurality of NR RLC layer entities configured for one UE, and main functions of the NR MAC layer 940 or 955 may include:

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layer 945 or 950 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

The radio protocol architecture may be variously changed according to carrier (or cell) operation schemes. For example, when the BS transmits data to the UE on a single carrier (or cell), the BS and the UE use protocol architecture having a single structure for each layer, as shown in the single cell LTE/NR 900. On the other hand, when the BS transmits data to the UE based on a CA in which multiple carriers are used at a single transmission and reception point (TRP), the BS and the UE use protocol architecture having a single structure up to the RLC layer, in which the PHY layer is multiplexed via the MAC layer, as shown in carrier aggregation 910. In another example, when the BS transmits data to the UE based on a dual connectivity (DC) in which multiple carriers are used at multiple TRPs, the BS and the UE use protocol architecture having a single structure up to the RLC layer, in which the PHY layer is multiplexed via the MAC layer, as shown in dual connectivity 920.

SRS Operating Scenarios

Figure 10A:
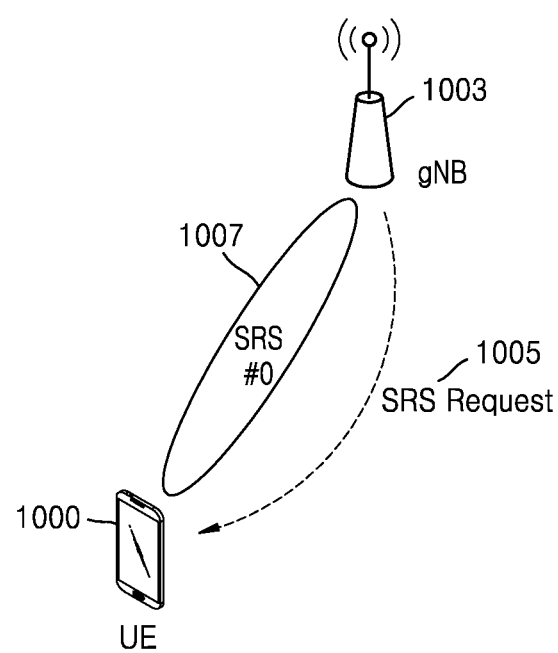
FIGS. 10A, 10B, and 10C illustrate examples of various sounding reference signal (SRS) operating scenarios according to an embodiment.
Figure 10B:
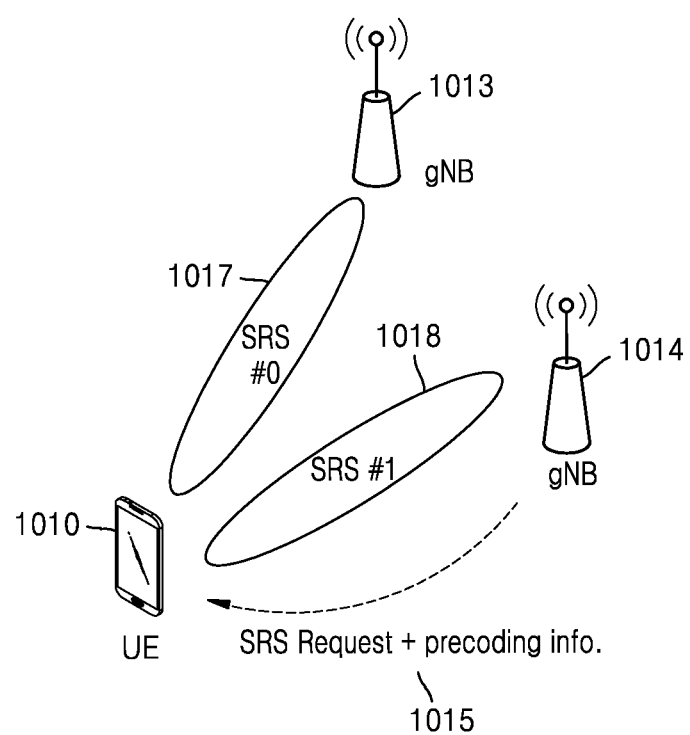
Figure 10C:
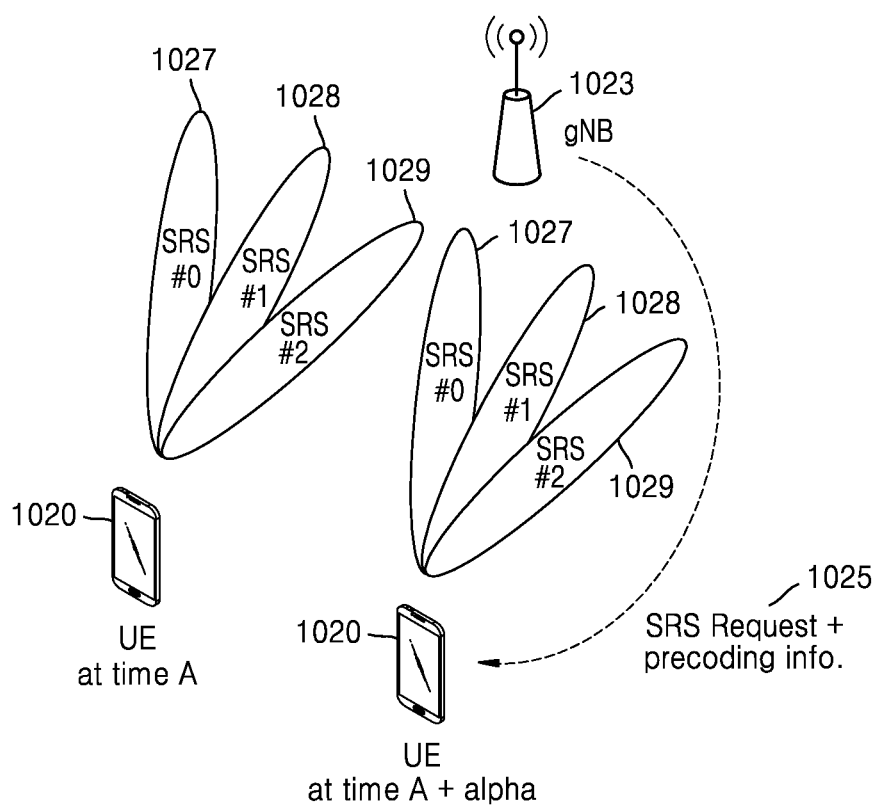

FIGS. 10A, 10B, and 10C illustrate examples of various SRS operating scenarios according to an embodiment. Referring to FIGS. 10A, 10B, and 10C, at least three SRS operating scenarios may be considered in an NR system.

Referring to FIG. 10A, a gNB (BS) 1003 may configure a UE 1000 with a beam in one direction. In the disclosure, configuring, by the BS 1003, beam/precoding in one direction may include not applying beam/precoding or applying a wide beam. When an SRS transmission type is a periodic SRS or a semi-persistent SRS, the UE 1000 may transmit an SRS 1007 according to SRS periodicity and slot offset, and when an SRS transmission type is an aperiodic SRS, the UE may transmit the SRS 1007 according to an SRS request 1005 in DCI within a preset time after the SRS request 1005 is detected. Here, for the SRS transmission, additional information for beam/precoding may not be required.

Referring to FIG. 10B, gNBs (BSs) 1013 and 1014 may configure a UE 1010 with beams in one or more directions, and the UE 1010 may transmit one or more SRSs 1017 and 1018 that are beamformed in the one or more directions. For example, it is possible to configure that an SRS resource (or port) #0 is beamformed in a direction toward the BS 1013 and an SRS resource #1 is beamformed in a direction toward the BS 1014. Here, each of the SRS #0 and the SRS #1 may be configured to have an SRS resource and/or antenna port. To this end, unlike in the scenario of FIG. 10A, the BSs 1013 and 1014 may indicate SRS request and SRS beam/precoding information 1015 to the UE 1010.

Referring to FIG. 10C, a gNB (BS) 1023 may configure a UE 1020 with beams in one or more directions, and the UE 1020 may transmit a plurality of SRSs 1027, 1028, and 1029 in the one or more directions. For example, the BS 1023 may configure the UE 1020 to transmit SRSs by respectively applying different beams/precodings to SRS resource (or port) #0, SRS resource (or port) #1, and SRS resource (or port) #2. By doing so, even when mobility of the UE 1020 is high, seamless communication may be performed via beam/precoder diversity.

For example, the UE 1020 may provide CSI to the BS 1023 via the SRS #2 at a point in time A, and may provide channel information to the BS 1023 via the SRS #0 at a point in time A+alpha. To this end, unlike in the scenario of FIG. 10A, the BS 1023 may notify SRS request and SRS beam/precoding information 1025 to the UE 1020.

The description is provided based on SRS transmission, and may be extended to other UL channel/RS transmissions such as PRACH, PUSCH, PUCCH, or the like.

Associated with TDD DL-UL Configuration

Figure 11:
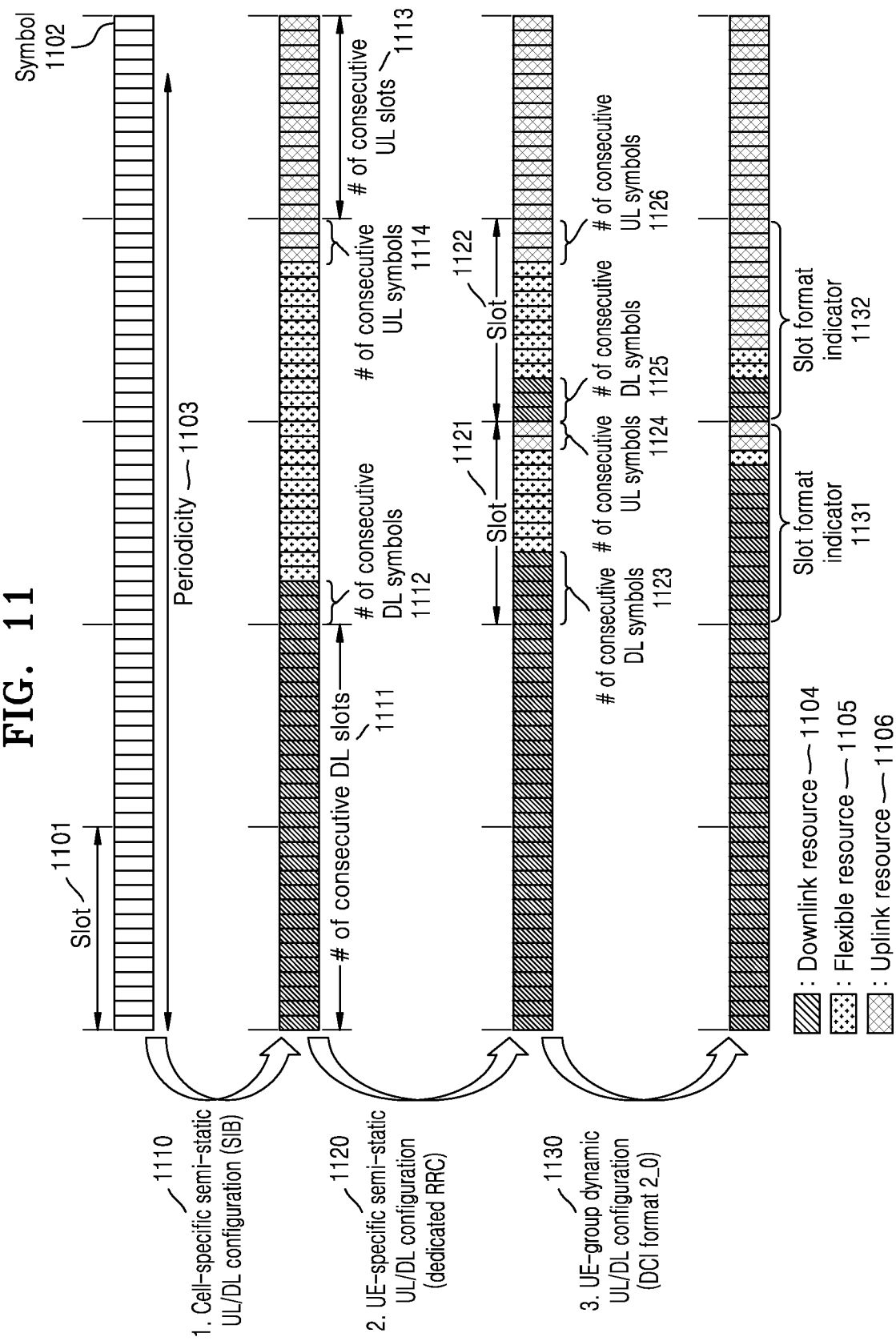
FIG. 11 illustrates an example of an uplink (UL) and DL resource configuration method in a $5^{th}$ generation (5G) wireless communication system according to an embodiment.

FIG. 11 illustrates an example of a UL and DL resource configuration method in the 5G wireless communication system according to an embodiment.

Referring to FIG. 11, a slot 1101 may include 14 symbols 1102. In the 5G communication system, UL-DL configuration of symbols/slots may be configured in 3 steps. In the first step 1110, UL-DL of symbol/slot may be semi-statically configured via cell-specific configuration information via system information in a symbol unit. Cell-specific UL-DL configuration information via system information may include UL-DL pattern information and reference subcarrier information. In the UL-DL pattern information, pattern periodicity 1103, the number of consecutive DL slots 1111 from a start point of each pattern, the number of symbols of next slot 1112, the number of consecutive UL slots 1113 from an end of the pattern, and the number of symbols of next slot 1114 may be indicated. Here, slots and symbols not indicated as UL resource 1106 and DL resource 1104 may be determined as flexible resource 1106 (e.g., slots/symbols).

In the second step 1120, based on UE-specific configuration information by dedicated higher layer signaling, flexible slots or slots 1121 and 1122 including flexible symbols may be respectively indicated as the number of consecutive DL symbols 1123 and 1125 from each start symbol of slots 1121 and 1122 and the numbers of consecutive UL symbols 1124 and 1126 from each end of slot 1121 and 1122 or may be indicated by a full DL slot or a full UL slot.

Also, in the third step 1130, in order to dynamically switch DL signal transmission duration and an UL signal transmission duration, symbols indicated as flexible symbols (that is, symbols that are not indicated as DL symbols or UL symbols) in each slot may be indicated as to whether each symbol is a DL symbol, an UL symbol, or a flexible symbol, via SFIs 1131 and 1132 included in a DL control channel. A SFI according to an embodiment may be selected as one index from Table 26 in which UL-DL configuration of 14 symbols in one slot is configured.

TABLE 26

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | F | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | U | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |
| 26 | D | D | F | F | F | F | F | F | F | F | U | U | U | U |
| 27 | D | D | D | F | F | F | F | F | F | F | U | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | D | F | U | U |
| 47 | D | D | F | U | U | U | D | D | F | U | U | U | U | U |

TABLE 26-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | u | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

Associated with XDD

In 5G mobile communication services, an additional coverage extension technology is introduced compared to LTE communication services, but coverage of actual 5G mobile communication services may use a time division duplex (TDD) system that is appropriate for services with a high proportion of DL traffic. Also, as a center frequency is increased to increase the frequency band, the coverage of the BS and the UE is decreased Thus, coverage enhancement is a key requirement of 5G mobile communication services. In particular, because transmit power of the UE is generally lower than transmit power of the BS, there is a need to support a service in which a proportion of DL traffic is high, and a ratio of a DL in a time domain is higher than that of a UL, the coverage enhancement of a UL channel is a key requirement of 5G mobile communication services. As a method of physically improving coverage of a UL channel between the BS and the UE, there may be a method of increasing time resources of the UL channel, lowering the center frequency, or increasing the transmit power of the UE. However, switching a frequency may be limited because a frequency band is determined for each network operator. Also, there may be restrictions in increasing maximum transmit power of the UE because a maximum value is set to decrease interference (i.e., the maximum transmit power of the UE is set by regulations or rules).

Therefore, in order to enhance the coverage of the BS and the UE, UL and DL resources are not allocated in a time domain according to a proportion of UL and DL traffic as in the TDD system but UL and DL resources may also be divided in a frequency domain as in a frequency division duplex (FDD) system. In an embodiment, a system in which UL resources and DL resources may be flexibly divided in a time domain and a frequency domain may be referred to as an XDD system, a flexible TDD system, a hybrid TDD system, a TDD-FDD system, a hybrid TDD-FDD system, a subband full duplex, a full duplex system, or the like, but the disclosure not being so limited. For convenience, in the disclosure, a system in which UL resources and DL resources may be flexibly divided in a time domain and a frequency domain is referred to as the XDD system. According to an embodiment, X in the XDD system may refer to time or frequency.

Figure 12:
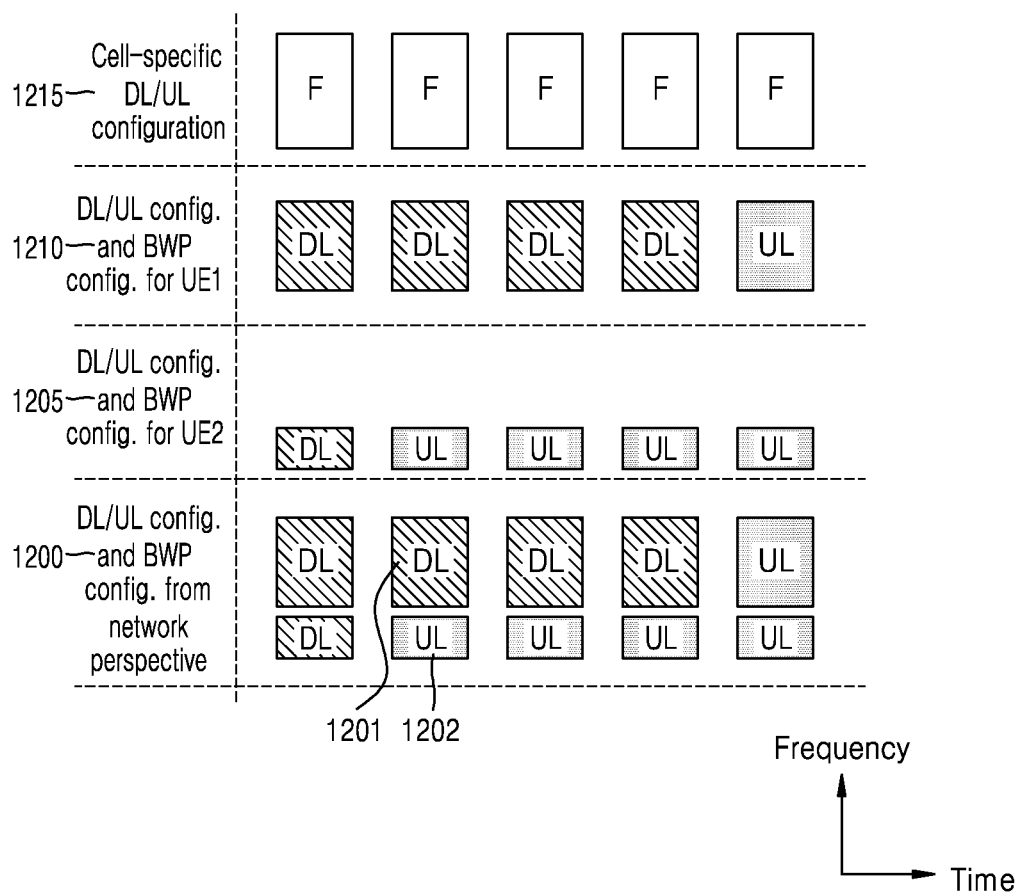
FIG. 12 illustrates an example of UL-DL configuration of a cross division duplex (XDD) system according to an embodiment.

FIG. 12 illustrates an example of UL-DL configuration of the XDD system according to an embodiment.

From the BS perspective, in the entire XDD system UL-DL configuration 1200, resources may be flexibly allocated to each symbol or slot according to traffic proportion of UL and DL in a full frequency band. Here, a guard band may be allocated in a gap between frequency bands of a DL resource 1201 and a UL resource 1202. The guard band may be allocated as a measure for decreasing interference applied to a UL channel or signal reception, due to out-of-band emission that occurs when the BS transmits a DL channel or signal on a DL resource. Here, for example, a UE 1 1210 in which DL traffic is generally greater than UL traffic may be allocated more DL resources than UL resources, according to configuration by the BS, with a ratio of DL resources to UL resources in a time domain assumed to be 4:1. At the same time, a UE 2 1205 that operates at an edge of a cell and thus lacks UL coverage may be allocated fewer DL resources than UL resources, according to configuration by the BS, with a ratio of DL resources to UL resources in a time domain assumed to be 1:4. In the above examples above, a UE (e.g., the UE 1 1210) with more DL traffic which operates in the center frequency may be allocated more DL resources in the time domain such that DL transmission efficiency may be increased, and UEs (e.g., the UE 2 1205) that operate in a relatively edge of a cell may be allocated more UL resources in the time domain such that coverage may be enhanced. Here, for flexible DL/UL configuration, the BS 1200 may configure most of the time resources as being flexible (F) when configuring cell-specific DL/UL configuration (1215).

In the present example, only for UEs that do not support full duplex in which simultaneous transmission and reception of UL and DL on a same time frequency resource is available, the BS may need to distinguish between DL resources and UL resources of the UE 1 1210 that receives a DL and the UEs 2 1205 that transmit a UL in a particular time (e.g., second to fourth time durations of FIG. 12). Distinguishing the DL resources from the UL resources may be performed by using one of the two methods below. The first method does not overlap frequency configuration information of DL BWP of the UE 1210 with frequency configuration information of UL BWP of the UE 2 1205. This first method has an advantage of being capable of minimizing an impact on implementation of a UE and a BS, but has a disadvantage of low flexibility and long time as BWP switching is required to change a frequency resource proportion between a DL and UL within one hour. For convenience, the first method is referred to as a BWP-based XDD operation method. The second method does not overlap a scheduled PDSCH of the UE 1 1210 with a scheduled PUSCH of the UE 2 1205 on the frequency axis. This second method has an advantage of high flexibility based on BS scheduling and a fast change speed of frequency resource proportions between a DL and a UL, but may cause several problems to be described with reference to embodiments below as some or all of frequency configuration information of DL BWP of the UE 1210 and frequency configuration information of UL BWP of the UE 2 1205 may overlap. For convenience, the second method is referred to as a scheduling based XDD operation method.

Figure 13:
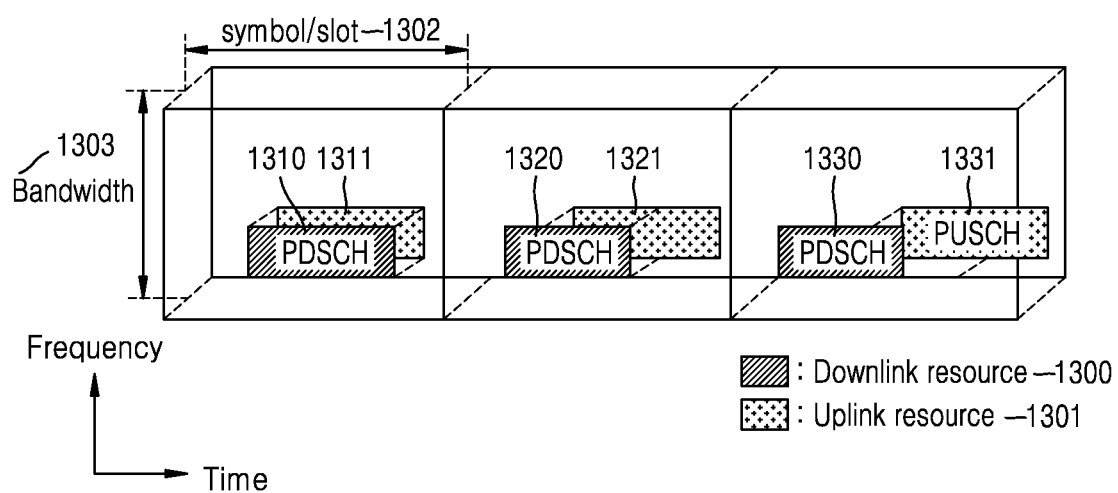
FIG. 13 illustrates UL-DL resource configuration of a full duplex system in which UL and DL resources are flexibly divided in a time domain and a frequency domain according to an embodiment.

FIG. 13 illustrates UL-DL resource configuration of a full duplex system in which UL and DL resources are flexibly divided in a time domain and a frequency domain according to an embodiment.

In FIG. 13, all or a portion of a DL resource 1300 and a UL resource 1301 may be configured to overlap in time and frequency domains. In a region configured as the DL resource 1300, DL transmission from a BS to a UE may be performed, and in a region configured as the UL resource 1301, UL transmission from the UE to the BS may be performed.

In an example illustrated in FIG. 13, all of a DL resource 1310 and a UL resource 1311 may be configured to overlap on a time resource corresponding to a symbol or slot 1302 and a frequency resource corresponding to a bandwidth 1303. As the DL resource 1310 and the UL resource 1311 overlap in time and frequency, DL and UL transmission and reception of the BS or the UE may occur simultaneously on the same time and frequency resource.

In another example illustrated in FIG. 13, a DL resource 1320 and a UL resource 1321 may be configured to partially overlap on the time resource corresponding to the symbol or slot 1302 and the frequency resource corresponding to the bandwidth 1303. In a partial region where the DL resource 1320 and the UL resource 1321 overlap, the DL and UL transmission and reception of the BS or the UE may simultaneously occur.

In another example illustrated in FIG. 13, a DL resource 1330 and a UL resource 1331 may be configured not to overlap on the time resource corresponding to the symbol or slot 1302 and the frequency resource corresponding to the bandwidth 1303.

Figure 14:
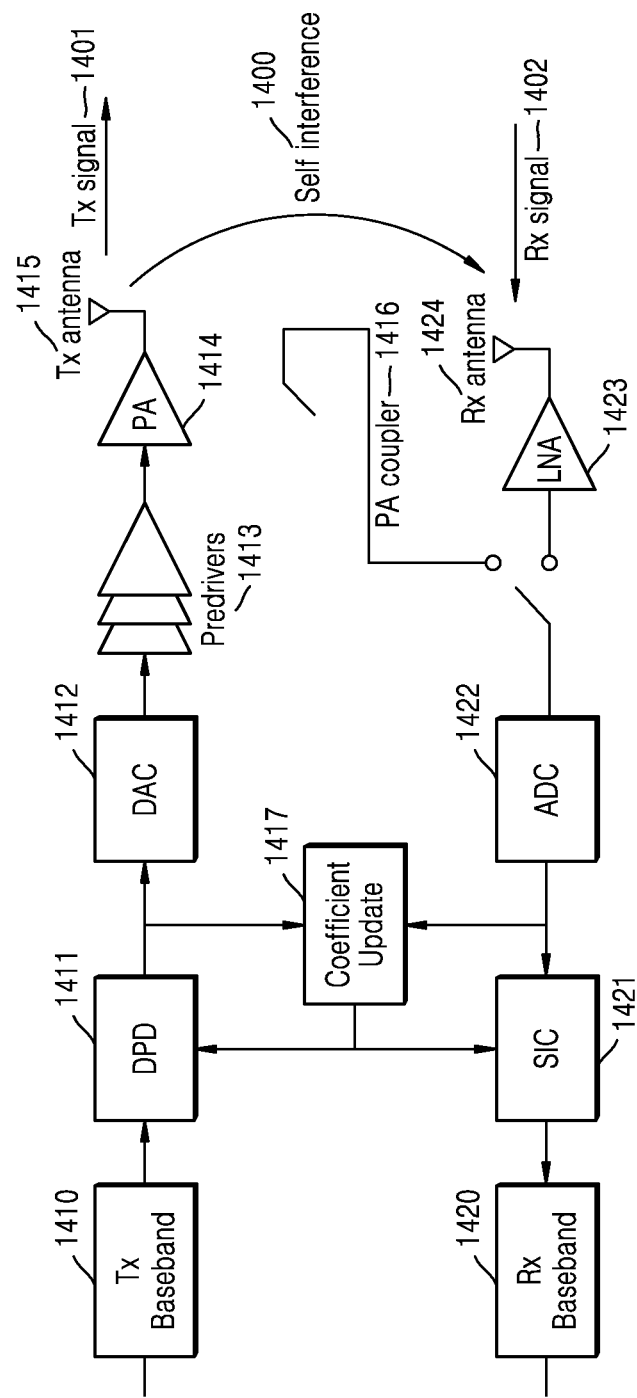
FIG. 14 is a diagram describing transmission and reception operations of a BS and a UE according to an embodiment.

FIG. 14 describes transmission and reception operations of a BS and a UE according to an embodiment.

Transmission and reception structures illustrated in FIG. 14 may be used in the BS or the UE. According to the transmission and reception structures illustrated in FIG. 14, a transmitter end may be configured of blocks such as a transmission baseband block (Tx Baseband) 1410, a digital pre-distortion block (DPD) 1411, a digital-to-analog converter (DAC) 1412, a pre-driver 1413, a power amplifier (PA) 1414, a transmission (Tx) antenna 1415, and the like. Each block may perform the following respective function:

Transmission baseband block 1410: digital processing block for a transmission signal DPD 1411: pre-distortion of a digital transmission signal DAC 1412: converts a digital signal to an analog signal Pre-driver 1413: progressive power amplification of an analog transmission signal PA 1414: amplifies power of an analog transmission signal Tx antenna 1415: transmits a signal According to the transmission and reception structures illustrated in FIG. 14, a receiver end may be configured of blocks such as a reception (Rx) antenna 1424, a low noise amplifier (LNA) 1423, an analog-to-digital converter (ADC) 1422, a successive interference canceller 1421, an Rx baseband block 1420, and the like. Each block may perform the following respective function.

Rx antenna 1424: receives a signal

LNA 1423: minimizes amplification of noise while amplifying the power of an analog reception signal ADC 1422: converts an analog signal to a digital signal Successive interference canceller 1421: cancels interference on a digital signal Rx baseband block 1420: receives a signal According to the transmission and reception structures illustrated in FIG. 14, a power amplifier coupler (PA coupler) 1416 and a constant update block (coefficient update) 1417 may exist for additional signal processing between the transmitter end and the receiver end. Each block may perform the following respective function.

Power amplifier coupler 1416: observes, at the receiver end, a waveform of an analog transmission signal passing via the power amplifier Constant update block 1417: updates various constants required for digital domain signal processing of the transmitter end and the receiver end. Constants calculated here may be used to set various parameters in the DPD block 1411 of the transmitter end and the SIC block 1421 of the receiver end.

The transmission and reception structures illustrated in FIG. 14 may be used to effectively control interference between a transmission signal and a reception signal when transmission and reception operations are simultaneously performed in the BS or the UE. For example, when transmission and reception concurrently occur in a random apparatus, a transmission signal 1401 transmitted via the Tx antenna 1415 of the transmitter end may be received via the Rx antenna 1424 of the receiver end, and in this case, the transmission signal 1401 received by the receiver end may interfere with the reception signal 1402 that is originally intended to be received by the receiver end. Interference between the transmission signal 1401 and the reception signal 1402 that are received by the receiver end is referred to as self-interference 1400. For example, when the BS performs DL transmission and UL reception at the same time, a DL signal transmitted by the BS may be received by a receiver end of the BS. Accordingly, at the receiver end of the BS, interference may occur between the DL signal transmitted by the BS and a UL signal that the BS originally intends to receive at its receiver end. When the UE performs DL reception and UL transmission at the same time, a UL signal transmitted by the UE may be received at the receiver end of the UE, and accordingly, at the receiver end of the UE, interference may occur between the UL signal transmitted by the UE and a DL signal that the UE originally intends to receive at its receiver end. As described above, interference between links in different directions from each other in the BS and the UE, that is, interference between a DL signal and a UL signal is referred to as cross-link interference.

In an embodiment, self-interference between a transmission signal (or a DL signal) and a reception signal (or a UL signal) may occur in a system in which transmission and reception may be simultaneously performed.

For example, self-interference may occur in the XDD system described above.

Figure 15:
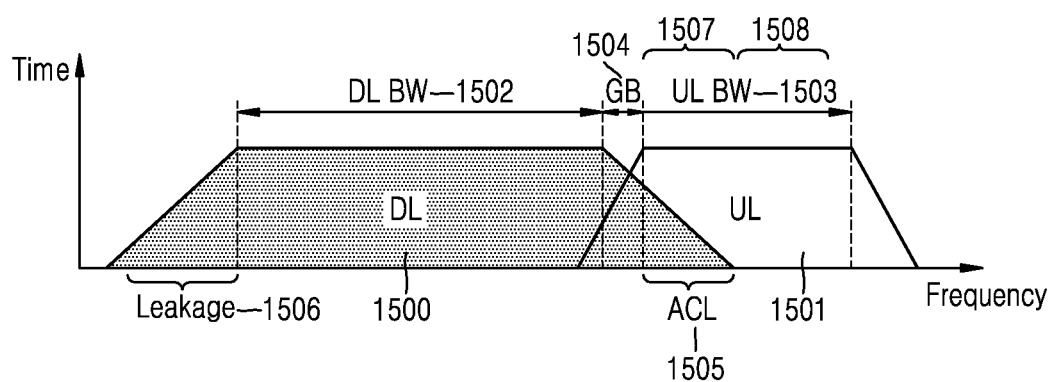
FIG. 15 is a diagram describing an example of DL and UL resource configurations in an XDD system.

FIG. 15 describes an example of DL and UL resource configurations in an XDD system.

In the XDD system, a DL resource 1500 and a UL resource 1501 may be distinguished from each other in a frequency domain, and there may be a guard band (GB) 1504 between the DL resource 1500 and the UL resource 1501. Actual DL transmission may be performed within a DL bandwidth 1502, and UL transmission may be performed within an actual UL bandwidth 1503. Here, leakage 1506 may occur outside the UL or DL transmission bands. In a region where the DL resource 1500 and the UL resource 1501 are adjacent to each other, interference may occur due to the leakage (this may be referred to as adjacent carrier leakage (ACL) 1505)). FIG. 15 illustrates an example in which the ACL 1505 from the DL resource 1500 to the UL resource 1501 occurs. As the DL bandwidth 1502 and the UL bandwidth 1503 become more adjacent to each other, an impact of signal interference caused by the ACL 1505 may increase, such that performance degradation may occur. For example, as illustrated in FIG. 15, in a resource region 1507 in the UL bandwidth 1503 adjacent to the DL bandwidth 1502, the impact of interference caused by the ACL 1505 may be significant. In a resource region 1508 within the UL bandwidth 1503 which is relatively more distant from the DL bandwidth 1502, the impact of the interference caused by the ACL 1505 may be relatively small. That is, in the UL bandwidth 1503, there may be the resource region 1507 that is relatively more heavily affected by interference and the resource regions 1508 that is relatively less affected by interference. The guard band 1504 may be inserted between the DL bandwidth 1502 and the UL bandwidth 1503 so as to decrease performance degradation caused by the ACL 1505. Increasing the size of the guard band 1504 provides an advantage in that the interference impact due to the ACL 1505 between the DL bandwidth 1502 and the UL bandwidth 1503 may be reduced. However, as the size of the guard band 1504 increases, resources available for transmission and reception are reduced, and thus, there may be disadvantage of degradation in resource efficiency. On the contrary, as the size of the guard band 1504 decreases, the amount of resources being available for transmission and reception may increase, which has the advantage of increasing resource efficiency, but the impact of interference due to the ACL 1505 between the DL bandwidth 1502 and the UL bandwidth 1503 may be increased. Accordingly, it may be important to determine an appropriate size of the guard band 1504 by considering the trade-off.

Figure 16:
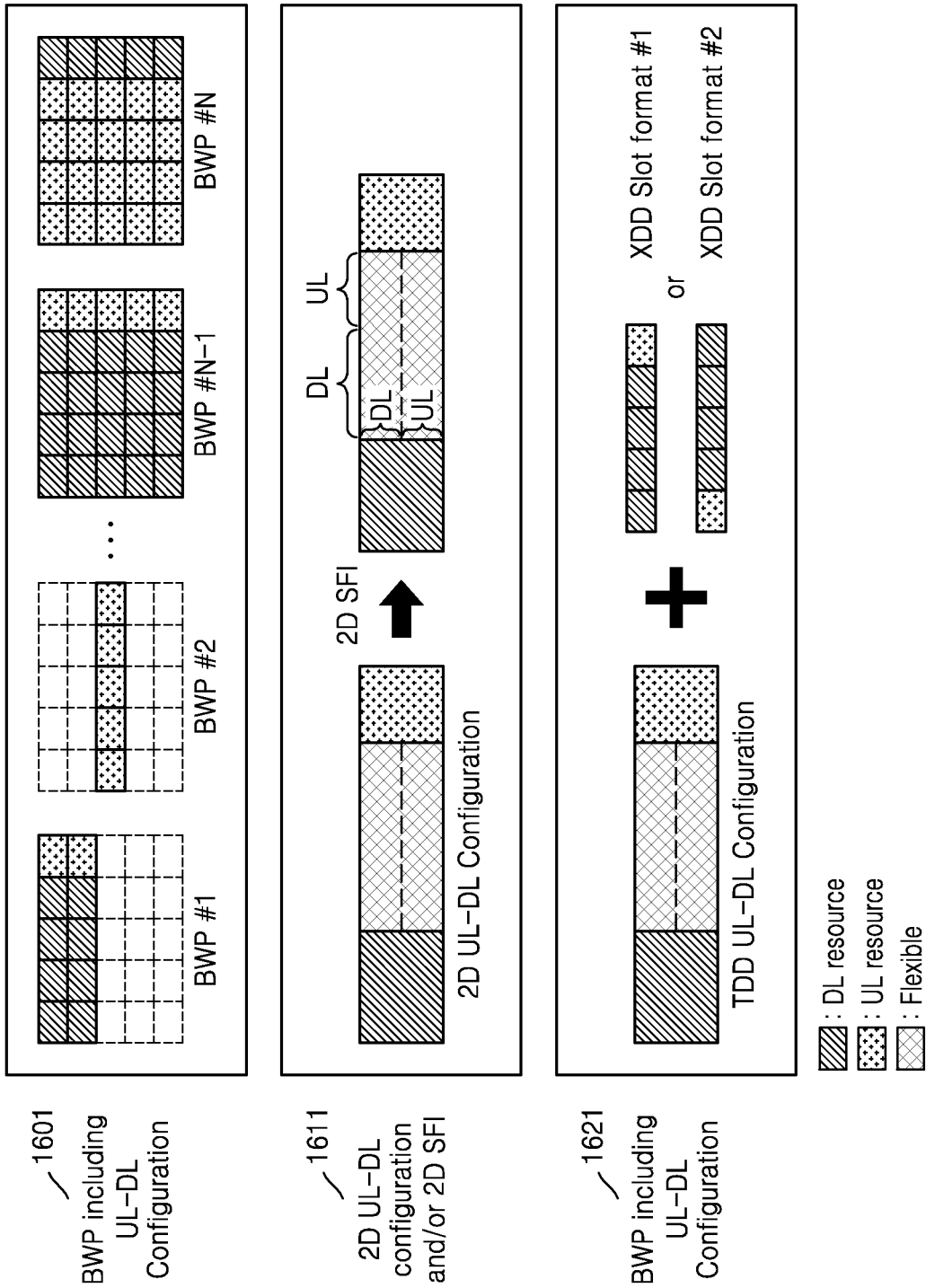
FIG. 16 illustrates an example of a UL-DL configuration method in an XDD system according to an embodiment.

FIG. 16 illustrates an example of a UL-DL configuration method in an XDD system according to an embodiment.

In the XDD system, a required resource may be configured for UL-DL configuration, according to situations of the UE. Referring to an example 1601, UL-DL configuration may be configured in a frequency domain and a time domain via different UL-DL configuration for each BWP. The BS and the UE may change a frequency-domain resource by BWP switching, and may change UL-DL configuration in the frequency domain and the time domain by changing a resource of the time domain via UL-DL configuration associated with a BWP. Referring to another example 1611 provided in FIG. 16, UL-DL configuration configured by the BS may be configured while resources of a frequency axis are divided for one or more symbols/slots. That is, two-dimensional (2D) UL-DL configuration information may be configured, and a resource for symbol/slot may be configured by using a 2D SFI. Referring to another example 1621 provided in FIG. 16, UL-DL configuration is not configured for each BWP in a time domain but UL-DL configuration may be performed by combining UL-DL configuration in resources of the time domain and a frequency domain. UL-DL configuration in a time domain is not changed in response to BWP switching but a change in UL-DL configuration in a time domain may be performed separately from BWP switching.

Semi-Static XDD Operating Method

FIG. 17 illustrates another example of UL-DL configurations in the XDD system according to an embodiment.

Referring to FIG. 17, the BS may allocate, to the UE, two UL-DL resource configurations for semi-static XDD. For example, from the BS perspective, UL-DL configuration (UL-DL configuration 1700 or UL-DL configuration 1710) may be configured. The BS may allocate DL-prioritized resource configuration (resource configuration1A 1703 or resource configuration2A 1713) to UEs with more DL traffic than UL traffic or UEs located at a center of a cell or UEs located at an edge of the cell for which UL coverage is not critical. As another example, the BS may allocate UL-prioritized resource configuration (resource configuration1B 1705 or resource configuration2B 1715) to UEs for which UL coverage is critical at a cell edge. The BS continues operation with DL-prioritized resource configuration such as the resource configuration1A 1703 to UEs (UEs not being at the cell edge or UEs with more DL traffic than UL traffic) other than the UEs for which UL coverage is critical at the cell edge. Here, when the UE moves toward the cell edge and for which UL coverage becomes critical, the BS may allocate a UL-prioritized resource such as the resource configuration1B 1705. With the resource operation described above, DL performance degradation may be minimized and UL coverage may be improved at the same time, compared to the semi-static TDD in which a ratio of a DL resource to a UL resource is 4:1.

In the semi-static XDD operation described above, direct interference between UEs may not occur, since the UEs do not supporting full duplex in which simultaneous transmission and reception in a same time frequency resource is available. However, because bandwidths of a DL and a UL are adjacent to each other, CLI due to an ACL from a UL channel to a DL channel may occur. In particular, as a distance between UEs is reduced, an ACL impact via a signal from a UL transmission UE to a DL reception UE may increase.

Associated with CLI Measurement

The disclosure herein may include a technology of supporting duplex flexibility in a paired spectrum (in a case of FDD) and an unpaired spectrum (in a case of TDD), and may particularly use a dynamic TDD scheme. When dynamic resource allocation is allowed for each cell in a multi-cell environment, CLI between a UL and a DL may occur. In a system supporting dynamic TDD, time durations configured as a DL by BS A may overlap in a time domain with time durations configured as a UL by BS B. In this case, a case where a UL signal (e.g., SRS) transmitted by UE B in a cell of neighboring BS B may cause interference to a UE A that receives a DL signal in a cell of BS A may occur, and such interference may be referred to as UE-to-UE CLI. The UE-to-UE CLI may degrade a data reception quality of UE A that receives a DL.

In order to measure the UE-to-UE CLI, there are a first method of measuring RSRP from an SRS and reporting SRS-RSRP and a second method of using a CLI-RSSI for measuring received power of all interferences on a particular resource. In order to measure the SRS-RSRP, the UE may receive, from a serving BS, SRS measurement configuration information associated with SRS transmission configuration information. Measured interference reported to the BS may undergo filtering at L3-level, and then may be used in CLI measurement between BSs. The BS may perform resource allocation based on an interference measurement report received from the UE. A detailed description therefor is provided below with reference to the below tables.

Figure 18:
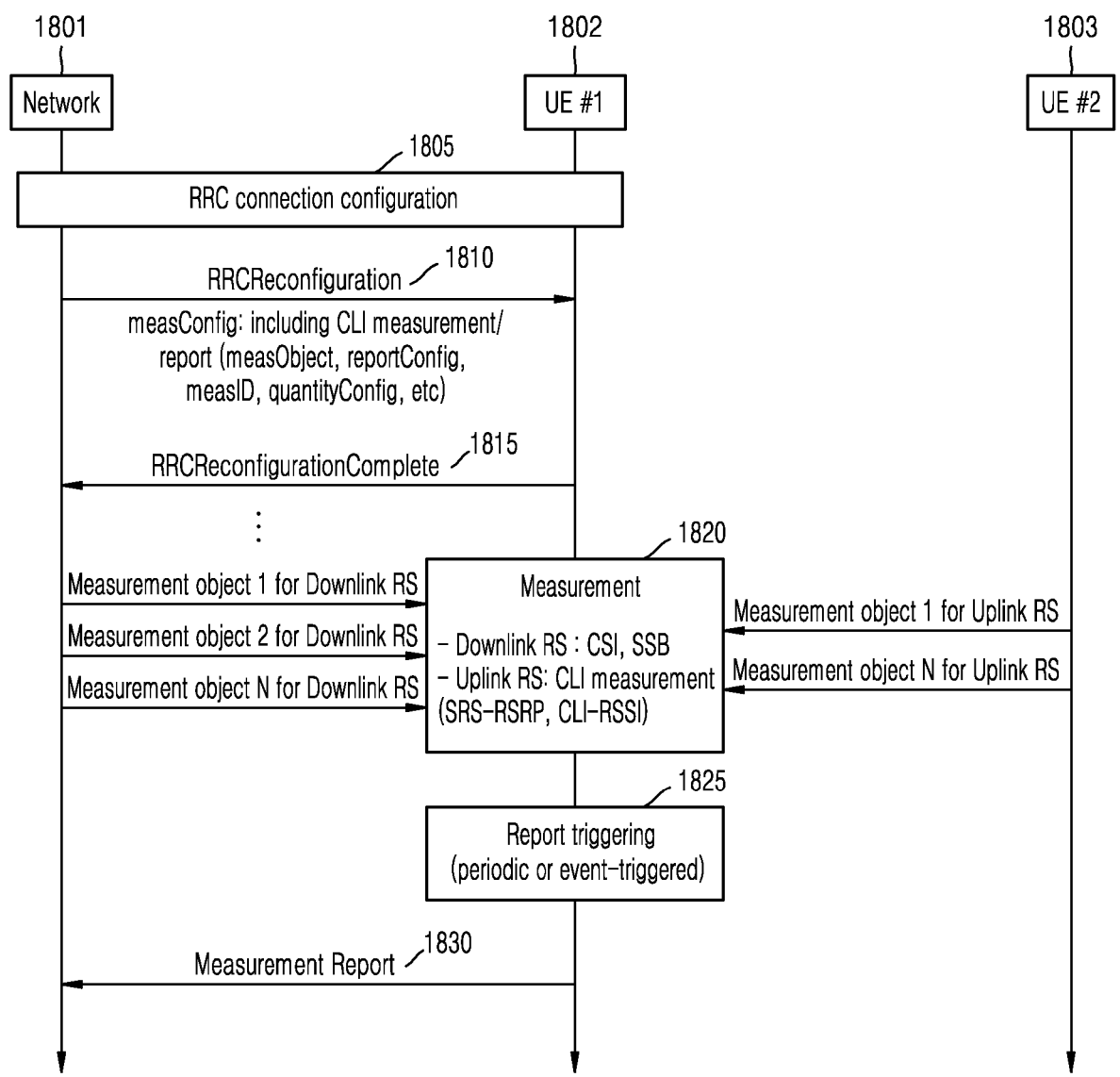
FIG. 18 illustrates a procedure in which a UE receives measurement configuration including CLI from a BS and transmits a measurement value report thereof according to an embodiment.

FIG. 18 illustrates a procedure in which the UE receives measurement configuration including CLI from the BS and transmits a measurement value report thereof according to an embodiment.

As a UE #1 1802 in a connected mode moves within or outside a cell, the UE #1 1802 may be commended, from a different cell/BS, for transition to transmit or receive data via a cell/BS being newly connected after handover. To this end, a BS 1801 may provide, by an RRC message, the UE #1 1802 with configuration 1805 for indication of measurement with respect to a different frequency/cell. The configuration for indication of measurement may include an object, a condition, and parameters for which a measurement result shall be reported from the UE #1 1802 to the BS 1801, and the UE #1 1802 may be configured, by the BS 1801, with measurement and reporting with respect to CLI 1810, and then may perform measurement and reporting with respect to the CLI. The BS 1801 may provide measurement configuration information 1815 (measConfig) to the UE #1 1802, and the measurement configuration information may include CLI measurement and reporting-associated configuration information in addition to existing DL reference signal measurement configuration and reporting. Also, the measurement configuration information (measConfig) may include measurement object configuration (measObject), report configuration (reportConfig), measurement identifier configuration (measID) associating a measurement object with a report method, configuration indicating a type of a value to be measured (quantityConfig), and the like. The UE #1 1802 may perform measurement (1820) according to the configured measurement information, and may report a measurement report to the BS 1801 via a higher layer message 1830 according to a report procedure 1825.

A measurement object includes at least one of a downlink RS (e.g., CSI, SSB), or an uplink RS (e.g., CLI measurements). The network 1801 may transmit the downlink RS to the UE #1 1803. The UE #2 1802 may transmit the uplink RS to the network 1801. A detailed description is provided based on a plurality of pieces of information of Abstract Syntax Notation One (ASN.1) in the below tables.

In order to configure CLI measurement for the UE, the BS may transmit information by adding the information to measConfig that is sub-information of an RRC message (RRCReconfiguration or RRCResume).

CLI measurement configuration according to an embodiment may be transmitted to the UE via a higher layer message of RRCReconfiguration or RRCResume as in Table 27 and Table 28 below.

TABLE 27

| RRCReconfiguraiton | |
|---|---|
| RRCReconfiguration ::= | SEQUENCE { |
| rrc-TransactionIdentifier | RRC-TransactionIdentitier, |
| criticalExtensions | CHOICE { |
| rrcReconfiguration | RRCReconfiguration-IEs, |
| criticalExtensionsFuture | SEQUENCE { } |
| } | |
| RRCReconfiguration-IEs ::= | SEQUENCE { |
| radioBearerConfig | RadioBearerConfig OPTIONAL, |
| secondaryCellGroup | OCTET STRING (CONTAINING |

TABLE 27-continued

| RRCReconfiguraiton | |
|---|---|
| CellGroupConfig) | OPTIONAL, |
| measConfig | MeasConfig OPTIONAL, |
| lateNonCriticalExtension | OCTET STRING OPTIONAL, |
| nonCriticalExtension | RRCReconfiguration-v1530-IEs OPTIONAL |
| } | |

TABLE 28

| RRCResume | |
|---|---|
| RRCResume ::= | SEQUENCE { |
| rrc-TransactionIdentifier | RRC-TransactionIdentifier, |
| criticalExtensions | CHOICE { |
| rrcResume | RRCResume-IEs, |
| criticalExtensionsFuture | SEQUENCE { } |
| } | |
| } | |
| RRCResume-IEs ::= | SEQUENCE { |
| radioBearerConfig | RadioBearerConfig OPTIONAL, |
| masterCellGroup | OCTET STRING (CONTAINING CellGroupConfig)OPTIONAL |
| measConfig | MeasConfig OPTIONAL, |
| fullConfig | ENUMERATED {true} OPTIONAL, |
| lateNonCriticalExtension | OCTET STRING OPTIONAL, |
| nonCriticalExtension | RRCResume-v1560-IEs OPTIONAL |
| } | |

Referring to Table 29, below, the BS may configure measConfg as measurement configuration information by including measurement resource configuration information in measObjectToAddModList, including information about a report in reportConfigToAddMod List, including measurement ID configuration in meadIdToAddModList, and indicating, in QuantityConfig, which measurement is to be performed and reported. Table 30, below, describes a plurality of pieces of information included in ReportConfigToAddModList, and Table 31, below, describes a plurality of pieces of information included in MeasObjectToAddModList.

TABLE 29

| MeasConfig | |
|---|---|
| MeasConfig ::= | SEQUENCE { |
| measObjectToRemoveList | MeasObjectToRemoveList OPTIONAL, |
| measObjectToAddModList | MeasObjectToAddModList OPTIONAL, |
| reportConfigToRemoveList | ReportConfigToRemoveList OPTIONAL, |
| reportConfigToAddModList | ReportConfigToAddModList OPTIONAL, |
| measIdToRemoveList | MeasIdToRemoveList OPTIONAL, |
| measIdToAddModList | MeasIdToAddModList OPTIONAL, |
| s-MeasureConfig | CHOICE { |
| ssb-RSRP | RSRP-Range, |
| csi-RSRP | RSRP-Range |
| } OPTIONAL, | |
| quantityConfig | QuantityConfig OPTIONAL, |
| . . . | |
| } | |
| MeasObjectToRemoveList ::= | SEQUENCE (SIZE (1..maxNrofObjectId)) OF MeasObjectId |
| MeasIdToRemoveList ::= | SEQUENCE (SIZE (1..maxNrofMeasId)) OF MeasId |
| ReportConfigToRemoveList ::= | SEQUENCE (SIZE (1..maxReportConfigId)) OF ReportConfigId |

TABLE 30

| ReportConfigToAddModList |
|---|
| ReportConfigToAddModList ::=  SEQUENCE (SIZE (1..maxReportConfigId)) OF ReportConfigToAddMod<br>ReportConfigToAddMod ::=  SEQUENCE {<br>   reportConfigId  ReportConfigId,<br>   reportConfig  CHOICE {<br>      reportConfigNR  ReportConfigNR,<br>   ...,<br>   }<br>} |

TABLE 31

| MeasObjectToAddModList |
|---|
| MeasObjectToAddModList ::=  SEQUENCE (SIZE (1..maxNrofObjectId)) OF MeasObjectToAddMod<br>MeasObjectToAddMod ::=  SEQUENCE {<br>   measObjectId  MeasObjectId,<br>   measObject  CHOICE {<br>      measObjectNR  MeasObjectNR,<br>   ...,<br>   }<br>} |

Referring to Table 32, below, CLI measurement report configuration may be configured by a CLI-associated parameter that is sub-information of reportConfigNR. For example, when the BS configures a periodic report for the UE, the periodic report by the UE may be configured by using a plurality of pieces of sub-information of CLIreportConfigNR-r16 information. On which resource of corresponding measurement ID the UE is to perform measurement may be configured according to each quantity information.

TABLE 32

| ReportConfigNR |
|---|
| ReportConfigNR ::=  SEQUENCE {<br>   reportType  CHOICE {<br>   ...<br>   cli-Periodical-r16  CLI-PeriodicalReportConfig-r16,<br>   cli-EventTriggered-r16  CLI-EventTriggerConfig-r16<br>   }<br>}<br>...<br>CLI-EventTriggerConfig-r16 ::= SEQUENCE {<br>   eventId-r16  CHOICE {<br>      eventI1-r16  SEQUENCE {<br>         i1-Threshold-r16  MeasTriggerQuantityCLI-r16,<br>         reportOnLeave-r16  BOOLEAN,<br>         hysteresis-r16  Hysteresis,<br>         timeToTrigger-r16  TimeToTrigger<br>      },<br>   ...<br>   },<br>   reportInterval-r16  ReportInterval,<br>   reportAmount-r16  ENUMERATED {r1, r2, r4, r8, r16, r32, r64, infinity},<br>   maxReportCLI-r16  INTEGER (1..maxCLI-Report-r16),<br>...<br>}<br>CLI-PeriodicalReportConfig-r16 ::= SEQUENCE {<br>   reportInterval-r16  ReportInterval,<br>   reportAmount-r16  ENUMERATED {r1, r2, r4, r8, r16, r32, r64, infinity},<br>   reportQuantityCLI-r16  MeasReportQuantityCLI-r16,<br>   maxReportCLI-r16  INTEGER (1..maxCLI-Report-r16),<br>.<br>}<br>MeasTriggerQuantityCLI-r16 ::=  CHOICE { |

TABLE 32-continued

| ReportConfigNR |
|---|
|    srs-RSRP-r16  SRS-RSRP-Range-r16,<br>   cli-RSSI-r16  CLI-RSSI-Range-r16<br>}<br>MeasReportQuantityCLI-r16 ::=  ENUMERATED {srs-rsrp, cli-rssi} |

Referring to Table 33, below, a resource that is to be used to perform CLI measurement may be configured by measObjectCL that is CLI-dedicated information. The UE may determine whether it is SRS-RSRP measurement or CLI-RSSI measurement, based on corresponding information of information transmitted by the BS. For example, when the UE is configured to perform SRS-RSRP measurement, the UE may identify the configuration via SRS-ResourceConfigCLI-r16 that is sub-information of measObjectCL. SRS resource information in Rel-16 CLI SRS-RSRP measurement may be configured to be referred to SRS-Resource information that is sub-information of SRS-Config.

TABLE 33

| MeasObjectCLI-r16 |
|---|
| MeasObjectCLI-r16 ::=  SEQUENCE {<br>   cli-ResourceConfig-r16  CLI-ResourceConfig-r16,<br>   ...<br>}<br>CLI-ResourceConfig-r16 ::=  SEQUENCE {<br>   srs-ResourceConfig-r16  SetupRelease { SRS-ResourceListConfigCLI-r16 } OPTIONAL,<br>   rssi-ResourceConfig-r16  SetupRelease { RSSI-ResourceListConfigCLI-r16 } OPTIONAL<br>}<br>SRS-ResourceListConfigCLI-r16 ::=  SEQUENCE (SIZE (1..maxNrofCLI-SRS-Resources-r16)) OF SRS-ResourceConfigCLI-r16<br>RSSI-ResourceListConfigCLI-r16 ::=  SEQUENCE (SIZE (1..maxNrofCLI-RSSI-Resources-r16)) OF RSSI-ResourceConfigCLI-r16<br>SRS-ResourceConfigCLI-r16 ::=  SEQUENCE {<br>   srs-Resource-r16  SRS-Resource,<br>   srs-SCS-r16  SubcarrierSpacing,<br>   refServCellIndex-r16  ServCellIndex OPTIONAL,<br>   refBWP-r16  BWP-Id,<br>   ...<br>}<br>RSSI-ResourceConfigCLI-r16 ::=  SEQUENCE {<br>   rssi-ResourceId-r16  RSSI-ResourceId-r16,<br>   rssi-SCS-r16  SubcarrierSpacing,<br>   startPRB-r16  INTEGER (0..2169),<br>   nrofPRBs-r16  INTEGER (4..maxNrofPhysicalResourceBlocksPlus1),<br>   startPosition-r16  INTEGER (0..13),<br>   nrofSymbols-r16  INTEGER (1..14),<br>   rssi-PeriodicityAndOffset-r16  RSSI-PeriodicityAndOffset-r16,<br>   refServCellIndex-r16  ServCellIndex OPTIONAL,<br>   ...<br>} |

TABLE 33-continued

MeasObjectCLI-r16

| | |
|---|---|
| RSSI-ResourceId-r16 ::= | INTEGER (0.. maxNrofCLI-RSSI-Resources-r16-1) |
| RSSI-PeriodicityAndOffset-r16 :: = | CHOICE { |
| sl10 INTEGER(0..9), | |
| Sl20 INTEGER(0..19), | |
| Sl40 INTEGER(0..39), | |
| Sl80 INTEGER(0..79), | |
| Sl160 INTEGER(0..159), | |
| Sl320 INTEGER(0..319), | |
| s1640 INTEGER(0..639), | |
| ... | |
| } | |

Referring to Tables 34 and 35, below, the CLI measured by using configured measurement quantity and resource may be stored in MeasResults. MeasResults stored per ID may be transmitted from the UE to the BS via MeasurementReport that is an RRC message. Table 36, below, describes information included in MeasResultsCLI according to an embodiment.

TABLE 34

MeasurementReport

| | |
|---|---|
| MeasurementReport ::= | SEQUENCE { |
| criticalExtensions | CHOICE { |
| measurementReport | MeasurementReport-IEs, |
| criticalExtensionsFuture | SEQUENCE { } |
| } | |
| } | |
| MeasurementReport-IEs ::= | SEQUENCE { |
| measResults | MeasResults, |
| lateNonCriticalExtension | OCTET STRING OPTIONAL, |
| nonCriticalExtension | SEQUENCE{ } OPTIONAL |
| } | |

TABLE 35

MeasResults

| | |
|---|---|
| MeasResults ::= | SEQUENCE { |
| measId | MeasId, |
| measResultServingMOList | MeasResultServMOList, |
| measResultNeighCells | CHOICE { |
| measResultListNR | MeasResultListNR, |
| ... | |
| } OPTIONAL, | |
| ..., | |
| [[ | |
| measResultServFreqListNR-SCG | MeasResultServFreqListNR-SCG |
| OPTIONAL, | |
| ]], | |
| [[ | |
| ... | |
| measResultCLI-r16 | MeasResultCLI-r16 OPTIONAL |
| ]] | |
| } | |

TABLE 36

MeasResultCLI-r16

| | |
|---|---|
| MeasResultCLI-r16 ::= | SEQUENCE { |
| measResultListSRS-RSRP-r16 | MeasResultListSRS-RSRP-r16 |
| OPTIONAL, | |
| measResultListCLI-RSSI-r16 | MeasResultListCLI-RSSI-r16 |
| OPTIONAL | |
| } | |
| MeasResultListSRS-RSRP-r16 ::= SEQUENCE (SIZE (1..maxCLI- | |

TABLE 36-continued

MeasResultCLI-r16

| | |
|---|---|
| Report-r16)) OF MeasResultSRS-RSRP-r16 | |
| MeasResultSRS-RSRP-r16 ::= | SEQUENCE { |
| srs-ResourceId-r16 | SRS-ResourceId, |
| srs-RSRP-Result-r16 | SRS-RSRP-Range-r16 |
| } | |
| MeasResultListCLI-RSSI-r16 ::= SEQUENCE (SIZE (1..maxCLI- | |
| Report-r16)) OF MeasResultCLI-RSSI-r16 | |
| MeasResultCLI-RSSI-r16 ::= | SEQUENCE { |
| rssi-ResourceId-r16 | RSSI-ResourceId-r16, |
| cli-RSSI-Result-r16 | CLI-RSSI-Range-r16 |
| } | |
| ... | |

UE Capability Related to CLI

UE capability information 1: The UE capability may indicate capability as to which measurement resource is supported with respect to CLI-RSSI and SRS-RSRP, as in Table 37, below. Also, when each measurement resource capability is reported, at least maximum number of supportable resources may also be reported, and parameter maxNumberCLI-RSSI-r16 or maxNumber-SRS-RSRP-r16 of Table 37 may indicate maximally supportable UE capability. In particular, for CLI SRS-RSRP measurement in which an SRS transmitted by a UE in a neighboring cell is to be monitored, a maximum number of resources that can be monitored per slot may also be reported, and parameter maxNumberPerSlotCLI-SRS-RSRP-r16 of Table 37 may indicate UE capability with respect to a maximum number of SRS monitorings per slot for CLI measurement. For example, when UE capability is reported with parameter cli-SRS-RSRP-Meas-r16 of Table 37, it may indicate that the UE can perform measurement by using a resource of SRS-RSRP, and maxNumber-SRS-RSRP-r16 and maxNumberPerSlotCLI-SRS-RSRP-r16 that are reported together may indicate a maximum number of resources that the UE can monitor for CLI measurement and a maximum number of resource monitorings per slot. The UE capability is optionally supported by the UE, and whether to support the UE capability may be explicitly reported to the BS.

TABLE 37

| Index | Feature group | Components | Field name in TS 38.331 [2] |
|---|---|---|---|
| 17-1 | CLI-RSSI measurement | 1. Support CLI-RSSI measurement. The max number of resources across all CCs configured to measure RSSI shall not exceed 64. 2. Maximum number of measurement resources configured for CLI-RSSI measurement | cli-RSSI-Meas-r16 maxNumberCLI-RSSI-r16 |
| 17-2 | SRS-RSRP measurement | 1. Support SRS-RSRP measurement. The max number of SRS resources across all CCs configured to measure SRS-RSRP shall not exceed 32. 2. Maximum number of measurement resources across all CCs configured for SRS-RSRP measurement 3. Maximum number of measurement resources across all CCs configured for SRS-RSRP measurement within a slot A slot is based on minimum SCS among active BWPs across all CCs configured for SRS-RSRP measurement A SRS resource occasion that overlaps with the slot is counted as one measurement resource in the slot | cli-SRS-RSRP-Meas-r16 maxNumber-SRS-RSRPI-r16/ maxNumberPerSlotCLI-SRS-RSRP-r16 |

UE capability information 2: The UE capability may indicate capability as to whether simultaneous receptions are available for the UE when reception of CLI measurement resource and reception of scheduled DL signal and channel concurrently occur. The UE capability may be reported as information about each of measurement resources, and may be reported with parameter cli-RSSI-FDM-DL-r16 or cli-SRS-RSRP-FDM-DL-r16 of Table 38, below. The UE capability is optionally supported by the UE, and whether to support the UE capability may be explicitly reported to the BS.

TABLE 38

| Index | Feature group | Components | Field name in TS 38.331 [2] |
|---|---|---|---|
| 17-3 | Simultaneous reception of DL signals/ channels and CLI-RSSI measurement resource | Support simultaneous reception of DL signals/ channels and CLI-RSSI measurement resource | cli-RSSI-FDM-DL-r16 |
| 17-4 | Simultaneous reception of DL signals/channels | Support simultaneous reception of DL signals/channels | cli-SRS-RSRP-FDM-DL-r16 |

TABLE 38-continued

| Index | Feature group | Components | Field name in TS 38.331 [2] |
|---|---|---|---|
| | and SRS-RSRP measurement resource | and SRS-RSRP measurement resource | |

UE capability information 3: The UE that measures CLI described in an embodiment may not receive a DL signal transmitted from the BS while the UE performs measurement. If the UE reports cli-SRS-RSRP-FDM-DL or cli-RSSI-FDM-DL which is UE capability information to the BS and thus is capable of supporting frequency division multiplexing (FDM) reception, the BS may configure, based on the UE capability information, the UE with both CLI measurement and DL signal reception at the same time.

Table 39, below, shows UE capability information associated with CLI measurement defined in higher layer signaling information. Information indicating a maximum number of CLI measurement resources may be defined in the sub part of MeasAndMobParametersCommon, and information indicating a supportable CLI measurement resource type may be defined in MeasAndMobParametersFRX-Diff.

TABLE 39

| MeasAndMobParameters ::= measAndMobParametersCommon MeasAndMobParametersCommon OPTIONAL, measAndMobParametersXDD-Diff MeasAndMobParametersXDD-Diff OPTIONAL, measAndMobParametersFRX-Diff MeasAndMobParametersFRX-Diff OPTIONAL, | SEQUENCE { |
|---|---|

TABLE 39-continued

```
}
MeasAndMobParametersCommon ::=        SEQUENCE (
..//
    maxNumberCLI-RSSI-r16             ENUMERATED {n8, n16,
n32, n64}
OPTIONAL,
    maxNumberCLI-SRS-RSRP-r16         ENUMERATED {n4, n8, n16,
n32}
OPTIONAL
    maxNumberPerSlotCLI-SRS-RSRP-r16  ENUMERATED {n2, n4, n8}
OPTIONAL,
..//
}
MeasAndMobParametersFRX-Diff ::=      SEQUENCE (
..//
    cli-RSSI-Meas-r16                 ENUMERATED {supported}
OPTIONAL,
    cli-SRS-RSRP-Meas-r16             ENUMERATED {supported}
OPTIONAL
..//
}
}
```

Associated with Measurement Gap

In the NR system, a measurement gap has to be always configured, and this is because measurement of different radio access technology (RAT) types in an E-UTRA NR-dual connectivity (EN-DC) is necessary. In particular, in the Rel-15 NR system, a measurement gap is always configured for the following situations:

NR Inter-RAT measurement in LTE standalone (SA)
NR inter-RAT or inter-Freq. measurement in (NG)EN-DC
NR inter-Freq. measurement in NR SA
NR inter-Freq. measurement in NR-DC, and NE-DC
LTE inter-RAT. Measurement in NR SA
LTE Inter-RAT or Inter-Freq. measurement in NR-DC and NE-DC In the above, inter-RAT measurement indicates measurement of different RAT types, and inter-frequency measurement indicates measurement of different frequencies.

Also, in the LTE system, one measurement gap is signaled to the UE per UE. The LTE system may configure a 1-bit indicator per band in a band combination supported by the UE, and thus, indicates necessity of a measurement gap for measurement of bands of a particular band combination. (See Table 40, below)

TABLE 40

```
InterFreqBandList ::=         SEQUENCE (SIZE (1..maxBands)) OF
InterFreqBandInfo
InterFreqBandInfo ::=         SEQUENCE {
    interFreqNeedForGaps      BOOLEAN
}
InterRAT-BandList ::=         SEQUENCE (SIZE (1..maxBands)) OF
InterRAT-BandInfo
InterRAT-BandInfo ::=         SEQUENCE {
    interRAT-NeedForGaps      BOOLEAN
}
```

For example, when the UE supports a particular band combination of n bands and n NeedForGap bits are required for each band, i.e., when a measurement gap is required to measure each of n bands, the UE may set n NeedforGap bits to 1 per band in UE capability information and deliver it. Upon reception of the information, the BS may configure the UE with a measurement gap with respect to the n bands.

Unlike in the LTE system, in the NR system, three types of a measurement gap for the UE exist. The three types are measurement gap per UE (gapUE), measurement gap per FR1 (gapFR1), and measurement gap per FR2 (gapFR2). Each measurement gap is configured by gap offset (gapOffset), a gap repetition period (mgrp), a measurement gap timing advance (mgta) (i.e., gap compensation value), a gap length (mgl), and the like. (See Table 41, below)

TABLE 41

```
MeasGapConfig ::=                  SEQUENCE {
    gapFR2                             SetupRelease { GapConfig
}                  OPTIONAL,  -- Need M
    ...,
    [[
    gapFR1                             SetupRelease { GapConfig
}                  OPTIONAL,  -- Need M
    gapUE                              SetupRelease { GapConfig
}                  OPTIONAL   -- Need M
    ]]
}
GapConfig ::=                      SEQUENCE {
    gapOffset                          INTEGER (0..159),
    mgl                                ENUMERATED {ms1dot5,
ms3, ms3dot5, ms4, ms5dot5, ms6},
    mgrp                               ENUMERATED {ms20, ms40,
ms80, ms160},
    mgta                               ENUMERATED {ms0,
ms0dot25, ms0dot5},
    ...,
    [[
    refServCellIndicator               ENUMERATTED {pCell,
pSCell, mcg-FR2}   OPTIONAL   -- Cond NEDCorNRDC
    ]]
}
```

There are 24 types of measurement gap patterns which are configurable for the UE, and they are divided based on measurement gap lengths and measurement gap repetition periods. (See Table 42, below)

TABLE 42

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |

TABLE 42-continued

| Gap Pattern Id | Measurement Gap Length (MGL, ms) | Measurement Gap Repetition Period (MGRP, ms) |
| --- | --- | --- |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3 5 | 80 |
| 19 | 3.5 | 160 |
| 20 | 1.5 | 20 |
| 21 | 1.5 | 40 |
| 22 | 1.5 | 80 |
| 23 | 1.5 | 160 |

Also, in the NR system, measurement gap patterns of the UE which are applicable according to serving cell configurations are defined. A measurement gap pattern in an EN-DC situation follows Table 43, below.

TABLE 43

| Measurement gap pattern configuration | Serving cell | Measurement Purpose | Applicable Gap Pattern Id |
| --- | --- | --- | --- |
| Per-UE measurement gap | E-UTRA + FR1, or E-UTRA + FR2, or E-UTRA + FR1 + FR2 | non-NR RAT[Note1,2] FR1 and/or FR2 non-NR RAT[Note1,2] and FR1 and/or FR2 | 0, 1, 2, 3 0-11 0, 1, 2, 3, 4, 6, 7, 8, 10 |
| Per FR measurement gap | E-UTRA and, FR1 if configured FR2 if configured E-UTRA and, FR1 if configured FR2 if configured E-UTRA and, FR1 if configured FR2 if configured E-UTRA and, FR1 if configured FR2 if configured E-UTRA and, FR1 if configured FR2 if configured E-UTRA and, FR1 if configured FR2 if configured E-UTRA and, FR1 if configured FR2 if configured | non-NR RAT[Note1,2]  FR1 only  FR2 only  non-NR RAT[Note1,2] and FR1  FR1 and FR2  non-NR RAT[Note1,2] and FR2  non-NR RAT[Note1,2] and FR1 and FR2 | 0, 1, 2, 3  No gap 0-11 No gap No gap  12-23 0, 1, 2, 3, 4, 6, 7, 8, 10 No gap 0-11  12-23 0, 1, 2, 3, 4, 6, 7, 8, 10 12-23 0, 1, 2, 3, 4, 6, 7, 8, 10 12-23 |

The UE operating in an NR SA mode follows Table 44, below.

TABLE 44

| Measurement gap pattern configuration | Serving cell | Measurement Purpose | Applicable Gap Pattern Id |
| --- | --- | --- | --- |
| Per-UE measurement gap | E-UTRA + FR1, or E-UTRA + FR2, or E-UTRA + FR1 + FR2 | non-NR RAT[Note1,2] FR1 and/or FR2 non-NR RAT[Note1,2] and FR1 and/or FR2 | 0, 1, 2, 3 0-11 0, 1, 2, 3, 4, 6, 7, 8, 10 |
| Per FR measurement gap | E-UTRA and, FR1 if configured FR2 if configured E-UTRA and, FR1 if configured FR2 if configured E-UTRA and, FR1 if configured FR2 if configured E-UTRA and, FR1 if configured FR2 if configured E-UTRA and, FR1 if configured FR2 if configured E-UTRA and, FR1 if configured FR2 if configured E-UTRA and, FR1 if configured FR2 if configured | non-NR RAT[Note1,2]  FR1 only  FR2 only  non-NR RAT[Note1,2] and FR1  FR1 and FR2  non-NR RAT[Note1,2] and FR2  non-NR RAT[Note1,2] and FR1 and FR2 | 0, 1, 2, 3  No gap 0-11 No gap No gap  12-23 0, 1, 2, 3, 4, 6, 7, 8, 10 No gap 0-11  12-23 0, 1, 2, 3, 4, 6, 7, 8, 10 12-23 0, 1, 2, 3, 4, 6, 7, 8, 10 12-23 |

In Tables 43 and 44, above, actual measurement gap patterns are mapped to which measurement gap per UE or measurement gap per FR1/FR2 is applied. In the NR system, a measurement gap is necessarily configured for measurement of neighboring RAT and frequency, and is statically configured for a UE by sharing, between a BS and a network, information such as a measurement gap, a delivery location of a reference signal, and the like.

Figure 19:
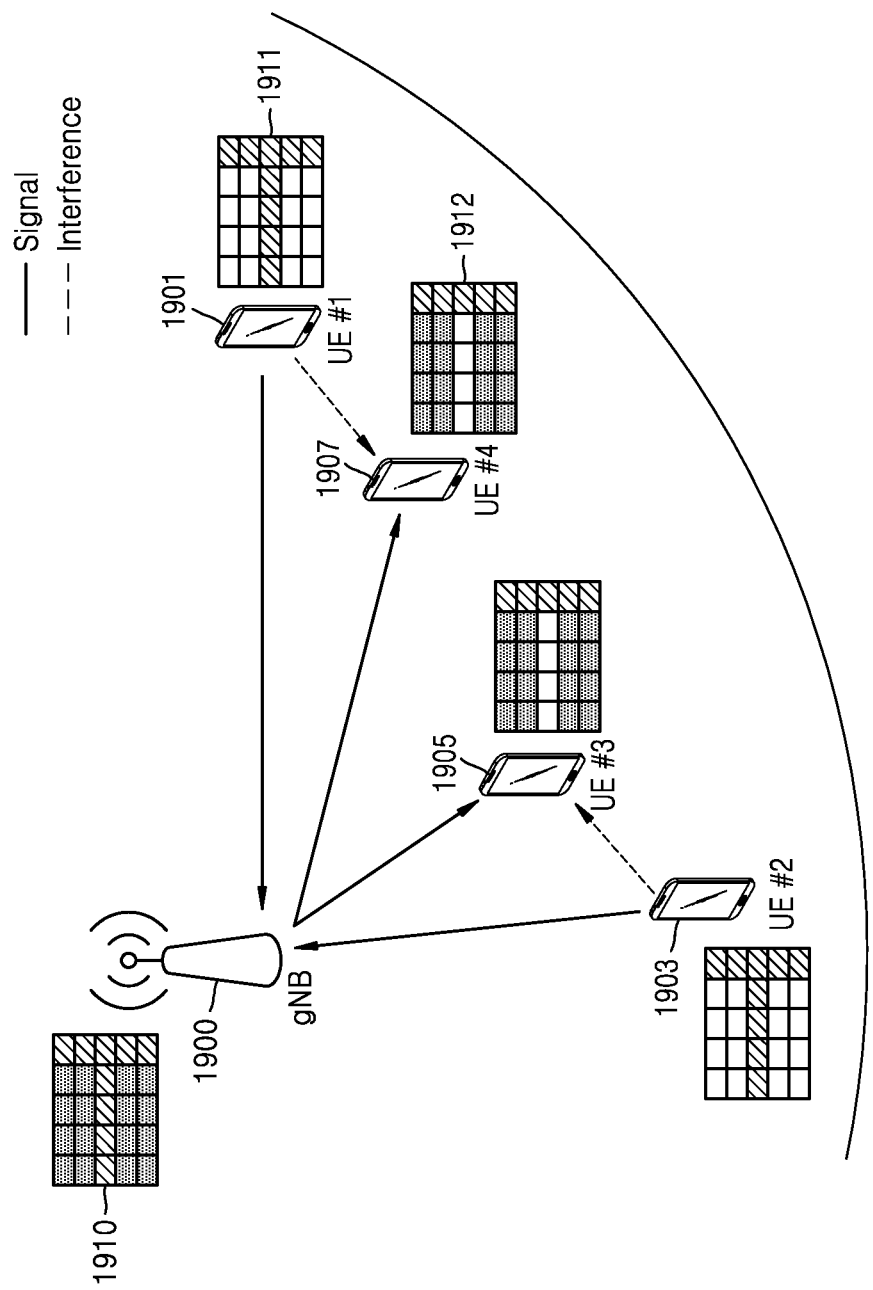
FIG. 19 illustrates an example of a CLI situation within a cell in an operation of a semi-static XDD system according to an embodiment.

FIG. 19 illustrates an example of a CLI situation within a cell in an operation of a semi-static XDD system according to an embodiment.

Referring to FIG. 19, a BS 1900 may operate a resource configuration 1910 for semi-XDD. For example, the BS 1900 may allocate UL-DL configuration 1912 to a UE #3 1905 and a UE #4 1907 which are located at a center of a cell and have more DL traffic than UL traffic. As another example, UL-DL configuration 1911 may be allocated to a UE #1 1901 and a UE #2 1903 which are located at an edge of the cell and for which UL coverage is critical. On the other hand, the BS 1900 may provide, according to a channel state, single UE scheduling or multi-UE simultaneous scheduling to UEs to which a service is to be provided. Here, the BS 1900 may determine scheduling based on a channel state of each UE, and an amount of interference from neighboring UEs. For example, a situation may be assumed in which the UE #3 1905 configured with a DL-prioritized resource and one of the UE #1 1901 or the UE #2 1903 configured with a UL-prioritized resource are to be simultaneously scheduled. As a propagation distance between the UE #3 1905 and the UE #2 1903 is smaller than a propagation distance between the UE #3 1905 and the UE #1 1901, a UL signal transmitted from the UE #2 1903 may cause a larger interference impact on DL reception by the UE #3 1905, compared to a UL signal transmitted from the UE #1 1901. Therefore, the UE #3 1905 may prefer simultaneous scheduling with the UE #1 1901 to simultaneous scheduling with the UE #2 1903. From the BS (system) perspective, it may be efficient to simultaneously schedule the UE #1 1901 and the UE #3 1905 so as to prevent DL reception performance degradation.

Figure 20:
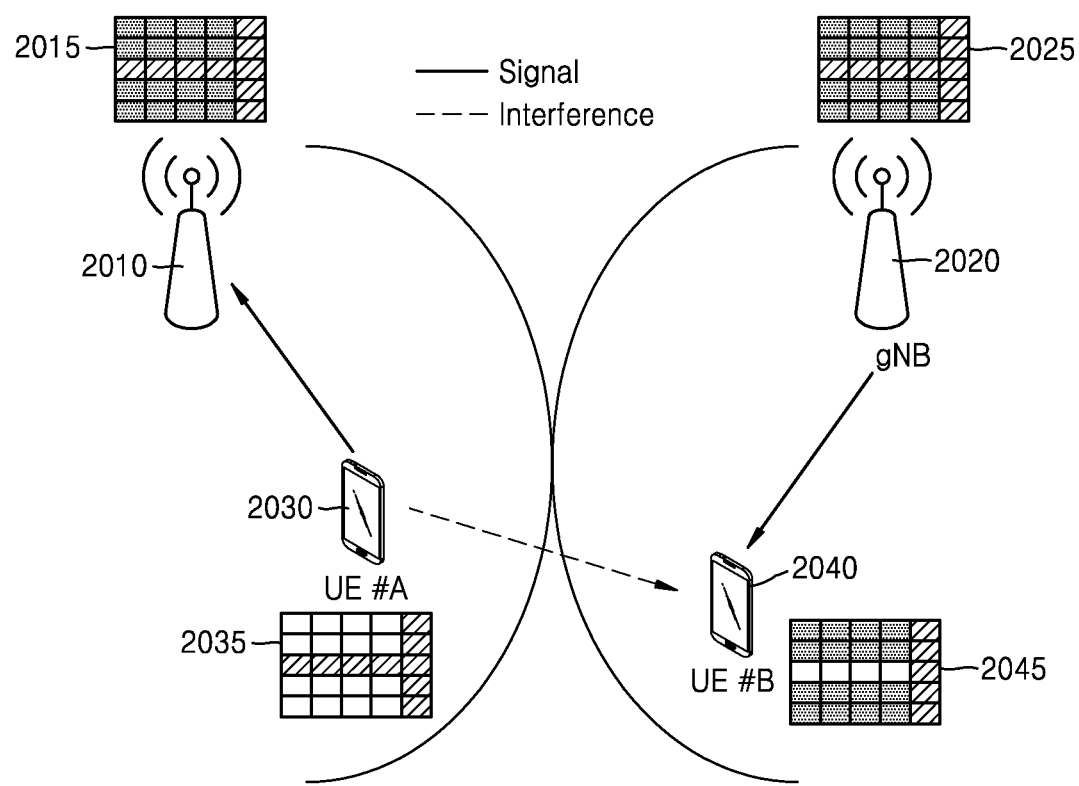
FIG. 20 describes an example of a CLI situation between cells in an operation of a semi-static XDD system according to an embodiment.

FIG. 20 describes an example of a CLI situation between cells in an operation of a semi-static XDD system according to an embodiment.

In the operation of the semi-static XDD system, inter-cell interference between neighboring UEs, as shown in FIG. 20, may also be the same as those described with reference to FIG. 19.

A BS #1 2010 may operate a resource configuration 2015 for semi-static XDD. Also, a gNB (BS) #2 2020 may operate a resource configuration 2025 for semi-static XDD. Referring to FIG. 20, as a propagation distance between a UE #A 2030 and a UE #B 2040 is small, a UL signal transmitted by the UE #A 2030 may cause an interference impact on DL reception by the UE #B 2040. In order to prevent DL reception performance degradation, the BS #1 2010 and the BS #2 2020 may need to perform scheduling by considering the interference impact between the UE #A 2030 and the UE #B 2040.

For example, the BS #1 2010 may allocate UL-DL configuration 2035 to the UE #A 2030 that transmits a UL. Also, the BS #2 2020 may allocate UL-DL configuration 2045 to the UE #B 2040 with more DL traffic than UL traffic. The BS #1 2010 and the BS #2 2020 may provide, according to a channel state, single UE scheduling or multi-UE simultaneous scheduling to UEs to which a service is to be provided. Here, the BS #1 2010 and the BS #2 2020 may determine scheduling based on a channel state of each UE, and an amount of interference from neighboring UEs.

Figure 21:
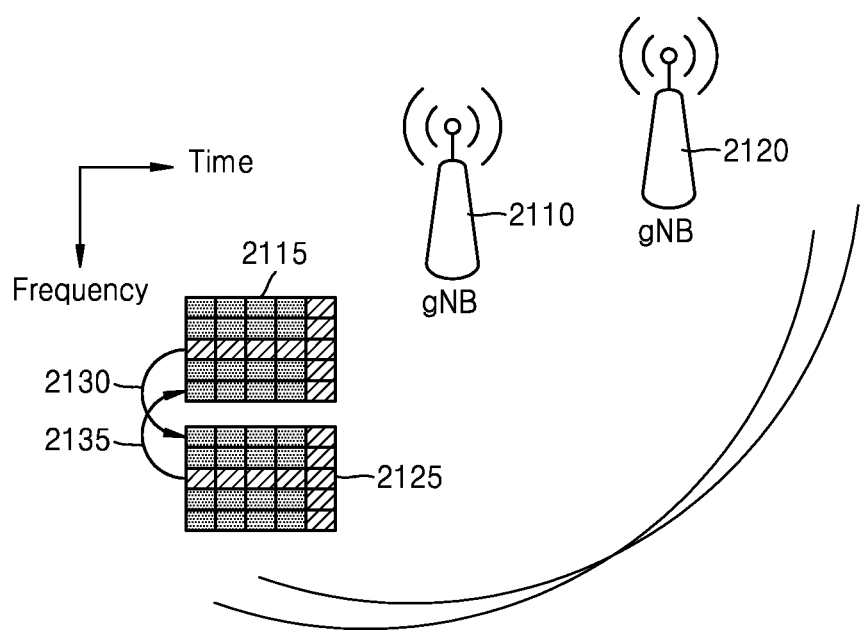
FIG. 21 describes an example of a CLI situation between different operators in an operation of a semi-static XDD system according to an embodiment.

FIG. 21 describes an example of a CLI situation between different operators in an operation of a semi-static XDD system according to an embodiment.

Interference between different operators (see FIG. 21) may also be the same as those described with reference to FIG. 19.

A gNB #1 (or Operator #1) 2110 may operate a resource configuration 2115 for semi-static XDD. Also, a gNB #2 (or Operator #2) 2120 may operate a resource configuration 2125 for semi-static XDD. Referring to FIG. 21, as frequency bands of the resource configurations 2115 and 2125 operated by the gNB #1 2110 and the gNB #2 2120 are adjacent, signals respectively transmitted from the gNB #1 2110 and the gNB #2 2120 may cause interference impacts 2130 and 2135 on each other. In order to avoid an interference impact, the gNB #1 2110 and the gNB #2 2120 may need to schedule resources by considering an interference impact between the gNB #1 2110 and the gNB #2 2120.

As described above with reference to FIGS. 19, 20, and 21, in order to maximize performance of an XDD operating system, a BS may need to check an amount of interference between UEs performing different operations (DL reception or UL transmission) at a same time point and may reflect the amount of interference to scheduling.

The disclosure relates to a method and apparatus for measuring and reporting interference between UEs in a wireless communication system. For a dynamic TDD system, as CLI UE capability information and CLI measurement described above, Rel-16 supports that a DL receiving UE reports SRS-RSRP measured on a resource configured based on a periodic SRS resource of a neighboring UE and/or CLI-RSSI on a configured specific resource to a BS by a higher layer message after L3 filtering. In the XDD system operation, a UE for which UL coverage is critical may be switched to UL transmission-prioritized DL-UL configuration by UE-specific higher layer signaling. Therefore, UE-specific configuration information is changed, and thus, interference between UEs not only in different cells but also within a cell and different operators may occur, such that there is a demand for an interference measurement and reporting method that is appropriate for such environment and can maximize performance of XDD. In Rel-16, CLI measurement and reporting information is configured by cell-specific signaling and thus may not be appropriate for an environment in which allocation of UL-DL configuration is flexible depending on UE situations. Also, as CLI measured by a UE is L3 filtered and is then reported to a BS by an RRC message, a feedback delay time is relatively long. In order to prevent DL reception performance degradation and maximize overall system performance in an operation of an XDD system, in an operation of the semi-static XDD system there is a demand for configuration for a UE to perform CLI measurement and reporting, based on UL-specific configuration information. Also, there is a demand for a method by which the UE can measure CLI and report it with a relatively short feedback delay time. To this end, the disclosure provides a detailed description of a semi-persistent CLI measurement configuration method based on semi-static XDD, a CLI measurement activation/deactivation method, an L2-signaling based CLI reporting method, and a method of measuring CLI on a BWP for which CLI measurement is requested.

Hereinafter, when a UE measures interference between UEs, the measurement may be called with various terms including CLI, inter-UE interference, interference measurement, CLI measurement, and the like. For clarity, the above terms may be interpreted to have the same meaning as CLI measurement.

Hereinafter, a time-domain operation of CLI measurement may include periodic measurement, aperiodic measurement, or semi-persistent measurement, and the term CLI measurement may include all time-domain operations, unless there is an indication of a separate time-domain operation.

Hereinafter, CLI measurement may be variously expressed for one scenario such as in-cell, the same cell, the same serving cell, or the like. The expressions above may indicate that an interference-causing UE and a measuring UE are present together in one cell.

A base station is an entity that allocates resources to a terminal, and may be at least one of gNode B, gNB, eNode B, Node B, BS, a radio access unit, a BS controller, or a node on a network. A terminal may include a UE, an MS, a cellular phone, a smartphone, a computer, or a multimedia system capable of performing a communication function. Although 5G system is described as an example for embodiments of the disclosure, the embodiments may also be applied to other communication systems having similar technical backgrounds or channel types. For example, mobile communication technologies developed after LTE or LTE-A mobile communication and 5G may be included therein. Therefore, the embodiments may also be applied to other communication systems through partial modification without greatly departing from the scope of the disclosure based on determination by one of ordinary skill in the art. The embodiments may be applied to XDD system as well as FDD and TDD systems.

In the disclosure, detailed explanations of the related art are omitted when deemed that they may unnecessarily obscure the essence of the disclosure.

In the following description of the disclosure, higher layer signaling may include at least one of signaling below or may refer to signaling including a combination of signaling below:

MIB
SIB or SIB X (X=1, 2, . . . )
RRC (Radio Resource Control)
MAC CE

L1 signaling may refer to signaling corresponding to at least one or a combination of signaling methods using a physical layer channel or signaling below:

PDCCH
DCI
UE-specific DCI
group common DCI
common DCI
scheduling DCI (e.g., DCI used for scheduling DL or UL data)
non-scheduling DCI (e.g., DCI not used for scheduling DL or UL data)
PUCCH
uplink control information (UCI)

Hereinafter, determining priorities between A and B may refer to selecting one of A and B which has a higher priority according to a preset priority rule and performing an operation corresponding thereto or omitting or dropping an operation for the other one having a lower priority.

The above examples will now be described in several embodiments, but the examples are not independent and one or more embodiments may be applied simultaneously or in combination.

Embodiment 1: L2 Signaling-Based CLI Reporting Method

In an embodiment, a method by which measured CLI is reported by L2 signaling, i.e., in the form of MAC CE and a subheader, will now be described. To this end, a sub-embodiment thereof may include a CLI reporting triggering method indicating with which reference a UE is to perform a CLI reporting operation, and a method by which the UE reports CLI by L2 signaling. Also, a method of configuring CLI measurement indication information in a MAC CE and subheader format and a method, performed by the UE, of configuring a value of CLI reporting based on the MAC CE and subheader format will now be described in detail in embodiments of the disclosure.

Embodiment 1-1: Method of Triggering CLI Reporting

In an embodiment, a method by which the UE triggers CLI reporting so as to perform L2-signaling based CLI reporting operation will now be described. L2 signaling from the UE to the BS, i.e., a form of MAC-CE format based report may be transmission of data included in UL-SCH. Accordingly, the UE may transmit a CLI measurement value on a PUSCH resource scheduled by the BS. Before the PUSCH is scheduled, the UE may be configured, by the BS, with information regarding when to report measured CLI. Also, the UE may be configured, by the BS via higher layer configuration information, on which resource the UE performs measurement and reporting of a value and a type of the value. For example, a CLI type to be measured by the UE may be configured as report quantity, and a type of the report quantity may be configured as L1-filtered L1-SRS-RSRP or L1-CLI-RSSI, or L3-filtered SRS-RSRP or CLI-RSSI.

Method 1: Event-Based CLI Reporting Triggering Method

An embodiment may provide a method by which the UE performs a process, for a CLI reporting event configured by the BS, of triggering and reporting a CLI report to the BS. The UE may be configured, by the BS via higher layer signaling, CLI measurement resource and report information, and may be configured with a plurality of pieces of information to be required for in a CLU reporting procedure, according to the configured CLI measurement resource and report information. The UE may perform, based on measurement configuration configured by the BS, a periodic measurement operation or a semi-persistent measurement operation as a time-domain operation of CLI measurement. If the UE is configured with periodic CLI measurement, the UE may determine event occurrence while performing periodic measurement after the measurement is configured by the BS. On the other hand, when the UE is configured with semi-persistent CLI measurement, the UE may perform measurement immediately after the UE receives an indication of activation of semi-persistent measurement from the BS, and may perform an event-based reporting operation after a time point of reception of the indication of activation.

A plurality of pieces of event-associated information required in the CLI reporting triggering procedure may include at least one of a plurality of pieces of information including CLI-threshold as a reference value of CLI count, CLI-maxCount indicating a maximum value of CLI trigger count, CLI-Timer indicating a reset value of a CLI event timer, CLI-timer-periodicity indicating periodicity of a timer, and the like. That is, the UE may perform measurement according to CLI measurement resource configuration configured by the BS. Also, the UE may determine whether an event configured by the BS occurs while the UE performs CLI measurement.

Figure 22:
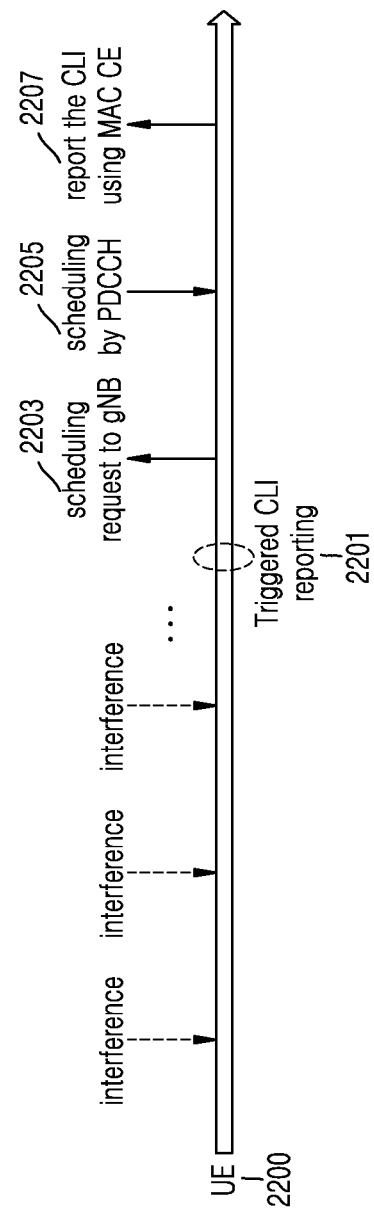
FIG. 22 describes event based CLI reporting according to an embodiment.

FIG. 22 describes event based CLI reporting according to an embodiment.

With reference to FIG. 22, a UE 2200 may trigger (2201) CLI reporting when an event occurs while the UE 2200 performs CLI measurement, and if an event does not occur, the UE 2200 may not perform triggering of reporting. For example, when the CLI reporting is triggered (operation 2201), the UE 2200 may configure a MAC CE format and subheader for a value of CLI reporting, and may request, on a PUCCH, scheduling (operation 2203) to report CLI. Also, the UE 2200 may receive, on a PDCCH, scheduling for CLI reporting from the BS (operation 2205). Afterward, the UE 2200 may transmit, on a scheduled PUSCH, CLI reporting information to the BS (operation 2207). The UE may repeat operations described above until the UE 2200 receives, from the BS, a deactivation signal or a measurement and reporting reconfiguration indication.

Here, event configuration may be one of the following types:

Event 1. To trigger CLI reporting CLI exceeding CLI-threshold reaches CLI-maxCount until configured expiration of CLI-timer Event 2. To trigger CLI reporting when a timer expires after configuration of CLI report timer.

Figure 23:
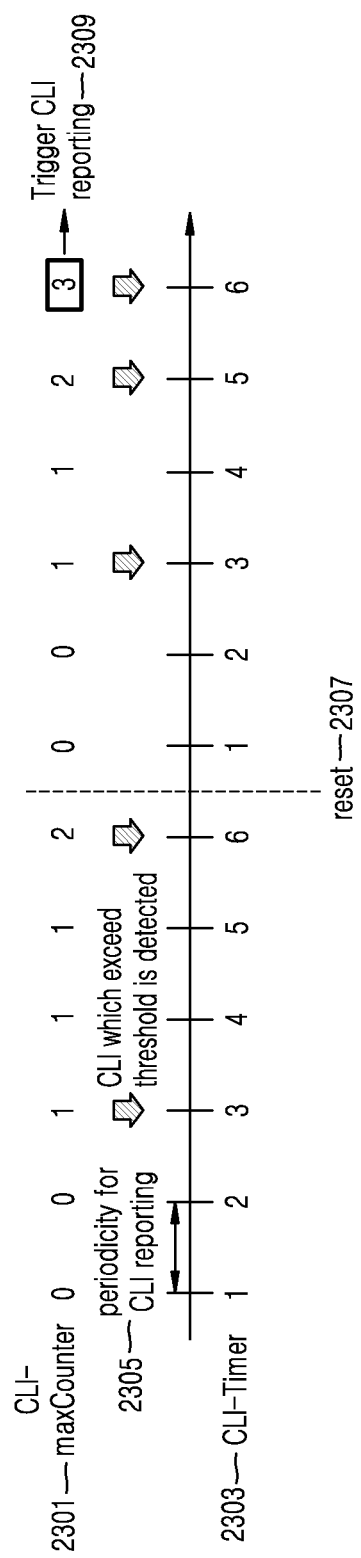
FIG. 23 illustrates an example of an operation performed by a UE when CLI reporting is triggered according to an embodiment.

FIG. 23 illustrates an example of an operation performed by a UE when CLI reporting is triggered according to an embodiment.

In FIG. 23, CLI-maxCounter 2301 may indicate whether a measured CLI value exceeds a configured threshold value. For example, a maximum value of CLI-maxCounter 2301 may be a value of 3. Also, CLI-Timer 2303 may have a value of 6. In FIG. 23, CLI-Timer 2303 may increase by 1 for each period 2305 and may be reset when it reaches 6. Also, CLI-maxCounter 2301 counts by 1 when measured CLI exceeds a threshold value, and when CLI-maxCounter 2301 reaches a configured maximum value of 3, CLI-maxCounter 2301 may trigger CLI reporting (operation 2309). If CLI-maxCounter 2301 does not reach the configured value of 3 until CLI-Timer 2303 reaches 6, CLI-maxCounter 2301 is reset (operation 2307) and CLI reporting is not triggered. The UE may repeat the operations until CLI reporting deactivation or CLI measurement and reporting reconfiguration is configured by the BS. By using the method according to the above embodiment, the BS may configure the UE with various events being appropriate for the UE and cell environment, according to at least one configuration among a threshold value, a timer value, or a maximum count value, such that a degree of freedom may be obtained with respect to CLI measurement resource and reporting configuration.

Method 2: Method of Triggering Period CLI Reporting after Occurrence of Event

A method by which the UE performs a process of triggering and reporting CLI report one time, and performs periodic reporting after a CLI report event will now be described.

The UE may be configured, by the BS via higher layer signaling, CLI measurement resource and report information, and may be configured with a plurality of pieces of information to be required in a CLU reporting procedure, according to the configured CLI measurement resource and report information. The UE may perform, based on measurement configuration configured by the BS, a periodic measurement operation or a semi-persistent measurement operation as a time-domain operation of CLI measurement. If the UE is configured with periodic CLI measurement, the UE may determine event occurrence while performing periodic measurement after the measurement is configured by the BS. On the other hand, when the UE is configured with semi-persistent CLI measurement, the UE may perform measurement immediately after the UE receives an indication of activation of semi-persistent measurement from the BS, and may perform an event-based reporting operation after a time point of reception of the indication of activation. After initial CLI event occurrence and reporting, the UE may perform a periodic CLI reporting operation.

A plurality of pieces of event-associated information required in the CLI reporting triggering procedure may include at least one of a plurality of pieces of information including CLI-threshold as a reference value of CLI count, CLI-maxCount indicating a maximum value of CLI trigger count, CLI-Timer indicating a reset value of a CLI event timer, CLI-timer-periodicity indicating periodicity of a timer, periodicity CLI-periodicity for performing periodic reporting after event occurrence and reporting, and the like. That is, the UE may perform measurement according to CLI measurement resource configuration configured by the BS. Also, the UE may determine whether an event configured by the BS occurs while the UE performs CLI measurement. The UE may trigger CLI reporting when an event occurs, and if an event does not occur, the UE may not perform triggering of reporting. When the CLI reporting is triggered, the UE may configure a MAC CE format and subheader for a value of CLI reporting, and may transmit, on a scheduled PUSCH, CLI reporting information to the BS. After the UE performs a process from event occurrence to reporting one time, the UE may perform a periodic reporting operation.

Figure 24:
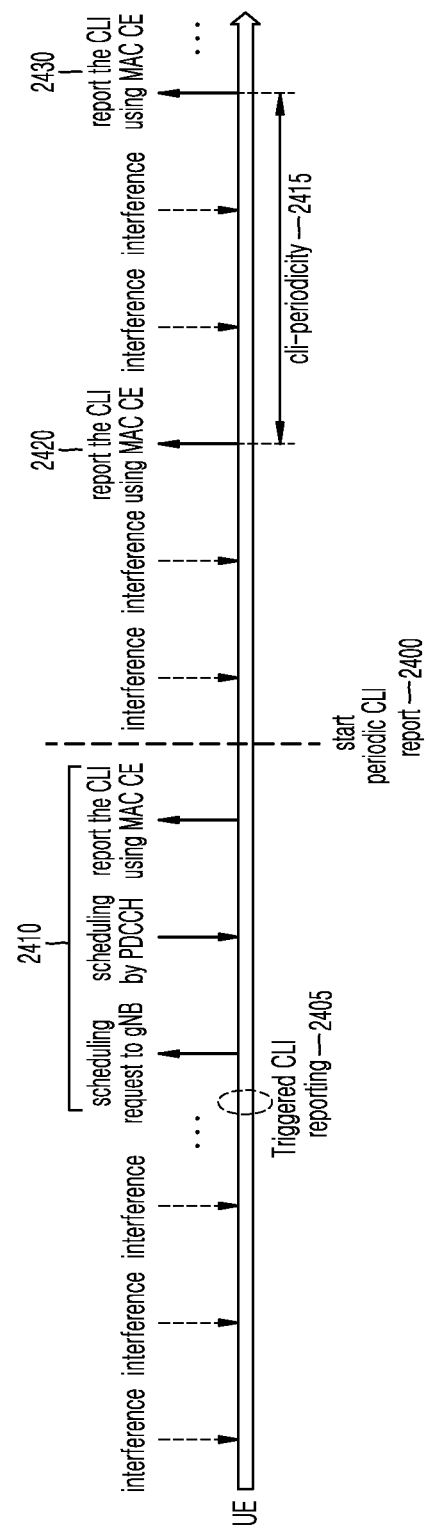
FIG. 24 illustrates an example of an operation performed by a UE when an event for CLI measurement and periodic reporting after the event are configured according to an embodiment.

FIG. 24 illustrates an example of an operation performed by a UE when an event for CLI measurement and periodic reporting after the event are configured according to an embodiment.

As described above in the CLI triggering process according to the Method 1 with reference to FIG. 23, when CLI-maxCounter of the UE reaches a maximum value within CLI-Timer, the UE may trigger CLI reporting (operation 2405). The UE may perform a CLI reporting operation 2410 only one time in response to initial CLI event occurrence, and then may start periodic CLI reporting (operation 2400). The UE may report CLI (operations 2420 and 2430) at intervals of CLI-periodicity 2415. For example, the UE may periodically report CLI (operation 2420 and 2430) by using an MAC CE. The UE may continue reporting until the BS indicates deactivation of a corresponding operation or reconfiguration of CLI measurement and reporting. The method is performed assuming that inter-UE interference continuously occurs when an event occurs one time, and as a CLI report is periodically obtained, more accurate inter-UE interference situation can be detected.

Method 3: Periodic CLI Reporting Method

The UE may perform periodic CLI reporting based on periodicity configured by the BS.

The UE may be configured, by the BS via higher layer signaling, with a CLI measurement resource and report information, and may be configured with a plurality of pieces of information to be required for in a CLU reporting procedure, according to the configured CLI measurement resource and report information. The UE may perform, based on measurement configuration configured by the BS, a periodic measurement operation or a semi-persistent measurement operation as a time-domain operation of CLI measurement. If the UE is configured with periodic CLI measurement, the UE may determine event occurrence while performing periodic measurement after the measurement is configured by the BS. On the other hand, when the UE is configured with semi-persistent CLI measurement, the UE may perform measurement immediately after the UE receives an indication of activation of semi-persistent measurement from the BS, and may perform an event-based reporting operation after a time point of reception of the indication of activation.

Figure 25:
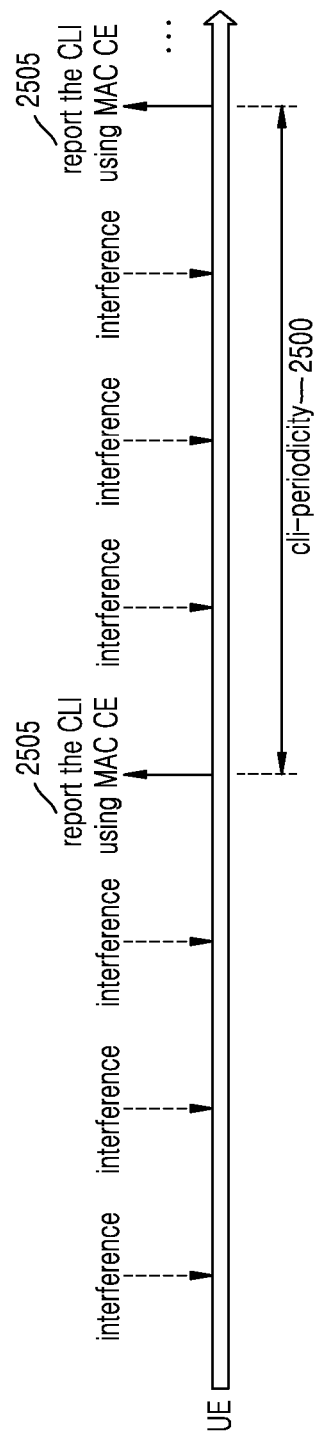
FIG. 25 illustrates an operation performed by a UE when periodic reporting for CLI measurement is configured according to an embodiment.

Referring to FIG. 25, as further described below, the UE may be configured, by the BS, with CLI-periodicity 2500 for periodic reporting. That is, after the UE performs measurement according to CLI measurement resource configuration configured by the BS, the UE may perform a CLI reporting operation according to the configured reporting periodicity. The UE may configure a CLI measurement value according to a MAC CE and subheader format at every CLI reporting periodicity, and may transmit, on a scheduled PUSCH, CLI reporting information to the BS.

FIG. 25 illustrates an operation performed by the UE when periodic reporting for CLI measurement is configured according to an embodiment.

In FIG. 25, CLI-periodicity 2500 may indicate a gap between current reporting and a very next reporting. Here, a unit of CLI-periodicity 2500 may be a symbol unit and/or a slot unit. In FIG. 25, when it is assumed that a periodic operation is performed as a CLI measurement operation, if CLI-periodicity 2500 that is a reporting period comes, the UE may configure a value of CLI reporting based on a MAC CE and subheader format. After that, the UE may report, on a scheduled PUSCH, the value of CLI reporting (operation 2505). The method has advantage in that an amount of interference received by a DL UE may be continuously monitored via periodic CLI reporting.

Embodiment 1-2: Method of Performing L2-Signaling Based CLI Reporting

A method of performing a L2-signaling based CLI reporting operation will now be described. The CLI reporting method may be performed via a PUSCH, and a CLI report may be transmitted on the PUSCH determined based on at least one of the PUSCH time resource configuration, a transmission scheme, or a transmission preparation procedure time. The CLI reporting operation in consideration of a PUSCH will now be described in detail with reference to methods below.

Method 1—Performing CLI Reporting Based on Scheduling Request

A method by which the UE receives scheduling of a PUSCH for CLI report transmission so as to perform the L2-signaling based CLI reporting operation will now be described. As described above in the Embodiment 1-1, when a particular event occurs or periodic CLI reporting is triggered, the UE may use PUSCH transmission so as to transmit measured-CLI associated information. If there is no PUSCH for transmission, the UE may request the BS for PUSCH scheduling. Here, a request from the UE to the BS may be a scheduling request using transmission of PUCCH or PRACH or PUSCH including a scheduling request (SR). The UE may include scheduling request information in the transmission, and the scheduling request may be a scheduling request for a PUSCH for CLI report transmission. Configuration information about the scheduling request may be configured for the UE by higher layer signaling, and schedulingRequestConfig in MAC-CellGroupConfig may be referred to for CLI reporting. Also, schedulingRequestId may be configured for the scheduling request, or schedulingRequestId-CLI that is CLI-dedicated ID may be configured.

According to the method, the UE may selectively feed back CLI-associated information, and may decrease unnecessary CLI reporting, such that waste of UL resources may be prevented.

Method 2—Performing CLI Reporting without Consideration of Scheduling Request

In Method 2, reporting is performed by using a UL data transmission resource pre-scheduled for CLI reporting. When CLI reporting is triggered according to at least one method of Method 1, Method 2, or Method 3 of CLI reporting configuration in the Embodiment 1-1 described above, and a UL transmission resource allocated by DCI can contain a MAC entity for CLI reporting and a subheader for the MAC entity, the UE may perform CLI reporting on the UL resource. Here, the UL resource may indicate a resource associated with UL transmission scheduled by a first DCI format or first UL grant which schedules initial transmission of a transport block (TB) after CLI reporting is triggered. That is, after triggering of CLI reporting occurs, the UE may perform CLI reporting via UL transmission scheduled by the first DCI format or the first UL grant among UL resources which can contain the MAC entity for CLI reporting and the subheader for the MAC entity. The method has an advantage in that the UE can perform CLI reporting without a separate scheduling request. When a CLI measurement resource is present between a triggering point and a reporting point, a CLI report even including information measured on a corresponding resource may be transmitted. When a CLI measurement resource according to another embodiment is not present between a triggering point and a reporting point, a CLI report may be transmitted based on information measured on a most-recent CLI resource on which CLI triggering is transmitted.

Method 3—Performing CLI Reporting in Consideration of UL Data Transmission

Method 3 is a method by which the UE performs L2-signaling based CLI reporting when there is UL data transmission, without a scheduling request. According to Method 1 of Embodiment 1-2, as described above, the UE may request the BS for scheduling only for CLI reporting. However, the present Method 3 may indicate that the UE performs CLI reporting together with UL data transmission when the UL data transmission is present, not another CLI reporting.

For example, when CLI reporting is triggered according to at least one of Method 1, Method 2, or Method 3, the UE may not request the BS for scheduling but may suspend CLI reporting until UL data transmission occurs. To do so, the UE may be configured, by the BS, with information about a time point up to which UL data transmission is to wait. For example, when UL data transmission occurs in a configured CLI reporting standby time, CLI reporting information may also be included and reported. If the CLI reporting standby time is expired, suspended CLI report data is reset, and the UE may re-perform configured measurement and reporting. The present Method 3 has advantage in that a separate UL resource for CLI report transmission is not allocated and thus a resource may be saved.

Method 4—Performing CLI Reporting Via Configured UL Data Transmission Resource

Method 4 is a method by which the UE performs CLI reporting on a PUSCH resource configured for the UE by the BS.

That is, according to the Method 4, PUSCH resource scheduling for L2-signaling based CLI reporting by the UE may operate not as dynamic scheduling by UL grant in DCI but as configured grant Type 1 or Type 2. Here, configured grant Type 1 PUSCH transmission may be semi-statically configured via reception, by higher layer signaling, of configuredGrantConfig including rrc-ConfiguredUplinkGrant of Table 45-1, below. After configuredGrantConfig that does not include rrc-ConfiguredUplinkGrant of Table 45-1 is received by higher layer signaling, configured grant Type 2 PUSCH transmission may be semi-persistently scheduled by UL grant in DCI.

The BS may pre-configure, by higher layer signaling, the UE with a PUSCH resource for L2-signaling CLI reporting. The UE may perform L2-signaling based CLI reporting on the configured PUSCH resource. For example, when periodic CLI reporting of the Method 3 of the Embodiment 1-1, as described above is configured, the UE may perform periodic CLI reporting on the configured PUSCH resource. As another example, when event-based CLI reporting of Method 1 or Method 2 of Embodiment 1-1, as described above is configured, the PUSCH resource configured for the UE may be in an inactive state until an event occurs. Here, when a configured event occurs and thus CLI reporting is requested, the UE may perform CLI reporting on the configured PUSCH resource. As another example, the PUSCH resource configured for the UE for CLI reporting may be controlled by activation/deactivation indication information of the BS.

TABLE 45-1

```
ConfiguredGrantConfig ::=         SEQUENCE {
    frequencyHopping                  ENUMERATED {intraSlot, interSlot}
OPTIONAL,   -- Need S,
    cg-DMRS-Configuration             DMRS-UplinkConfig,
    mcs-Table                         ENUMERATED {qam256, qam64LowSE}
OPTIONAL,   -- Need S
    mcs-TableTransformPrecoder        ENUMERATED {qam256, qam64LowSE}
OPTIONAL,   -- Need S
    uci-OnPUSCH                       SetupRelease { CG-UCI-OnPUSCH }
OPTIONAL,   -- Need M
    resourceAllocation                ENUMERATED { resourceAllocationType0,
resourceAllocationType1, dynamicSwitch },
    rbg-Size                          ENUMERATED {config2}
OPTIONAL,   -- Need S
    powerControlLoopToUse             ENUMERATED {n0, n1},
    p0-PUSCH-Alpha                    P0-PUSCH-AlphaSetId,
    transformPrecoder                 ENUMERATED {enabled, disabled}
OPTIONAL,   -- Need S
    nrofHARQ-Processes                INTEGER(1..16),
    repK                              ENUMERATED {n1, n2, n4, n8},
    repK-RV                           ENUMERATED {s1-0231, s2-0303, s3-0000}
OPTIONAL,   -- Need R
    periodicity                       ENUMERATED {
                                          sym2, sym7, sym1x14, sym2x14,
sym4x14, sym5x14, sym8x14, sym10x14, sym16x14, sym20x14,
                                          sym32x14, sym40x14, sym64x14,
sym80x14, sym128x14, sym160x14, sym256x14, sym320x14, sym512x14,
                                          sym640x14, sym1024x14, sym1280x14,
sym2560x14, sym5120x14,
                                          sym6, sym1x12, sym2x12, sym4x12,
sym5x12, sym8x12, sym10x12, sym16x12, sym20x12, sym32x12,
                                          sym40x12, sym64x12, sym80x12,
sym128x12, sym160x12, sym256x12, sym320x12, sym512x12, sym640x12,
                                          sym1280x12, sym2560x12
    },
    configuredGrantTimer              INTEGER (1..64)
OPTIONAL,   -- Need R
    rrc-ConfiguredUplinkGrant         SEQUENCE {
        timeDomainOffset                  INTEGER (0..5119),
        timeDomainAllocation              INTEGER  (0..15),
        frequencyDomainAllocation         BIT STRING (SIZE(18)),
        antennaPort                       INTEGER (0..31),
        dmrs-SeqInitialization            INTEGER (0..1)
OPTIONAL,   -- Need R
        precodingAndNumberOfLayers        INTEGER (0..63),
        srs-ResourceIndicator             INTEGER (0..15)
OPTIONAL,   -- Need R
        mcsAndTBS                         INTEGER (0..31),
        frequencyHoppingOffset            INTEGER (1..
maxNrofPhysicalResourceBlocks-1)          OPTIONAL,   -- Need R
        pathlossReferenceIndex            INTEGER (0..maxNrofPUSCH-
PathlossReferenceRSs-1),
        ...
    }
OPTIONAL,   -- Need R
    ...
}
```

Embodiment 1-3: Method of Generating CLI Reporting Information

A method by which the UE generates a MAC CE format configuring CLI reporting information when the UE performs CLI reporting according to Embodiment 1-1 and Embodiment 1-2, as described above, is provided. The UE may collect L1-SRS-RSRP or L1-CLI-RSSI or SRS-RSRP or CLI-RSSI, based on measurement information configured by the BS. Here, L1 may indicate L1-filtered SRS-RSRP and/or CLI-RSSI which is measured by a physical layer of the UE. The measurement information configured for the UE may include reportQuantity indicating a measurement resource type, and resourceConfig indicating measurement resource information. In particular, ResourceId for identifying a resource may be included in resourceConfig. For example, when the UE is configured, by the BS, with L1-SRS-RSRP measurement information, the UE may measure and report RSRP based on SRS transmission configuration information transmitted by a neighboring UE. Also, when the UE is configured, by the BS, L1-CLI-RSSI measurement information, the UE may measure RSSI on configured L1-CLI-RSSI time/frequency domain resources and may report it. Here, the measured L1-SRS-RSRP and/or L1-CLI-RSSI may be included in an MAC CE format for reporting based on L2 signaling. Also, CLI report-dedicated logical channel ID (LCID) may be configured to identify an MAC CE format and a subheader. As described above, MAC CE format types being configurable for CLI reporting will now be described in detail with reference to methods below.

Method 1: CLI Reporting MAC CE Type 1

Figure 26:
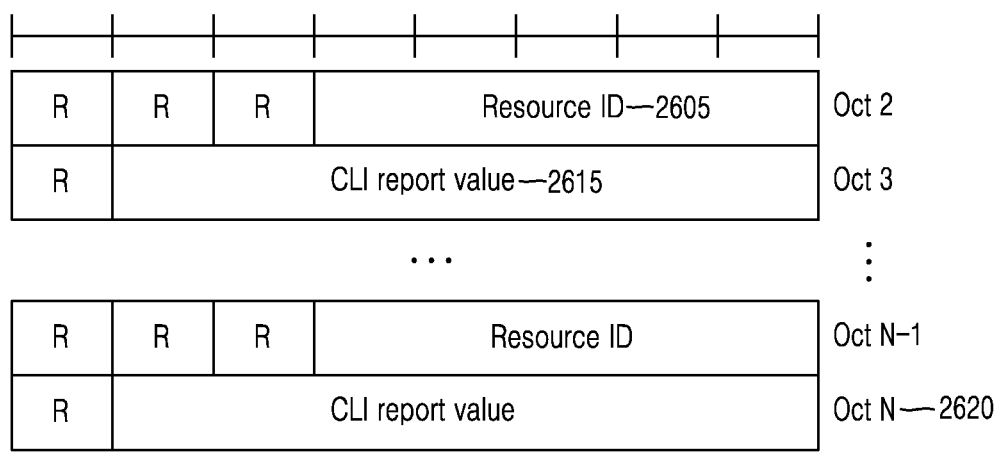
FIG. 26 illustrates a MAC CE format for generation of CLI reporting information according to an embodiment.

FIG. 26 illustrates a MAC CE format for generation of CLI reporting information according to an embodiment.

A method of using an MAC CE format of FIG. 26 is provided for generation of CLI reporting information. The MAC CE format may consist of fixed N octets 2620, and the UE may configure CLI reporting information according to N octet configurations. In the octet configuration, an MAC CE format for CLI reporting may be configured of a CLI measurement value (or CLI report value) 2615 and measurement resource ID 2605. Also, R of FIG. 26 indicates a reserved bit, and other parameters may be applied when required at a later time. For example, the UE may measure L1-SRS-RSRP and/or L1-CLI-RSSI or SRS-RSRP and/or CLI-RSSI, based on CLI measurement configuration information, and the measured information may be reported by being included in the MAC CE format. Also, the MAC CE format may also include ID corresponding to a CLI measurement resource. The CLI reporting information may be configured by using one of the methods described below:

Method 1. A list of measurement result values of X resources (where X may be configured according to octet configuration of MAC CE format) in order of high signal strengths among measured CLIs, and resource indices corresponding thereto.

Method 2. A list of X difference values in ascending order, the difference values between a result value of one highest signal strength and X highest signal strength values (where X may be configured according to octet configuration of MAC CE format) and second-highest signal strength values among measured CLIs, and resource indices corresponding thereto.

Method 3. A list of measurement result values of X resources (where X may be configured according to octet configuration of MAC CE format) configured by the BS, and resource indices corresponding thereto.

Method 4. A list of measurement result values of X resources (where X may be configured according to octet configuration of MAC CE format) for which measurement is triggered in semi-persistent CLI measurement, and resource indices corresponding thereto.

Method 5. A list of measurement result values of X resources being most recently measured from a time point configured by the BS in semi-persistent CLI measurement and resource indices corresponding thereto. When X is a value less than octet configuration of MAC CE format, remaining octets may be zero-padded, When X is a value greater than octet configuration of MAC CE format, results starting from a time point of earliest measurement up to maximum octet configurations may be reported.

Method 6. A list including only resource indices of X resources calculated based on the Methods 1 to 5 of configuring CLI report information.

Method 7. A list including only measurement result values of X resources calculated based on the Methods 1 to 5 of configuring CLI report information.

Also, CLI measurement resource ID corresponding to a measured CLI report value may be included in a MAC CE format. A bit payload of the MAC CE format octet (FIG. 26) described above is an example for description of what is disclosed, and a bit length may vary depending on actual configuration.

The BS may check a reported MAC CE, thereby determining how much interference occurs in which resource ID.

Method 2: CLI Reporting MAC CE Type 2

Figure 27:
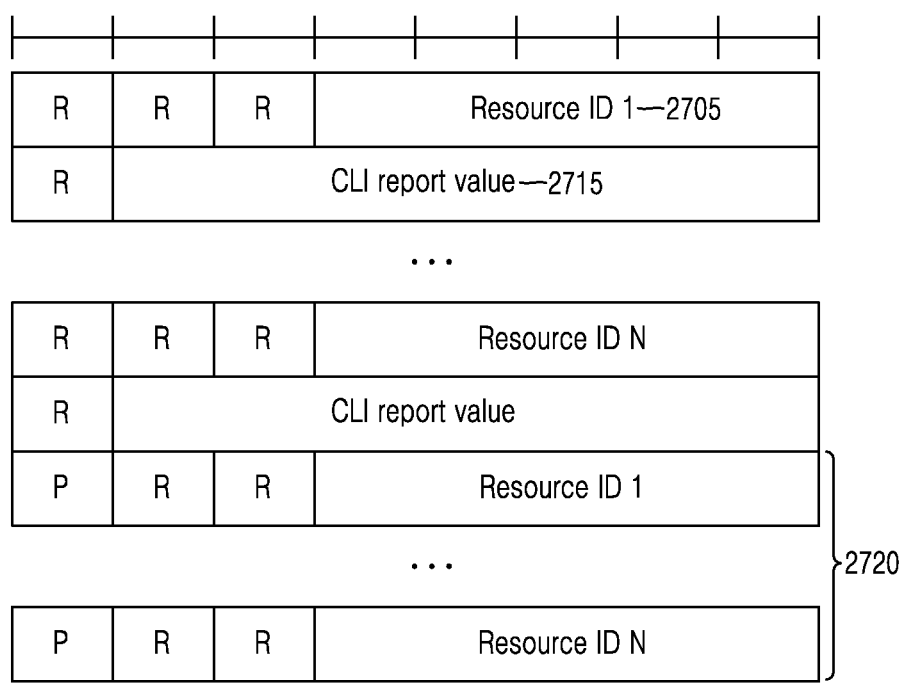
FIG. 27 illustrates a MAC CE format for generation of CLI reporting information according to another embodiment.

FIG. 27 illustrates a MAC CE format for generation of CLI reporting information according to another embodiment.

A method is provided of using an MAC CE format of FIG. 27, for generation of CLI reporting information. According to Method 2, the UE not only reports configured measurement resource ID and measurement value, but also reports preferred or not-preferred resource ID to the BS. The MAC CE format may consist of fixed N octets, and the UE may configure CLI reporting information according to N octet configuration. In the octet configuration, an MAC CE format for CLI reporting may be configured of a CLI measurement value (or CLI report value) 2715 and measurement resource ID 2705. Also, the MAC CE format for CLI reporting may include at least one resource ID 2720 of at least one preferred or not-preferred resource based on a CLI measured by the UE. Also, R of FIG. 27 indicates a reserved bit, and other parameters may be applied when required at a later time. For example, the UE may measure L1-SRS-RSRP and/or L1-CLI-RSSI or SRS-RSRP and/or CLI-RSSI, based on CLI measurement configuration information, and the measured information may be reported by being included in the MAC CE format. Also, the MAC CE format may also include ID corresponding to a CLI measurement resource. The CLI reporting information may be configured by using one of the following methods:

Method 1. A list of measurement result values of X resources (where X may be configured according to octet configuration of MAC CE format) in order of high signal strengths among measured CLIs, and resource indices corresponding thereto.

Method 2. A list of X difference values in ascending order, the difference values between a result value of one highest signal strength and X highest signal strength values (where X may be configured according to octet configuration of MAC CE format) and second-highest signal strength values among measured CLIs, and resource indices corresponding thereto.

Method 3. A list of measurement result values of X resources (where X may be configured according to octet configuration of MAC CE format) configured by the BS, and resource indices corresponding thereto.

Method 4. A list of measurement result values of X resources (where X may be configured according to octet configuration of MAC CE format) for which measurement is triggered in semi-persistent CLI measurement, and resource indices corresponding thereto.

Method 5. A list of measurement result values of X resources being most recently measured from a time point configured by the BS in semi-persistent CLI measurement and resource indices corresponding thereto. When X is a value less than octet configuration of MAC CE format, remaining octets may be zero-padded. When X is a value greater than octet configuration of MAC CE format, results starting from a time point of earliest measurement up to maximum octet configuration may be reported.

Method 6. A list including only resource indices of X resources calculated based on the Methods 1 to 5 of configuring CLI report information.

Method 7. A list including only measurement result values of X resources calculated based on the Methods 1 to 5 of configuring CLI report information.

CLI measurement resource ID corresponding to a measured CLI report value may be included in a MAC CE format.

Also, based on a measured CLI, the UE may include and report, in MAC CE, ID of a resource preferred for co-scheduling or ID of a resource not preferred for co-scheduling. For example, it is assumed that the UE performs measurement on all K CLI measurement resources. For the measured K CLIs, the UE may configure X CLI measurement resource IDs and CLI values respectively corresponding to the CLI measurement resource IDs, according to a MAC CE format. Here, for example, the UE may determine that measurement resource ID having a highest CLI measurement value among the measured K CLIs is a least-preferred resource. As another example, the UE may determine that CLI measurement resource ID having a lowest CLI measurement value is a most-preferred resource. Based on the references, the UE may additionally configure one of a plurality of pieces of information, as listed below, in the MAC CE format.
  1. Preferred resource ID
  2. Not-preferred resource ID A bit payload of the MAC CE format octet (FIG. 27) described above is an example of what is disclosed, and a bit length may vary depending on actual configuration. Based on the above, the BS may easily determine, based on CLI measurement results reported by the UE, which UE causes largest interference to a corresponding UE or which UE causes least interference to the corresponding UE and thus is appropriate for co-scheduling.

Method 3: CLI Reporting MAC CE Type 3

FIG. 28 illustrates a MAC CE format for generation of CLI reporting information according to another embodiment.

A method of using a MAC CE format of FIG. 28 is provided for generation of CLI reporting information. The MAC CE format is not a fixed format but is a format of which octet configuration is variable depending on a value of C (e.g., whether C is 1 or 0) positioned in octet 1 2825. With it, up to 8 CLI measurement resources may be reported. For example, a case may be assumed, in which event-based CLI measurement reporting by a UE is configured and the number of measurement resources for which CLI reporting is triggered is less than 8. If there are 7 CLI measurement resources for which CLI reporting is triggered, $C_7$ 2820 of the MAC CE format may be configured to '0' and $C_0$ 2822 to $C_6$ 2821 may be configured to 1. A payload corresponding to $C_7$ 2820 may be removed from the MAC CE format, and the UE may perform reporting on remaining 7 measurement resources. In such octet configuration, the MAC CE format for CLI reporting may include a CLI measurement value (or a CLI report value) 2815, and measurement resource ID 2805. Also, R of FIG. 28 indicates a reserved bit, and other parameters may be applied when required at a later time. For example, the UE may measure L1-SRS-RSRP and/or L1-CLI-RSSI or SRS-RSRP and/or CLI-RSSI, based on CLI measurement configuration information, and the measured information may be reported by being included in the MAC CE format. Also, the MAC CE format may also include ID corresponding to a CLI measurement resource. The CLI reporting information may be configured by using one of the below methods:

Method 1. A list of measurement result values of X resources (where X may be configured according to octet configuration of MAC CE format) in order of high signal strengths among measured CLIs, and resource indices corresponding thereto.

Method 2. A list of X difference values in ascending order, the difference values between a result value of one highest signal strength and X highest signal strength values (where X may be configured according to octet configuration of MAC CE format) and second-highest signal strength values among measured CLIs, and resource indices corresponding thereto.

Method 3. A list of measurement result values of X resources (here, when X is a value smaller than octet configuration of MAC CE format, remaining octets may be zero-padded or omitted) configured by the BS, and resource indices corresponding thereto.

Method 4. A list of measurement result values of X resources for which measurement is triggered in semi-persistent CLI measurement, and resource indices corresponding thereto. When X is a value less than octet configuration of MAC CE format, remaining octets may be zero-padded or omitted. Alternatively, when X is a value greater than octet configuration of MAC CE format, results starting from a time point of earliest measurement up to maximum octet configuration may be reported.

Method 5. A list of measurement result values of X resources being most recently measured from a time point configured by the BS in semi-persistent CLI measurement and resource indices corresponding thereto. When X is a value less than octet configuration of MAC CE format, remaining octets may be zero-padded. Alternatively, when X is a value greater than octet configuration of MAC CE format, results starting from a time point of earliest measurement up to maximum octet configuration may be reported.

Method 6. A list including only resource indices of X resources calculated based on the Methods 1 to 5 of configuring CLI report information.

Method 7. A list including only measurement result values of X resources calculated based on the Methods 1 to 5 of configuring CLI report information.

A bit payload of the MAC CE format octet (FIG. 28) described above is an example for description of what is disclosed, and a bit length may vary depending on actual configuration. According to the method described herein, as the MAC CE format has a variable form, flexible reporting may be possible, compared to a fixed MAC CE format.

Method 4: CLI Reporting MAC CE Type 4

FIG. 29 illustrates a MAC CE format for generation of CLI reporting information according to another embodiment.

A method is provided of using an MAC CE format of FIG. 29, for generation of CLI reporting information. The MAC CE format is not a fixed format but is a format of which octet is variable depending on a value of C (e.g., whether C is 1 or 0) in octet 1 2920. With it, up to 32 CLI measurement resources may be reported. For example, a case may be assumed, in which periodic CLI measurement reporting by the UE is configured, and the number of configured CLI measurement resources is smaller than 32. If there are 30 CLI measurement resources for which CLI reporting is triggered, MAC CE octets for two CLI measurement resources that are not configured may be removed, and the UE may perform reporting on remaining 30 measurement resources. For example, the UE may measure (2915) L1-SRS-RSRP and/or L1-CLI-RSSI or SRS-RSRP and/or CLI-RSSI, based on CLI measurement configuration information, and may include and report, in the MAC CE format, a measurement value (or a CLI report value) 2915. The MAC CE format may also include ID 2905 corresponding to a corresponding CLI measurement resource. Also, R of FIG. 29 indicates a reserved bit, and other parameters may be applied when required at a later time. The CLI reporting information may be configured by using one of the below methods:

Method 1. A list of measurement result values of X resources (where X may be configured according to octet configuration of MAC CE format) in order of high signal strengths among measured CLIs, and resource indices corresponding thereto.

Method 2. A list of X difference values in ascending order, the difference values between a result value of one highest signal strength and X highest signal strength values (where X may be configured according to octet configuration of MAC CE format) and second-highest signal strength values among measured CLIs, and resource indices corresponding thereto.

Method 3. A list of measurement result values of X resources (here, when X is a value smaller than octet configuration of MAC CE format, remaining octets may be zero-padded or omitted) configured by the BS, and resource indices corresponding thereto.

Method 4. A list of measurement result values of X resources for which measurement is triggered in semi-persistent CLI measurement, and resource indices corresponding thereto. When X is a value less than octet configuration of MAC CE format, remaining octets may be zero-padded or omitted. Alternatively, when X is a value greater than octet configuration of MAC CE format, results starting from a time point of earliest measurement up to maximum octet configuration may be reported.

Method 5. A list of measurement result values of X resources being most recently measured from a time point configured by the BS in semi-persistent CLI measurement and resource indices corresponding thereto. When X is a value less than octet configuration of MAC CE format, remaining octets may be zero-padded. Alternatively, when X is a value greater than octet configuration of MAC CE format, results starting from a time point of earliest measurement up to maximum octet configuration may be reported.

Method 6. A list including only resource indices of X resources calculated based on the Methods 1 to 5 of configuring CLI report information.

Method 7. A list including only measurement result values of X resources calculated based on the Methods 1 to 5 of configuring CLI report information.

A bit payload of the MAC CE format octet (FIG. 28) described above is an example for description of what is disclosed, and a bit length may vary depending on actual configuration. According to the method described herein, as the MAC CE format has a variable form, flexible reporting may be possible, compared to a fixed MAC CE format.

Embodiment 1-4: Method of Generating CLI Report Value

A method is provided by which a UE configures a report value so as to report a measured CLI quantity value. The UE may measure and report L1-SRS-RSRP and/or L1-CLI-RSSI and/or SRS-RSRP and/or CLI-RSSI, according to a report quantity configured by the BS. Here, a CLI value being actually reported from the UE to the BS may not be in the form of a measured quantity value but may be mapped to a predefined report value and reported. Also, each report value may configure a particular bit payload. For example, when it is assumed that the UE measures a CLI and reports a maximum value and a difference value with respect to the maximum value, a report value to which the maximum value is mapped may be configured of X bit and a report value to which the difference value is mapped may be configured of Y bit (here, Y may be a value smaller than X). Here, each of X bit and Y bit values may be configured according to resolution of measurement value configuration. Therefore, final CLI report values 2615, 2715, 2815 and 2915 to be applied to a MAC CE format described in Embodiment 1-3 of the disclosure may be in a bit form of a mapped report value, as described above. The below methods describe how to define a report value for mapping a measured CLI according to an analyzing power will now be described. A report value reported from the UE to the BS may be reported by using one of below methods or may be reported by using a combination of the below methods.

Method 1—Mapping for L1-SRS-RSRP and/or L1-CLI-RSSI Having Resolution of 1 dB

Table 45-2 and Table 45-3, below, provide examples describing L1-SRS-RSRP and L1-CLI-RSSI, each having resolution of 1 dB.

The UE may map measured L1-SRS-RSRP and/or L1-CLI-RSSI according to a value range in Tables 45-2 and 45-3, below.

TABLE 45-2

| Reported value | Measured quantity value | Unit |
|---|---|---|
| L1-SRS-RSRP_0 | Li-SRS-RSRP < −140 | dBm |
| L1-SRS-RSRP_1 | −140 ≤ L1-SRS-RSRP < −139 | dBm |
| . . . | . . . | . . . |
| L1-SRS-RSRP_97 | −44 ≤ L1-SRS-RSRP | dBm |

TABLE 45-3

| Reported value | Measured quantity value | Unit |
|---|---|---|
| L1-CLI-RSSL_0 | L1-CLI-RSSI < −100 | dBm |
| L1-CLI-RSSI_1 | −100 ≤ L1-CLI-RSSI < −99 | dBm |
| . . . | . . . | . . . |
| L1-CLI-RSSI_76 | −25 ≤ L1-CLI-RSSI | dBm |

Method 2—Mapping for L1-SRS-RSRP and/or L-CLI-RSSI Having Resolution of 2 dB

Table 45-4 and Table 45-5, below, provide examples describing L1-SRS-RSRP and L1-CLI-RSSI each having resolution of 2 dB.

The UE may map measured L1-SRS-RSRP and/or L1-CLI-RSSI according to a value range in Tables 45-4 and 45-5, below.

TABLE 45-4

| Reported value | Measured quantity value | Unit |
|---|---|---|
| L1-SRS-RSRP_0 | L1-SRS-RSRP < −140 | dBm |
| L1-SRS-RSRP_1 | −140 ≤ L1-SRS-RSRP < −138 | dBm |
| . . . | . . . | . . . |
| L1-SRS-RSRP_49 | −44 ≤ L1-SRS-RSRP | dBm |

TABLE 45-5

| Reported value | Measured quantity value | Unit |
| --- | --- | --- |
| L1-CLI-RSSI_0 | L1-CLI-RSSI < −100 | dBm |
| L1-CLI-RSSI_1 | −100 ≤ L1-CLI-RSSI < −98 | dBm |
| ... | ... | ... |
| L1-CLI-RSSI_38 | −26 ≤ L1-CLI-RSSI | dBm |

Method 3—Mapping for L1-SRS-RSRP and/or L1-CLI-RSSI Having Resolution of 4 dB

Table 45-6 and Table 45-7, below, provide examples describing L1-SRS-RSRP and L1-CLI-RSSI each having resolution of 4 dB.

The UE may map measured L1-SRS-RSRP and/or L1-CLI-RSSI according to a value range in Tables 45-6 and 45-7, below.

TABLE 45-6

| Reported value | Measured quantity value | Unit |
| --- | --- | --- |
| L1-SRS-RSRP_0 | L1-SRS-RSRP < −140 | dBm |
| L1-SRS-RSRP_1 | −140 ≤ L1-SRS-RSRP < −136 | dBm |
| ... | ... | ... |
| L1-SRS-RSRP_25 | −44 ≤ L1-SRS-RSRP | dBm |

TABLE 45-7

| Reported value | Measured quantity value | Unit |
| --- | --- | --- |
| L1-CLI-RSSI_0 | L1-CLI-RSSI < −100 | dBm |
| L1-CLI-RSSI_1 | −100 ≤ L1-CIJ-RSSI < −96 | dBm |
| ... | ... | ... |
| L1-CLI-RSSI_19 | −28 ≤ L1-CLI-RSSI | dBm |

Method 4—Mapping for L1-SRS-RSRP and/or L1-CLI-RSSI Having Resolution of 5 dB

Table 45-8 and Table 45-9, below, provide examples describing L1-SRS-RSRP and L1-CLI-RSSI each having resolution of 5 dB.

The UE may map measured L1-SRS-RSRP and/or L1-CLI-RSSI according to a value range in Tables 45-8 and 45-9, below.

TABLE 45-8

| Reported value | Measured quantity value | Unit |
| --- | --- | --- |
| L1-SRS-RSRP_0 | L1-SRS-RSRP < −140 | dBm |
| L1-SRS-RSRP_1 | −140 ≤ L1-SRS-RSRP < −135 | dBm |
| ... | ... | ... |
| L1-SRS-RSRP_20 | −45 ≤ L1-SRS-RSRP | dBm |

TABLE 45-9

| Reported value | Measured quantity value | Unit |
| --- | --- | --- |
| L1-CLI-RSSI_0 | L1-CLI-RSSI < −100 | dBm |
| L1-CLI-RSSI_1 | −100 ≤ LI-CLI-RSSI < −95 | dBm |
| ... | ... | ... |
| L1-CLI-RSSI_15 | −30 ≤ L1-CLI-RSSI | dBm |

Method 5—Mapping for L1-SRS-RSRP and/or L-CLI-RSSI Having Resolution of 10 dB

Table 45-10 and Table 45-11, below, provide examples describing L1-SRS-RSRP and L1-CLI-RSSI each having resolution of 10 dB.

The UE may map measured L1-SRS-RSRP and/or L1-CLI-RSSI according to a value range in Tables 45-10 and 45-11, below.

TABLE 45-10

| Reported value | Measured quantity value | Unit |
| --- | --- | --- |
| L1-SRS-RSRP_0 | L-SRS-RSRP < −140 | dBm |
| L1-SRS-RSRP_1 | −140 ≤ L1-SRS-RSRP < −130 | dBm |
| ... | ... | ... |
| L1-SRS-RSRP_11 | −40 ≤ L1-SRS-RSRP | dBm |

TABLE 45-11

| Reported value | Measured quantity value | Unit |
| --- | --- | --- |
| L1-CLI-RSSI_0 | L1-CLI-RSSI < −100 | dBm |
| L1-CLI-RSSI_1 | −100 ≤ L1-CLI-RSSI < −90 | dBm |
| ... | ... | ... |
| L1-CLI-RSSI_6 | −30 ≤ L1-CLI-RSSI | dBm |

When a difference value with respect to a maximum value of CLI reporting configuration is included, a mapping table may be configured with resolution of 1 dB, 2 dB, 4 dB, 5 dB, or 10 dB in the range of −30 to 0 dBm, as described above.

Embodiment 2: Method of Configuring Semi-Persistent CLI Measurement Resource and Report in Time Domain A CLI measurement and reporting configuration method is provided in consideration of L2 signaling. The BS may configure the UE with CLI measurement and reporting, by UE-specific configuration information being appropriate for XDD operation. Also, in order to perform appropriate CLI measurement according to UE situation, a periodic or semi-persistent or dynamic CLI measurement resource may be allocated. In this regard, a method of activating or deactivating semi-persistent CLI measurement when a dynamic CLI measurement resource is configured for the UE will now be described. Also, the UE may combine a time-domain operation of a CLI measurement operation and a time-domain operation of a reporting operation, as described in each of the following sub-embodiments.

Embodiment 2-1: Method of Configuring CLI Measurement Resource and Report

A method is provided by which the BS configures the UE with CLI measurement and UE-specific configuration information is reported. In the UE-specific configuration information, a time-domain resource of a CLI measurement resource may be periodically/semi-persistently/dynamically configured. CLI report configuration information may be referred to as CLI measurement resource configuration information described above, and may include reportQuantity as to which CLI information is to be measured for reporting. Also, in a time domain, a CLI reporting operation may be periodically/semi-persistently/dynamically configured. Also, the CLI report configuration may include an event-based or periodic reporting operation described above in Embodiment 1.

For example, the CLI measurement and reporting configuration may be referred to a dynamic/semi-persistent CSI reporting operation described above. The CLI measurement and reporting configuration information may be included in CSI-ReportConfig configuration information and then may be configured for the UE. For example, CLI measurement resource configuration information (i.e., SRS-Resource-ForCLI and/or CLI-Resource where SRS-ResourceForCLI may be resource configuration information for measurement of L1-SRS-RSRP and CLI-Resource may be resource configuration information for measurement of L1-CLI-RSSI) may be included in CSI-ReportConfig sub-information. The UE may identify, based on the CLI measurement configuration information, in which resource CLI measurement is to be performed. As another example, the UE may include reportConfigType-r18 in CSI-ReportConfig sub-information so as to perform event-based or periodic CLI reporting described above in Embodiment 1, and information associated with periodic CLI reporting and/or event-trigger may be included in reportConfigType-r18 sub-information. Also, the UE may include CLI-Index-SRS-RSRP and/or CLI-Index-CLI-RSSI in reportQuantity sub-information of CSI-ReportConfig so as to configure which parameter is to be measured. As an example related to reportQuantity, when the UE is configured with CLI-Index-SRS-RSRP, the UE may determine to perform measurement of SRS-RSRP based on configured SRS-ResourceId and perform reporting after performing L1 filtering on the measurement. That is, the UE may determine to measure and report L1-SRS-RSRP. As another example, when the UE is configured with CLI-index-CLI-RSSI, the UE may determine to perform measurement of CLI-RSSI based on configured CLI-Resource and perform reporting after performing L1 filtering on the measurement. That is, the UE may report L1-CLI-RSSI based on the determined measurement.

Table 46, below, describes an example of CLI measurement and reporting configuration included in the CSI-framework described above.

The CLI measurement and reporting configuration may be included in not only the CSI-framework but also included in various information such as XDD-dedicated measurement configuration, UE-specific measurement configuration, and the like, and the disclosure is not limited to the example above.

TABLE 46

| | |
|---|---|
| CSI-ReportConfig ::= | SEQUENCE { |
| reportConfigId | CSI-ReportConfigId, |
| carrier | ServCellIndex |
| OPTIONAL, | |
| resourcesForChannelMeasurement | CSI-ResourceConfigId, |
| csi-IM-ResouncesForInterference | CSI-ResourceConfigId |
| OPTIONAL, | |
| nzp-CSI-RS-ResourcesForInterference | CSI-ResourceConfigId |
| OPTIONAL, | |
| SRS-ResourceForCLI | SRS-ResourceId |
| OPTIONAL, | |
| CLI-Resource | CLI-RSSI-ResourceId |
| OPTIONAL, | |
| reportConfigType | CHOICE { |
| periodic | SEQUENCE { |
| reportSlotConfig | CSI-ReportPeriodicityAndOffset, |
| pucch-CSI-ResourceList (1..maxNrofBWPs)) OF PUCCH-CSI-Resource | SEQUENCE (SIZE |
| }, | |
| semiPersistentOnPUCCH | SEQUENCE { |
| reportSlotConfig | CSI-ReportPeriodicityAndOffset, |
| pucch-CSI-ResourceList (1..maxNrofBWPs)) OF PUCCH-CSI-Resource | SEQUENCE (SIZE |
| }, | |
| semiPersistentOnPUSCH | SEQUENCE { |
| reportSlotConfig sl10, sl20, sl40, sl80, sl160, sl320}, | ENUMERATED {sl5, |
| reportSlotOffsetList (1.. maxNrofUL-Allocations)) OF INTEGER(0..32), | SEQUENCE (SIZE |
| }, | |
| ... | |
| } | |
| reportConfigType-r18 | CHOICE { |
| periodic | SEQUENCE { |
| reportSlotConfig r18 | CLI-ReportPeriodicicityAndOffset- |
| } | |
| event-triggered | SEQUENCE { |
| CLI-threshold | |
| CLI-maxCount | |
| CLI-Timer | |
| CLI-reportSlotConfig | |
| ... | |
| } | |
| } | |
| reportQuantity | CHOICE { |
| none | NULL, |

TABLE 46-continued

```
    ...
    CLI-Index-SRS-RSRP
    CLI-Index-CLI-RSSI
}
```

Embodiment 2-2: Method of Generating
Semi-Persistent CLI Measurement Resource
Activation/Deactivation Information A method is provided by which a configured semi-persistent CLI measurement resource is activated or deactivated to support semi-persistent CLI measurement by the UE. When the BS configures UE-specific CLI measurement and reporting configuration, the BS may configure a CLI measurement resource in a time domain via a periodic or semi-persistent or dynamic operation. If a semi-persistent CLI measurement resource is configured for the UE, the UE needs an indication (or trigger) of resource activation or deactivation so as to use a corresponding resource.

Figure 30:
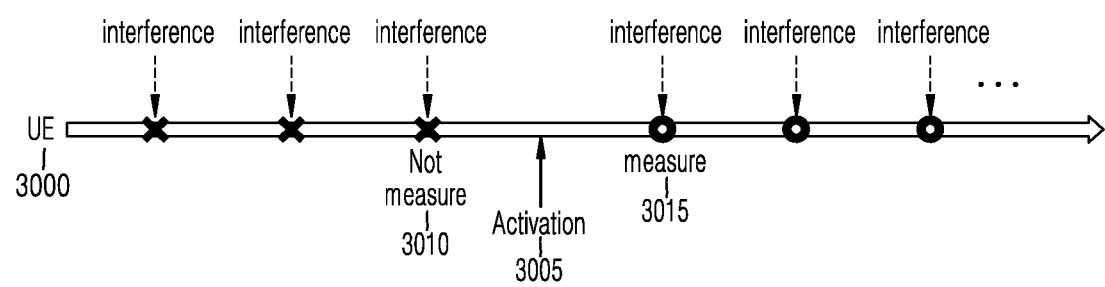
FIG. 30 describes a semi-persistent CLI measurement resource activation operation according to an embodiment.

FIG. 30 describes a semi-persistent CLI measurement resource activation operation according to an embodiment.

A UE 3000 for which a semi-persistent CLI resource is configured does not perform measurement in the resource until an activation indication is transmitted from a BS, even when the semi-persistent CLI resource is configured (3010). Referring to FIG. 30, when the BS transmits a semi-persistent CLI resource activation indication 3005 to the UE 3000, the UE 3000 may receive the CLI resource activation indication 3005 and thus may perform CLI measurement with respect to a configured CLI measurement resource (3015). In order to support such operation, in methods below, how to configure a MAC CE format and subheader for activation or deactivation of a semi-persistent CLI measurement resource will now be described.

Method 1: MAC CE Type 1 in Consideration of SP
CSI Measurement Activation/Deactivation A method is provided of using a semi-persistent CSI measurement activation/deactivation MAC CE format for CLI measurement resource activation/deactivation will now be described.

Figure 31:
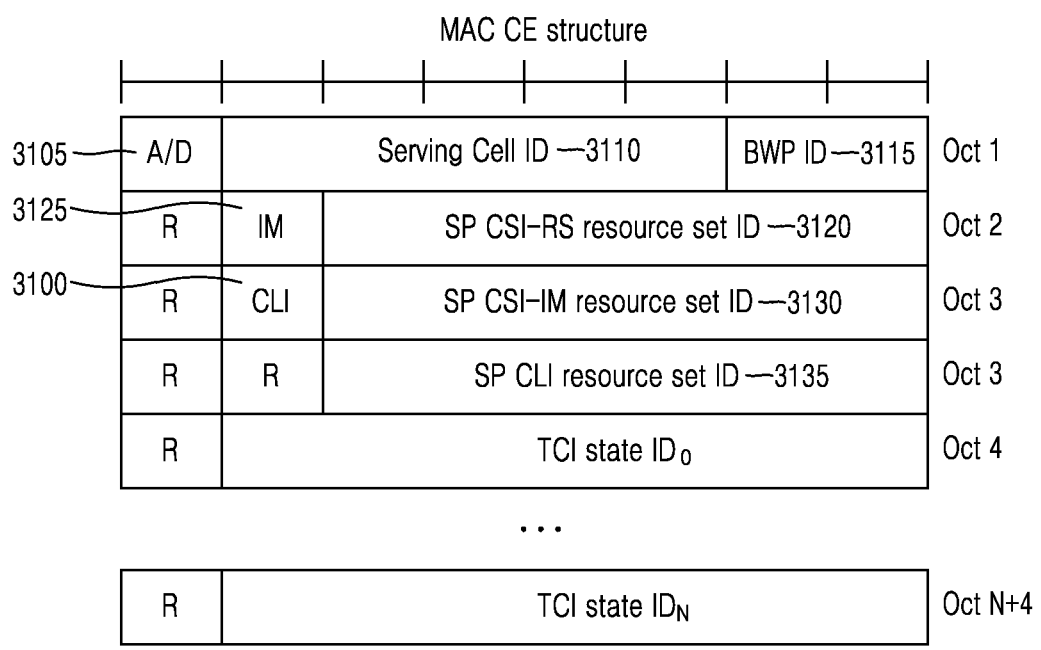
FIG. 31 illustrates a semi-persistent (SP) CSI measurement activation/deactivation MAC CE format for indicating activation or deactivation of a semi-persistent CLI measurement resource according to an embodiment.

FIG. 31 illustrates an SP CSI measurement activation/deactivation MAC CE format for indicating activation or deactivation of a semi-persistent CLI measurement resource according to an embodiment.

With reference to FIG. 31, a method of indicating activation or deactivation of a semi-persistent CLI measurement resource by using a SP CSI measurement activation/deactivation MAC CE format of Rel-15/16 is described.

An activation/deactivation (A/D) 3105 is a parameter for determining whether a transmitted MAC CE is an indication for resource activation or an indication for resource deactivation. If the A/D 3105 is indicated as 1, a plurality of pieces of information of the MAC CE may be determined as an indication for activation of SP CSI resources. A serving cell ID 3110 and a BWP ID 3115 are parameters indicating information of a serving cell and information of a BWP on which each MAC CE is to be transmitted. Also, a SP CSI-RS resource set ID 3120 is a parameter indicating which resource set among configured semi-persistent CSI-RS resource sets is to be activated or deactivated. An interference measurement (IM) 3125 may indicate whether an SP CSI IM resource set is included. If the IM 3125 is indicated as 0, an octet including a field of a SP CSI-IM resource set ID 3130 may be omitted.

Information of a semi-persistent CLI measurement resource set ID 3135 may be positioned in the lower field of a SP CSI-IM resource set, and whether a semi-persistent CLI measurement resource set is included may be indicated by a parameter of a CLI 3100. For example, when a parameter of the A/D 3105 is indicated as 1 and a parameter of the CLI 3100 is indicated as 1, the UE may determine to activate the semi-persistent CLI measurement resource set included in the MAC CE format. Here, a parameter of the IM 3125 may be indicated as 0. Here, when the SP CSI-RS resource set ID 3120 and the SP CLI resource set ID 3135 are also indicated, the UE may determine an operation according to a UE support with respect to a FDM capability. For example, when UE capabilities do not support cli-RSSI-FDM-DL-r16 or cli-SRS-RSRP-FDM-DL-r16, the UE may activate only the SP CLI resource set ID 3135.

Method 2: MAC CE Type 2 in Consideration of SP
CSI Measurement Activation/Deactivation A method is provided by which a semi-persistent CSI measurement activation/deactivation MAC CE format is used for activation or deactivation of a semi-persistent CLI measurement resource will now be described.

A MAC CE according to Method 2 may have the same MAC CE structure as Method 1, as described above. The BS may configure an identifiable subheader indicating SP CLI resource activation/deactivation before identification of a MAC CE, such that the UE may determine that the MAC CE is an indication of SP CLI activation/deactivation, not an indication of SP CSI activation/deactivation.

A MAC CE format may be referred to FIG. 31. Information of the semi-persistent CLI measurement resource set ID 3135 may be positioned in the lower field of a SP CSI-IM resource set, and whether a semi-persistent CLI measurement resource set is included may be indicated by a parameter of the CLI 3100. For example, when a parameter of the A/D 3105 is indicated as 1 and a parameter of the CLI 3100 is indicated as 1, the UE may determine to activate the semi-persistent CLI measurement resource set included in the MAC CE format. Here, a parameter of the IM 3125 may be indicated as 0. Here, when the SP CSI-RS resource set ID 3120 and the SP CLI resource set ID 3135 are also indicated, the UE may determine an operation according to a UE support with respect to a FDM capability. For example, when UE capabilities do not support cli-RSSI-FDM-DL-r16 or cli-SRS-RSRP-FDM-DL-r16, the UE may activate only the SP CLI resource set ID 3135.

Method 3: CLI Measurement
Activation/Deactivation MAC CE 1

A MAC CE format for activating a semi-persistent CLI resource is described, with a MAC CE subheader indicating SP CLI measurement activation/deactivation generated to indicate that it is information for activation of a semi-persistent CLI resource set.

Figure 32:
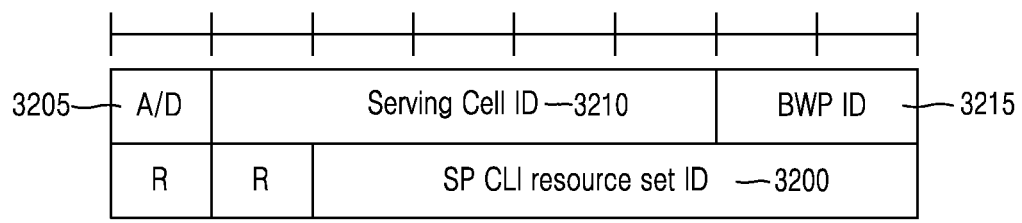
FIG. 32 describes a method of configuring a MAC CE format for indicating semi-persistent CLI measurement activation/deactivation according to an embodiment.

FIG. 32 describes a method of configuring a MAC CE format for indicating semi-persistent CLI measurement activation/deactivation according to an embodiment.

Referring to FIG. 32, an A/D 3205 may be a parameter for determining whether a corresponding MAC CE format is to activate or deactivate a semi-persistent CLI measurement resource. For example, when the A/D 3205 is configured as 1, the UE may determine that the corresponding MAC CE format is to activate the semi-persistent CLI measurement resource. A serving cell ID 3210 and a BWP ID 3215 respectively indicate a cell ID and a BWP ID. Also, whether a semi-persistent CLI measurement resource configured by the BS is to be activated may be indicated by a SP CLI resource set ID 3200. As the method uses a MAC CE dedicated for CLI measurement activation/deactivation, smooth CLI measurement and reporting operations are possible.

Embodiment 2-3: Method of Combining Relations Between CLI Measurement and Reporting in Time Domain A method of combining relations between CLI measurement and reporting in a time domain is provided, in which the BS may configure, by UE-specific signaling, the UE with periodic/semi-persistent/dynamic time-domain operations with respect to a CLI measurement resource. Also, the BS may configure the UE with a periodic or event-based time-domain operation with respect to CLI report configuration. Here, the UE may perform CLI measurement and reporting with a combination of time-domain operations, in the below cases:

Case 1. Periodic CLI measurement resource configuration+Periodic CLI reporting configuration
Case 2. Periodic CLI measurement resource configuration+Event-based CLI reporting configuration
Case 3. Semi-persistent CLI measurement resource configuration+Semi-persistent CLI reporting configuration
Case 4. Semi-persistent CLI measurement resource configuration+Event-based CLI reporting configuration For Case 1, when the BS configures both CLI measurement and reporting operations to be periodic, the UE may perform measurement and reporting according to a configured period. For Case 2, when the BS configures CLI measurement to be periodic and CLI reporting to be event-based, the UE may perform periodic CLI measurement and perform a reporting operation based on an event described in Embodiment 1, above. For Case 3, the UE may be configured, by the BS, with semi-persistent CLI measurement. The UE may not perform measurement until an indication of activation of a semi-persistent CLI resource is transmitted from the BS, and when activation is indicated by a MAC CE, the UE may start CLI measurement. Also, from a time point when CLI measurement is activated, the UE may perform CLI reporting based on a configured reporting period. For Case 4, the UE may be configured, by the BS, with semi-persistent CLI measurement. The UE may not perform measurement until an indication of activation of a semi-persistent CLI resource is transmitted from the BS, and when activation is indicated by a MAC CE, the UE may start CLI measurement. Also, from a time point when CLI measurement is activated, a configured event-based reporting operation is also activated such that the UE may perform CLI reporting triggering and CLI reporting.

Embodiment 3: CLI Measurement Method in Consideration of Measurement Gap Configuration A CLI measurement method is provided that is performed based on measurement gap configuration in an XDD operation environment. Here, a measurement gap may indicate that at least one of PUCCH transmission (HARQ ACK/NACK, SR, CSI), SRS transmission, PDCCH monitoring and data reception, or data transmission is not performed, according to a pre-agreement between the BS and the UE.

Figure 33A:
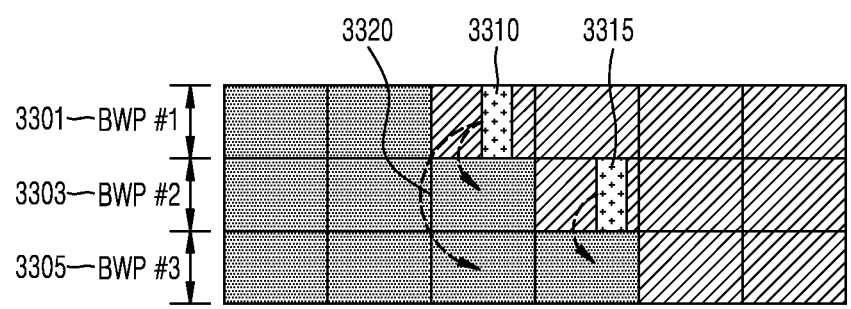
FIGS. 33A and 33B illustrate an example of UL-DL setting configuration and measurement gap configuration which are configurable as UE-specific configuration information by a BS in XDD operation according to an embodiment.
Figure 33B:
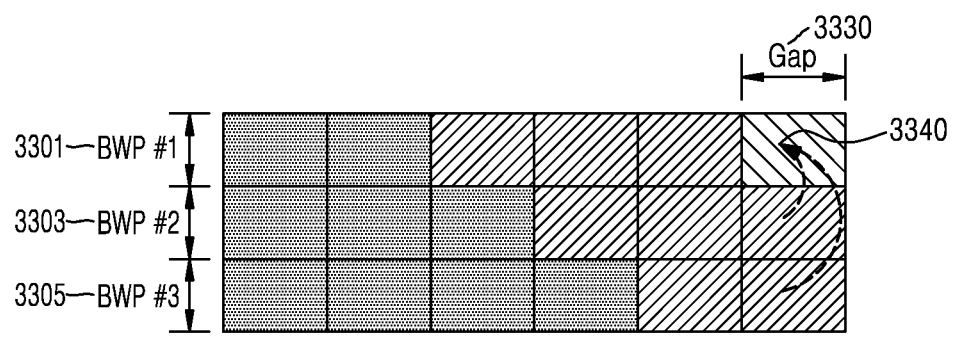

FIGS. 33A and 33B illustrate an example of UL-DL setting configuration and measurement gap configuration which are configurable as UE-specific configuration information by a BS in XDD operation according to an embodiment.

In FIG. 33A, the BS may configure UEs with BWP #1 3301, BWP #2 3303, and BWP #3 3305. For example, at a certain time point, UE #1 may be configured with BWP #1 3301, and UE #2 may be configured with BWP #2 3303 or BWP #3 3305.

UE #2 may measure, on a DL frequency resource, an amount of interference 3320 of a signal transmitted from a UL (e.g., UL signal 3310 of UE #1) from a neighboring UE. UE #3 may measure, on a DL frequency resource, an amount of interference of a signal transmitted from a UL (e.g., UL signal 3315 of UE #2) from a neighboring UE. However, in a case of UE #1, there is no UL resource from a neighboring UE, on a DL frequency resource, such that UE #1 cannot evaluate an impact due to a CLI. When the BS operates UL-DL configuration in consideration of a combination of BWP #1 3301 and a BWP other than BWP #2 3303 or BWP #3 3305, the BS may need to perform scheduling by referring to a CLI being occurable on BWP #1 3301. To this end, referring to FIG. 33B, a method by which the BS configures a measurement gap 3330 on a BWP where there is no simultaneous transmission overlap with a UL of another BWP, and the UE performs measurement of a CLI due to a UL signal 3340 of the other BWP in a measurement gap 3300 will now be described.

Embodiment 3-1: CLI Measurement Configuration Method in Consideration of Measurement Gap A method is provided by which the measurement gap 3300 is configured on a BWP for which CLI measurement is requested. CLI measurement and reporting configuration information configured for the UE by the BS may also include information associated with the measurement gap 3300, and how to configure the measurement gap 3300 on time and frequency resources is described.

Method 1—Activating a Semi-Persistent Measurement Gap by a MAC CE Indication from the BS after Configuration of the Semi-Persistent Measurement Gap When the BS configures the UE with UE-specific CLI measurement and reporting information, the BS may include, in the configuration, semi-persistent measurement gap configuration information. The measurement gap configuration information may also include configuration of time and frequency resources on which the measurement gap 3300 is to be performed. For example, a time resource for the measurement gap 3300 may be configured as a last N slot or K symbol unit of a period in which UL-DL are repeated in a BWP. A frequency resource for the measurement gap 3300 may be referred to a size of a currently activated BWP. The configured measurement gap 3300 may be activated/deactivated by a MAC CE from the BS.

Figure 34:
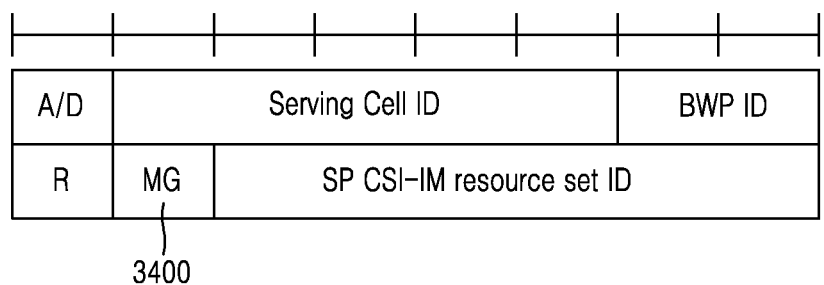
FIG. 34 describe a MAC CE format structure for supporting activation/deactivation of a measurement gap according to an embodiment.

FIG. 34 describes a MAC CE format structure for supporting activation/deactivation of a measurement gap according to an embodiment.

A parameter of an MG 3400 in FIG. 34 may indicate whether to activate the measurement gap 3300 (FIG. 33B). For example, when the UE receives a MAC CE from the BS and checks a format of the MAC CE, if the parameter of the MG 3400 is indicated as 1, it may mean that the measurement gap 3300 pre-configured for the UE is activated. Also, when the UE receives a measurement gap activation indication, the UE may determine that the measurement gap activation indication indicates measurement of a CLI in the measurement gap 3300. Also, the UE may perform CLI measurement on a configured CLI measurement resource. On the other hand, when the parameter of the MG 3400 is indicated as 0, the UE may not activate the measurement gap 3300 or may determine to deactivate the measurement gap 3300 that has been activated and operated. By using the method, the BS may selectively collect CLI information only when it is requested to detect a CLI on a BWP.

Method 2—Configuring Periodic Measurement Gap

When the BS configures the UE with UE-specific CLI measurement and reporting information, the BS may include, in the configuration, periodic measurement gap configuration information. The measurement gap configuration information may also include configuration of time and frequency resources on which the measurement gap 3300 is to be performed. For example, a time resource for the measurement gap 3300 may be configured as a last N slot or K symbol unit of a period in which UL-DL are repeated in a BWP. A frequency resource for the measurement gap 3300 (FIG. 33B) may be referred to a size of a currently activated BWP. By using the method, the BS may more accurately perform scheduling by continuously collecting CLI information on a corresponding BWP.

Embodiment 3-2: CLI Measurement Method Using Measurement Gap

A method is provided of measuring a CLI in the measurement gap 3300, by which the BS may detect an amount of interference on a BWP to be operated.

Method 1—Measuring and Configuring CLI by Configuring L1-CLI-RSSI

When the BS configures the UE with UE-specific CLI measurement and reporting information, the BS may also configure the measurement gap 3300 (FIG. 33B) and may additionally configure a CLI measurement resource included in the measurement gap 3300. The BS may configure L1-CLI-RSSI for the UE to perform measurement of an interference of the UL signal 3340 (FIG. 33B) transmitted from BWP #1 3301 to other BWP (BWP 3303 or 3305) of FIG. 33B. When the BS configures L1-CLI-RSSI for the UE, the BS may also configure time and frequency resources in consideration of the measurement gap 3300. The UE may measure a CLI on configured L1-CLI-RSSI measurement resource and may perform reporting in the same manner as in Embodiment 1.

Method 2—Measuring and Configuring CLI by Configuring L1-SRS-RSRP

When the BS configures the UE with UE-specific CLI measurement and reporting information, the BS may also configure the measurement gap 3300 and may additionally configure a CLI measurement resource included in the measurement gap 3300. The BS may configure L1-SRS-RSRP for the UE to perform measurement of an interference of the UL signal 3340 transmitted from BWP #1 3301 to other BWPs (BWP 3303 or 3305) of FIG. 33B. When the BS configures L1-SRS-RSRP in the measurement gap 3300, the BS may configure the L1-SRS-RSRP by referring to UL transmission on other BWP, i.e., SRS configuration information. For example, referring to FIG. 33B, when the BS configures a UE using BWP #1 with L1-SRS-RSRP measurement in the measurement gap 3300, the BS may configure the L1-SRS-RSRP measurement by referring to SRS information that is UL transmission of another UE using BWP #2 3303 or BWP #2 3305 in a same time zone. In order to measure L1-SRS-RSRP described above, the BS may include, in CLI measurement configuration, switching configuration with respect to a BWP (e.g., BWP including BWP #1 and BWP #2).

Figure 35:
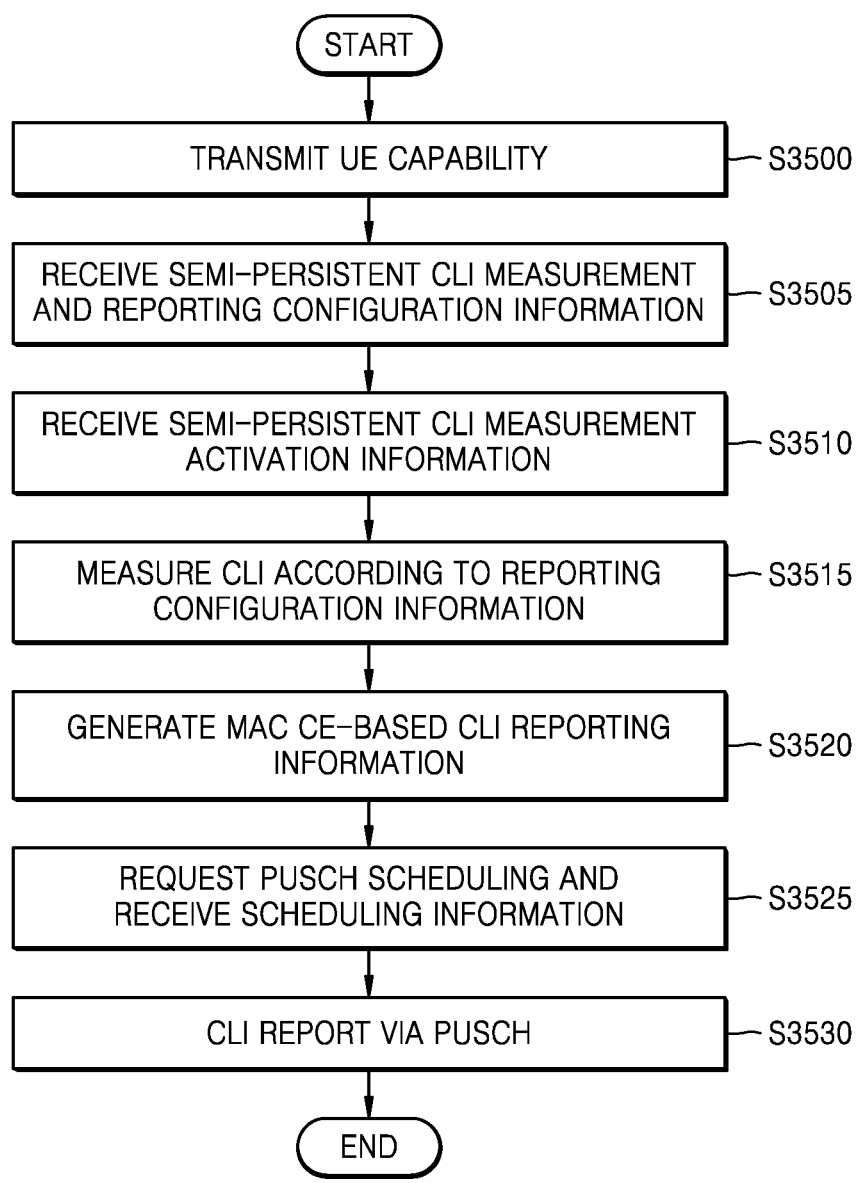
FIG. 35 illustrates an example of UE operations with respect to L2 signaling-based CLI measurement and reporting according to an embodiment.

FIG. 35 illustrates an example of UE operations with respect to L2 signaling-based CLI measurement and reporting according to an embodiment.

Referring to FIG. 35, in operation S3500, a UE may transmit, to a BS, UE capability associated with a CLI. In operation S3505, the UE may receive, from the BS by higher layer signaling, configuration of CLI measurement and reporting based on the transmitted UE capability. The configuration of the CLI measurement and reporting may include a combination of a plurality of pieces of information described with reference to the method in at least one of Embodiment 1, Embodiment 2, or Embodiment 3. Without being limited thereto, description is made based on a time-domain operation of a CLI measurement resource configured for the UE in a semi-persistent measurement operation. In operation S3510, the UE may receive a semi-persistent CLI measurement resource activation indication MAC CE transmitted from the BS, and thus, may perform CLI measurement in a corresponding resource. In operation S3515, the UE may measure at least one of L1-SRS-RSRP or L1-CLI-RSSI or SRS-RSRP or CLI-RSSI, based on a report quantity that is reporting configuration information configured for the UE. Afterward, in operation S3520, the UE may generate reporting information about the measured one among L1-SRS-RSRP or L1-CLI-RSSI or SRS-RSRP or CLI-RSSI, in the form of a MAC CE format. Here, generation of the reporting information may be one of the methods of Embodiments 1, 2, and 3. In operation S3525, the UE may transmit, to the BS, a scheduling request so as to transmit the MAC CE format. Also, the UE may receive, from the BS, scheduling information based on the scheduling request. Afterward, in operation S3530, the UE may perform CLI reporting in a PUSCH resource being scheduled.

Figure 36:
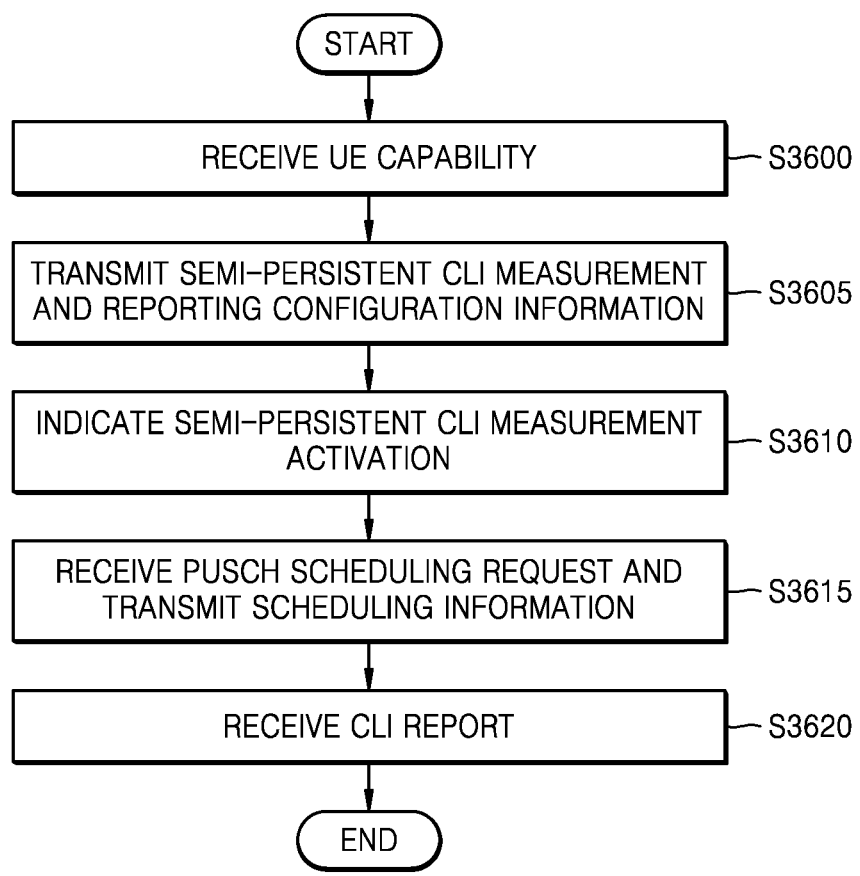
FIG. 36 illustrates an example of BS operations with respect to L2 signaling-based CLI measurement and reporting according to an embodiment.

FIG. 36 illustrates an example of BS operations with respect to L2 signaling-based CLI measurement and reporting according to an embodiment.

Referring to FIG. 36, in operation S3600, the BS may receive, from the UE, UE capability associated with a CLI. In operation S3605, the BS may transmit, to the UE by higher layer signaling, CLI measurement and reporting configuration based on the received UE capability. The CLI measurement and reporting configuration may include a combination of a plurality of pieces of information described with reference to the method in at least one of Embodiments 1, 2, or 3. Without being limited thereto, a time-domain operation of a CLI measurement resource configured for the UE may be a semi-persistent measurement operation. In operation S3610, the BS may indicate, by an MAC CE, semi-persistent CLI measurement resource activation to the UE so as to activate a semi-persistent CLI measurement resource. In operation S3615, the BS may receive a CLI reporting scheduling request via a MAC CE from the UE, and may allocate PUSCH scheduling to the UE based on the CLI reporting scheduling request. Afterward, in operation S3620, the BS may receive CLI report from the UE.

Figure 37:
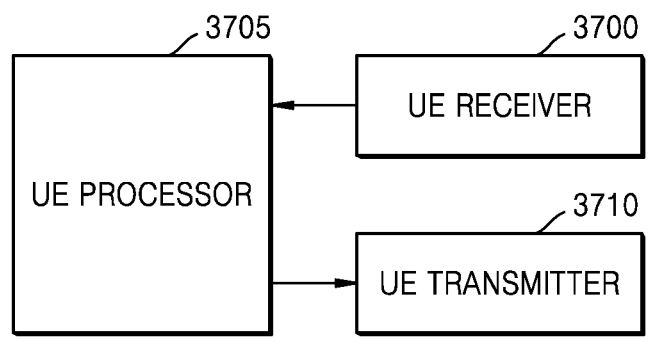
FIG. 37 illustrates a structure of a UE in a wireless communication system according to an embodiment.

FIG. 37 illustrates a structure of a UE in a wireless communication system according to an embodiment.

Referring to FIG. 37, the UE may include a transceiver collectively referring to a UE receiver 3700 and a UE transmitter 3710, a memory, and a UE processor (or a UE controller or a processor) 3705. According to the communication method of the UE described above, the transceiver 3700 or 3710, the memory, and the UE processor 3705 of the UE may operate. However, elements of the UE are not limited to the example above. For example, the UE may include more elements than those described above or may include fewer elements than those described above. In addition, the transceiver 3700 or 3710, the memory, and the UE processor (or processor) 3705 may be implemented as one chip.

The transceiver 3700 or 3710 may transmit or receive a signal to or from a BS. Here, the signal may include control information and data. To this end, the transceiver 3700 or 3710 may include a radio frequency (RF) transmitter for up-converting and amplifying a frequency of signals to be transmitted, and an RF receiver for low-noise-amplifying and down-converting a frequency of received signals. However, this is merely an example of the transceiver 3700 or 3710, and elements of the transceiver 3700 or 3710 are not limited to the RF transmitter 3710 and the RF receiver 3700.

Also, the transceiver 3700 or 3710 may receive signals through wireless channels and output the signals to the processor included in the UE processor 3705, and may transmit signals output from the processor included in the UE processor 3705, through wireless channels.

The memory may store programs and data required for the UE to operate. Also, the memory may store control information or data included in a signal transmitted or received by the UE. The memory may include any or a combination of storage media such as read-only memory (ROM), random access memory (RAM), a hard disk, a compact disc (CD)-ROM, a digital versatile disc (DVD), or the like. Also, the memory may include a plurality of memories.

Also, the UE processor 3705 (or the processor) may control a series of processes to allow the UE to operate according to the embodiments. For example, the processor included in the UE processor 3705 may control elements of the UE to receive DCI consisting of two layers so as to simultaneously receive a plurality of PDSCHs. The processor included in the UE processor 3705 may be provided in a multiple number, and may perform an element control operation of the UE by executing a program stored in the memory.

Figure 38:
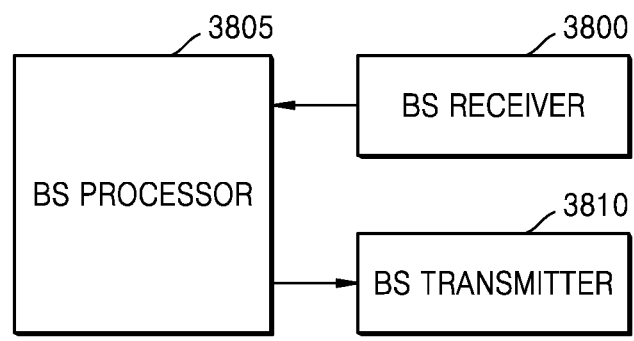
FIG. 38 illustrates a structure of a BS in a wireless communication system according to an embodiment.

FIG. 38 illustrates a structure of a BS in a wireless communication system according to an embodiment.

Referring to FIG. 38, the BS may include a transceiver collectively referring to a BS receiver 3800 and a BS transmitter 3810, a memory, and a BS processor (or a BS controller or a processor) 3805. According to the communication method of the BS described above, the transceiver 3800 or 3810, the memory, and the BS processor 3805 of the BS may operate. However, elements of the BS are not limited to the example above. For example, the BS may include more elements than those described above or may include fewer elements than those described above. In addition, the transceiver 3800 or 3810, the memory, and the BS processor (or processor) 3805 may be implemented as one chip.

The transceiver 3800 or 3810 may transmit or receive a signal to or from a UE. Here, the signal may include control information and data. To this end, the transceiver 3800 or 3810 may include a RF transmitter for up-converting and amplifying a frequency of signals to be transmitted, and an RF receiver for low-noise-amplifying and down-converting a frequency of received signals. However, this is merely an example of the transceiver 3800 or 3810, and elements of the transceiver 3800 or 3810 are not limited to the RF transmitter and the RF receiver.

Also, the transceiver 3800 or 3810 may receive signals through wireless channels and output the signals to the processor included in the BS processor 3805, and may transmit signals output from the processor included in the BS processor 3805, through wireless channels.

The memory may store programs and data required for the BS to operate. Also, the memory may store control information or data included in a signal transmitted or received by the BS. The memory may include any or a combination of storage media such as ROM, RAM, a hard disk, a CD-ROM, a DVD, or the like. Also, the memory may include a plurality of memories.

Also, the BS processor (or processor) 3805 may control a series of processes to allow the BS to operate according to the embodiments. For example, the processor included in the BS processor 3805 may configure a plurality of pieces of DCI consisting of two layers and including allocation information associated with a plurality of PDSCHs, and may control each element to transmit the DCI. The BS processor 3805 may be provided in a multiple number, and may perform an element control operation of the BS by executing a program stored in the memory.

The embodiments of the disclosure provide an apparatus and method for effectively providing a service in a mobile communication system.

The methods according to the embodiments of the disclosure may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments as described herein.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments.

A machine-readable storage medium may be provided in the form of a non-transitory storage medium. Here, the term non-transitory storage medium may mean that the storage medium is a tangible device and does not include signals (e.g., electromagnetic waves), and may mean that data may be permanently or temporarily stored in the storage medium. For example, the non-transitory storage medium may include a buffer in which data is temporarily stored.

According to an embodiment, the method may be included and provided in a computer program product. The computer program product may be traded as a product between a seller and a buyer. The computer program product may be distributed in the form of a machine-readable storage medium (e.g., a CD-ROM) or may be distributed (e.g., downloaded or uploaded) online through an application store (e.g., Play Store™) or directly between two user apparatuses (e.g., smartphones). In a case of online distribution, at least a portion of the computer program product (e.g., a downloadable application) may be at least temporarily stored or temporarily generated in a machine-readable storage medium such as a manufacturer's server, a server of an application store, or a memory of a relay server.

In the afore-described embodiments of the disclosure, elements included in the disclosure are expressed in a singular or plural form. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments described herein are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined to be implemented, when required. For example, the BS and the UE may be operated in a manner that portions of an embodiment are combined with portions of another embodiment. For example, the BS and the UE may be operated in a manner that portions of a first embodiment are combined with portions of a second embodiment. Also, although the embodiments are described based on a FDD LTE system, modifications based on the technical scope of the embodiments may be applied to other communication systems such as a TDD LTE system, a 5G or NR system, or the like.

The description order of the method of the disclosure as in the drawings may not exactly correspond to actual execution order, but may be performed reversely or in parallel.

In the drawings for describing the methods of the disclosure, some components may be omitted and only some components may be shown within a range that does not deviate the scope of the disclosure.

In the disclosure, a method may be performed by combining some or all of the contents included in each of the embodiments of the disclosure within the scope of the disclosure.

Various embodiments of the disclosure are described above. The aforementioned embodiments of the disclosure are merely for illustration, and are not limited thereto. One of ordinary skill in the art that the disclosure may be easily embodied in many different forms without changing the technical concept or essential features of the disclosure. The scope of the disclosure is defined by the appended claims, rather than defined by the detailed description set forth above, and all differences and modifications that can be derived from the meanings and scope of the claims and other equivalent embodiments therefrom will be construed as being included in the disclosure.

What is claimed is:

1. A method performed by a user equipment (UE) in a wireless communication system, the method comprising:
   receiving, from a base station (BS), a radio resource control (RRC) message including configuration information related to cross link interference (CLI);
   measuring CLI on at least one measurement resource identified based on the configuration information related to the CLI;
   generating a medium access control (MAC) subheader including a CLI report-dedicated logical channel identity (LCID) and a MAC control element (CE) including a CLI report value mapped to the measured CLI; and
   performing the a CLI report by transmitting, to the BS, the MAC subheader and the MAC CE.

2. The method of claim 1,
   wherein the configuration information includes at least one of information regarding a report quantity type, information related to measuring the at least one measurement resource, or information related to the CLI report,
   wherein the report quantity type corresponds to L1-sounding reference signal (SRS)-reference signal received power (RSRP) (L1-SRS-RSRP) or L1-CLI-received signal strength indicator (RSSI) (L1-CLI-RSSI),
   wherein the information related to the measuring of the at least one measurement resource includes information indicating periodic measuring of the at least one measurement resource or semi-persistent measuring of the at least one measurement resource, and
   wherein the information related to the CLI report includes information related to at least one triggering event.

3. The method of claim 1, further comprising:
   receiving, from the BS, a MAC CE related to activation of the at least one measurement resource configured to perform semi-persistent measurement,
   wherein the MAC CE related to the activation includes at least one of information indicating activating or deactivating of the at least one measurement resource, a serving cell identity (ID), a bandwidth part ID, or a measurement resource set ID.

4. The method of claim 1, further comprising:
   transmitting, to the BS, a scheduling request for the transmitting of the MAC CE; and
   receiving, from the BS, scheduling information including at least one resource allocated for uplink transmission based on the scheduling request,
   wherein the MAC CE is transmitted based on the at least one resource allocated for the uplink transmission.

5. The method of claim 1,
   wherein the MAC CE further includes at least one of a measurement resource identity (ID) corresponding to the CLI report value, a preferred resource ID for scheduling, or an unpreferred resource ID for the scheduling, and
   wherein the preferred resource ID and the unpreferred resource ID are identified based on the value of the measured CLI.

6. The method of claim 1,
   wherein the CLI report value is identified based on a mapping table, and wherein the mapping table includes at least one value for the CLI report corresponding to a plurality of measured values based on a configured resolution.

7. The method of claim 1, wherein the configuration information includes information related to a measurement interval, and
wherein the measurement interval is activated based on a MAC CE including information indicating whether the measurement interval is activated or deactivated.

8. A method performed by a base station (BS) in a wireless communication system, the method comprising:
transmitting, to a user equipment (UE), a radio resource control (RRC) message including configuration information related to cross link interference (CLI); and
obtaining, from the UE, a CLI report by receiving a medium access control (MAC) subheader and a MAC control element (CE) including a CLI report value mapped to CLI measured at the UE,
wherein the CLI is measured on at least one measurement resource identified based on the configuration information related to the CLI, and
wherein the MAC subheader includes a CLI report-dedicated logical channel identity (LCID).

9. The method of claim 8,
wherein the configuration information includes at least one of information regarding a report quantity type, information related to measuring the at least one measurement resource, or information related to the CLI report,
wherein the report quantity type corresponds to L1-sounding reference signal (SRS)-reference signal received power (RSRP) (L1-SRS-RSRP) or L1-CLI-received signal strength indicator (RSSI) (L1-CLI-RSSI),
wherein the information related to the measuring of the at least one measurement resource includes information indicating periodic measuring of the at least one measurement resource or semi-persistent measuring of the at least one measurement resource, and
wherein the information related to the CLI report includes information related to at least one triggering event.

10. The method of claim 8, further comprising:
transmitting, to the UE, a MAC CE related to activation of the at least one measurement resource configured to perform semi-persistent measurement,
wherein the MAC CE related to the activation includes at least one of information indicating activating or deactivating of the at least one measurement resource, a serving cell identity (ID), a bandwidth part ID, or a measurement resource set ID.

11. The method of claim 8, further comprising:
receiving, from the UE, a scheduling request for the MAC CE; and
transmitting, to the UE, scheduling information including at least one resource allocated for uplink transmission based on the scheduling request,
wherein the MAC CE is received based on the at least one resource allocated for the uplink transmission.

12. The method of claim 8,
wherein the MAC CE further includes at least one of a measurement resource identity (ID) corresponding to the CLI report value, a preferred resource ID for scheduling, or an unpreferred resource ID for the scheduling, and
wherein the preferred resource ID and the unpreferred resource ID are identified based on the value of the measured CLI.

13. The method of claim 8,
wherein the CLI report value is identified based on a mapping table, and
wherein the mapping table includes at least one value for the CLI report corresponding to a plurality of measured values based on a configured resolution.

14. The method of claim 8,
wherein the configuration information includes information related to a measurement interval, and
wherein the measurement interval is activated based on a MAC CE including information indicating whether the measurement interval is activated or deactivated.

15. A user equipment (UE) in a wireless communication system, the UE comprising:
a transceiver; and
at least one processor coupled to the transceiver and configured to:
receive, from a base station (BS), a radio resource control (RRC) message including configuration information related to cross link interference (CLI);
measure CLI on at least one measurement resource identified based on the configuration information related to the CLI;
generate a medium access control (MAC) subheader including a CLI report-dedicated logical channel identity (LCID) and a MAC control element (CE) including a CLI report value mapped to the measured CLI; and
perform a CLI report by transmitting, to the BS, the MAC subheader and the MAC CE.

16. The UE of claim 15,
wherein the configuration information includes at least one of information regarding a report quantity type, information related to measuring the at least one measurement resource, or information related to the CLI report,
wherein the report quantity type corresponds to L1-sounding reference signal (SRS)-reference signal received power (RSRP) (L1-SRS-RSRP) or L1-CLI-received signal strength indicator (RSSI) (L1-CLI-RSSI),
wherein the information related to the measuring of the at least one measurement resource includes information indicating periodic measuring of the at least one measurement resource or semi-persistent measuring of the at least one measurement resource, and
wherein the information related to the CLI report includes information related to at least one triggering event.

17. The UE of claim 15, wherein the at least one processor is further configured to:
receive, from the BS, a MAC CE related to activation of the at least one measurement resource configured to perform semi-persistent measurement,
wherein the MAC CE related to the activation includes at least one of information indicating activating or deactivating of the at least one measurement resource, a serving cell identity (ID), a bandwidth part ID, or a measurement resource set ID.

18. The UE of claim 15, wherein the at least one processor is further configured to:
transmit, to the BS, a scheduling request for the transmitting of the MAC CE; and
receive, from the BS, scheduling information including at least one resource allocated for uplink transmission based on the scheduling request, and
wherein the MAC CE is transmitted based on the at least one resource allocated for the uplink transmission.

19. The UE of claim 15,
wherein the MAC CE further includes at least one of a measurement resource identity (ID) corresponding to the CLI report value, a preferred resource ID for scheduling, or an unpreferred resource ID for the scheduling, and
wherein the preferred resource ID and the unpreferred resource ID are identified based on the value of the measured CLI.

20. The UE of claim 15,
wherein the CLI report value is identified based on a mapping table, and
wherein the mapping table includes at least one value for the CLI report corresponding to a plurality of measured values based on a configured resolution.

* * * * *